(12) United States Patent
Tanaka et al.

(10) Patent No.: US 8,588,580 B2
(45) Date of Patent: Nov. 19, 2013

(54) PLAYBACK DEVICE, RECORDING MEDIUM, PLAYBACK METHOD AND PROGRAM

(75) Inventors: Keiichi Tanaka, Osaka (JP); Hidetaka Oto, Osaka (JP)

(73) Assignee: Panasonic Corporation, Osaka (JP)

( * ) Notice: Subject to any disclaimer, the term of this patent is extended or adjusted under 35 U.S.C. 154(b) by 192 days.

(21) Appl. No.: 13/016,066

(22) Filed: Jan. 28, 2011

(65) Prior Publication Data

US 2011/0305435 A1 Dec. 15, 2011

Related U.S. Application Data

(60) Provisional application No. 61/353,252, filed on Jun. 10, 2010.

(30) Foreign Application Priority Data

Jun. 10, 2010 (JP) .................................. 2010-132580

(51) Int. Cl.
 H04N 9/80 (2006.01)
 H04N 5/92 (2006.01)

(52) U.S. Cl.
 USPC ............................ 386/240; 386/252; 386/326

(58) Field of Classification Search
 USPC .................................. 386/239–240, 353–357
 See application file for complete search history.

(56) References Cited

U.S. PATENT DOCUMENTS

| 6,438,615 | B1 * | 8/2002 | Faustini ........................ 719/315 |
| 2002/0099795 | A1 * | 7/2002 | Betros et al. .................... 709/219 |
| 2004/0030763 | A1 * | 2/2004 | Manter et al. .................. 709/223 |
| 2005/0270973 | A1 * | 12/2005 | Raev et al. ..................... 370/218 |
| 2006/0155786 | A1 | 7/2006 | Seo et al. |
| 2007/0192818 | A1 * | 8/2007 | Bourges-Sevenier et al. ............................. 725/132 |
| 2008/0056676 | A1 * | 3/2008 | Kim et al. ........................ 386/95 |
| 2008/0222737 | A1 * | 9/2008 | Basile et al. .................... 726/27 |
| 2008/0292270 | A1 * | 11/2008 | Ikeda ............................... 386/95 |
| 2009/0313621 | A1 * | 12/2009 | Dewa ................................ 718/1 |
| 2009/0324197 | A1 | 12/2009 | Ueda et al. |
| 2011/0103769 | A1 * | 5/2011 | Risan ............................ 386/252 |

FOREIGN PATENT DOCUMENTS

| JP | 9-222974 A | 8/1997 |
| JP | 2003-345751 A | 12/2003 |
| JP | 2004-295463 A | 10/2004 |
| JP | 2007-251803 A | 9/2007 |
| JP | 2008-527600 A | 7/2008 |
| JP | 2010-9407 A | 1/2010 |

OTHER PUBLICATIONS

International Search Report for corresponding International Application No. PCT/JP2011/00496.

* cited by examiner

*Primary Examiner* — Hung Dang

(74) *Attorney, Agent, or Firm* — Greenblum & Bernstein P.L.C.

(57) ABSTRACT

A bytecode processing unit provided in a playback device is platform unit 20 that reads and runs a bytecode application recorded on read-only medium 105. The playback device includes: playback control unit 10 for controlling AV playback of digital streams; and machine unique function control unit 33 for performing machine unique functions unique to the playback device, to perform a control onto a content. APIs used by the bytecode application include API for playback control function, and API for socket communication. When the bytecode application requests playback control unit 10 to control the playback, it calls the playback control API to can instruct playback control unit 10 to execute the process. When the bytecode application requests execution of a machine unique function of the playback device, it instructs a machine unique function control unit to perform the process via a function call by the socket communication API.

14 Claims, 34 Drawing Sheets

PLAYBACK DEVICE, RECORDING MEDIUM, PLAYBACK METHOD AND PROGRAM

This application claims benefit to the provisional U.S. Application 61/353,252, filed Jun. 10, 2010 (Month Day, Year).

TECHNICAL FIELD

The present invention relates to the technical field of controlling the bytecode applications.

BACKGROUND ART

The bytecode application is a program in the execution format, obtained by compiling the class structure described with use of the source code of the object-oriented programming language. The bytecode application is composed of codes that do not depend on the machine (bytecodes). The playback devices in recent years have succeeded in enhancing the added value of the playback device or a content, by causing the bytecode application to execute not only the playback control for playing back the content, but an interactive control or an additional control.

One of the functions that are to be implemented in the playback device as the functions used by the bytecode applications is a copy function, which is recited in the following patent literature.

CITATION LIST

Patent Literature

Patent Literature 1
Japanese Patent Application Publication No. 2010-9407

SUMMARY OF INVENTION

Technical Problem

Meanwhile, it often happens that a manufacturer succeeds in developing a special function targeting a content, but the manufacturer can hardly determine whether to implement the function as a machine unique function or as a standardized function.

When the function is implemented as a machine unique function, an arrangement is made so that the function can be activated via a user interface unique to the device, such as a set-up menu for setting the device. However, when a special function is implemented as a machine unique function, the user interface for activating the special function is limited to a user interface generated by the manufacturer, which looks poorer than the one generated by the content provider. In that case, the user will feel inconvenience in learning how to use the special function, and it will provide the user with a low merit.

On the other hand, when a special function is implemented as a standardized function, a lot of applications using the standardized function will be developed and brought into market by various content providers. This will provide various user interfaces for activating the special function, which will allow the users to use the special function via an easier and more user-friendly user interfaces. However, when an API for the special function is created and published, follower manufacturers can develop products equipped with the same function without spending the research and development cost, and bring the products into market. When this happens, the leader manufacturer might be caught up with by the follower manufacturers and beaten in the battle for market share, without recovering the research and development cost.

As described above, the two types of implementations have respective demerits: the user-friendliness is sacrificed; or the follower manufacturers can gain an advantage. It is difficult to find the optimum solution to this problem.

It is therefore an object of the present invention to provide a playback device that is implemented with a special function as a machine unique function, while at the same time allowing various content providers to develop applications that use the machine unique function.

Solution to Problem

The above object is fulfilled by a playback device for playing back a content recorded on a recording medium and performing functions related to the content, the functions related to the content including a standardized playback control function and a machine unique function that is unique to the playback device, the playback device comprising: a platform unit operable to read a bytecode application from the recording medium and run the bytecode application; a playback control unit operable to perform the playback control function; and a unique function control unit operable to perform the machine unique function, wherein the platform unit includes a programming interface that can be used by the bytecode application, and the programming interface includes a playback control programming interface and a communication programming interface, the bytecode application instructs the playback control unit to perform the playback control function, by calling the playback control programming interface, and the bytecode application establishes a socket connection with the unique function control unit by using the communication programming interface, and instructs the unique function control unit to perform the machine unique function via the socket connection.

Advantageous Effects of Invention

A programming interface for the socket connection is a function supported as a native API. Accordingly, by requesting the machine unique function control unit to perform the machine unique function by establishing a connection to the machine unique function control unit by the socket connection, it is possible to cause an application to use the machine unique function without making an addition or change to the API for the digital stream playback control that has already been standardized. It is expected that, when it becomes possible to cause an application to use the machine unique function without making an addition or change to the API for the digital stream playback control that has already been standardized, various applications using special functions will be developed and brought to the market by various content providers. As a result, a variety of user interfaces for activating the special functions will be available, and the users will be able to use the special functions via user interfaces that are easier to use and more user-friendly.

As far as a special function is implemented as a machine unique function, it is possible to prevent follower manufacturers to provide similar products. It is therefore possible for a few products, in which a special function developed by a manufacturer as a machine unique function, to be sold exclusively in the market.

The above structure makes it easy to establish a new earnings model in which the leader manufacturer allows a content provider to use a special function, and only manufacturers that have succeed in developing the special function can be licensed by the content provider. This will generate momentum in the research and development by the manufacturers.

This completes description of an aspect of the present invention having been made based on the technical concept for solving the technical problem stated in the "Technical Problem" section above. Although on an optional basis, the above-described playback device may have a structure to solve the following additional technical problems.

(Additional Technical Problem 1)

When a special function is implemented as a standardized function, it is difficult to expand an API that has already been standardized. Accordingly, when a content provider, for the first time, provides a new service of advanced originality, the content provider tends to give up providing the original service on the playback device. As a substitute, the content provider prepares a separate disc, different from a disc containing the main story movie, on which an application that runs on a personal computer (PC) is recorded, and has users run this disc on a PC. This is the mainstream method of providing original services today. One example of existing services is a widespread service in which digital streams for mobile terminal and an application that runs on a PC are recorded onto a separate disc that is different from a disc containing the main story movie, and the separate disc is run on a PC to copy the digital streams for mobile terminal from the separate disc to a mobile terminal connected to the PC, thereby enabling a content for taking out to be played back on the mobile terminal (this service is commonly called "digital copy"). Yet, many problems are posed by the above-described method of providing services because (i) the content provider must prepare a disc for PC use that is separate from the main disc, (ii) the user must purposely use a PC in order to take advantage of the service even if that user does not use a PC for movie viewing, and (iii) device manufacturers cannot promote playback device functions as the service must be provided via a PC. All of this presents respective disadvantages for content providers, users, and device manufacturers.

It is therefore an object of the present invention to provide a service in which an application program on a read-only medium is linked to an original function of a playback device so that compatibility with other playback devices is maintained and no PC or other third-party device is required.

The above object is fulfilled by the above playback device, wherein the recording medium is a first recording medium in which a first directory and a second directory are provided under a root directory, a main content and the bytecode application are recorded in the first directory, a content for taking out is recorded in the second directory, the content for taking out being a target of the machine unique function and different from the main content in format, and the machine unique function is an inter-media copy by which files constituting the content for taking out are copied from the first recording medium to a second recording medium.

With the above structure, the main story movie recorded on the first directory and a protected content for mobile terminal recorded on the second directory can be recorded in one disc, and the application on the disc can control the transfer of the protected content for mobile terminal. This eliminates the need for a PC, and realizes the service for taking out with only a playback device.

Furthermore, although on an optional basis, the above-described playback device may have a structure to solve the following additional technical problems.

(Additional Technical Problem 2)

As it happens, if a new API is added to the standard output functions of player models in order to implement a newly developed special function as a standard output function, then a problem in terms of backward compatibility arises in that playback devices lacking this additional API will no longer be able to normally run the application that uses the additional API. Specifically, the problem is that at application run time, the playback device performs a link process between the API used by the application and the API implemented in the playback device itself. Should the application use an API not held by the playback device, a link error will occur and the application will fail to run. One measure for avoiding the above problem is to prepare an application that uses only the existing API as well as a separate application that uses the additional API, then check the playback device version and the like and accordingly change the application that will run. However, if a multitude of functions are later added and the playback devices expand APIs for each function, then it becomes cumbersome and complexed to manage the extent to which an API can safely be used and the point at which a different application ought to be used. In that case, it becomes extremely difficult to maintain the application compatibility between playback devices from different manufacturers. For this reason, when a new function is added, an API is carefully defined by a standards body or the like so that compatibility issues do not arise and the additional APIs are published for device manufacturers and application developers, so that it becomes clear to which extent the API can safely be used and at which point a different application ought to be used. In this way, measures have been taken so that even if a product to which new functions have been added is played back on an older device, that the product ought to be playable without problems. However, as this process is constantly required every time a new function is added, and because the additional API must be carefully defined, new problems arise in that time is needed until finalization and in that the evolution of services achieved by playback device and application is stalled.

It is therefore another object of the present invention to provide a playback device that can realize a stable activation of the bytecode application without standardizing the API.

The above object is fulfilled by the above playback device, wherein an on-media library for the machine unique function is recorded in the first directory of the first recording medium, the on-media library providing another bytecode application recorded in the first directory with a programming interface for performance of the machine unique function, when the other bytecode application calls the programming interface for performance of the machine unique function, the on-media library converts (i) the calling of the programming interface for performance of the machine unique function into a socket command and outputs the socket command to the unique function control unit; and (ii) converts a response from the unique function control unit into a return value or an event and returns the return value or the event to the other bytecode application, and the socket connection constitutes a communication path on which the socket command and the response are transferred.

In the above structure, when the machine unique function is used, the on-media library recorded on the first recording medium uses an API for the socket connection. This increases the probability that, at the start-up of an application, the API used by the on-media library recorded on the first recording medium is successfully linked with the native API in the playback device for the socket communication, and the start-up of the application itself never fails.

Also, as far as the programming interface for the socket communication is used, there is no need to prepare, separately, an application that uses only an existing API and an application that uses an additional API. Thus, with this structure, it remains easy to maintain the application compatibility between playback devices from different manufacturers.

With the above structure, when a new function is added, there is no need to make a cautious consideration of definition of an additional API, and thus the evolution of services achieved by playback device and application is not stalled. Also, the management of the analysis of protocol on the communication data regarding the machine unique function, which is performed between the application and the playback device, can be consolidated into the library. This eliminates the need for the application itself to perform the protocol analysis, thereby improving the productivity of the application.

Although on an optional basis, the above-described playback device may be the above playback device further comprising: a verification unit operable to verify authenticity of a digital signature file stored in an archive file of the on-media library, the verification unit calculates a hash value of the digital signature file stored in the archive file of the on-media library, based on an authentication key embedded in the playback device, the verification unit judges that the bytecode application is authentic when the calculated hash value matches a value of a digital signature included in the digital signature file stored in the archive file of the on-media library, and when the verification unit judges that the bytecode application is not authentic, the unique function control unit rejects to perform the machine unique function that is different from the playback control function, even if the unique function control unit receives a command related to the machine unique function that is different from the playback control function from the bytecode application.

With this structure, it is possible to transfer encrypted data through communications between an application and the playback device, by which monitoring the contents of the communication data in an unauthorized manner, obtaining information regarding the functions unique to the playback device, and using the obtained information in an unauthorized manner can be prevented.

BRIEF DESCRIPTION OF DRAWINGS

These and the other objects, advantages and features of the invention will become apparent from the following description thereof taken in conjunction with the accompanying drawings which illustrate a specific embodiment of the invention.

DESCRIPTION OF EMBODIMENTS

Embodiments of the present invention are described below with reference to the drawings.

The playback device of the present invention provided with means for solving the above problems can be implemented as a player machine for playing back a package medium. The integrated circuit of the present invention can be implemented as a system LSI to be embedded in the player machine. The playback method of the present invention can be implemented as a time-series procedure realized by the player machine. The program of the present invention can be implemented as a program in an executable format recorded on a computer-readable recording medium installed in the player machine.

Embodiment 1

Embodiment 1 relates to improvements on communications performed inside and outside the playback device for realizing the machine unique functions.

Figure 1:
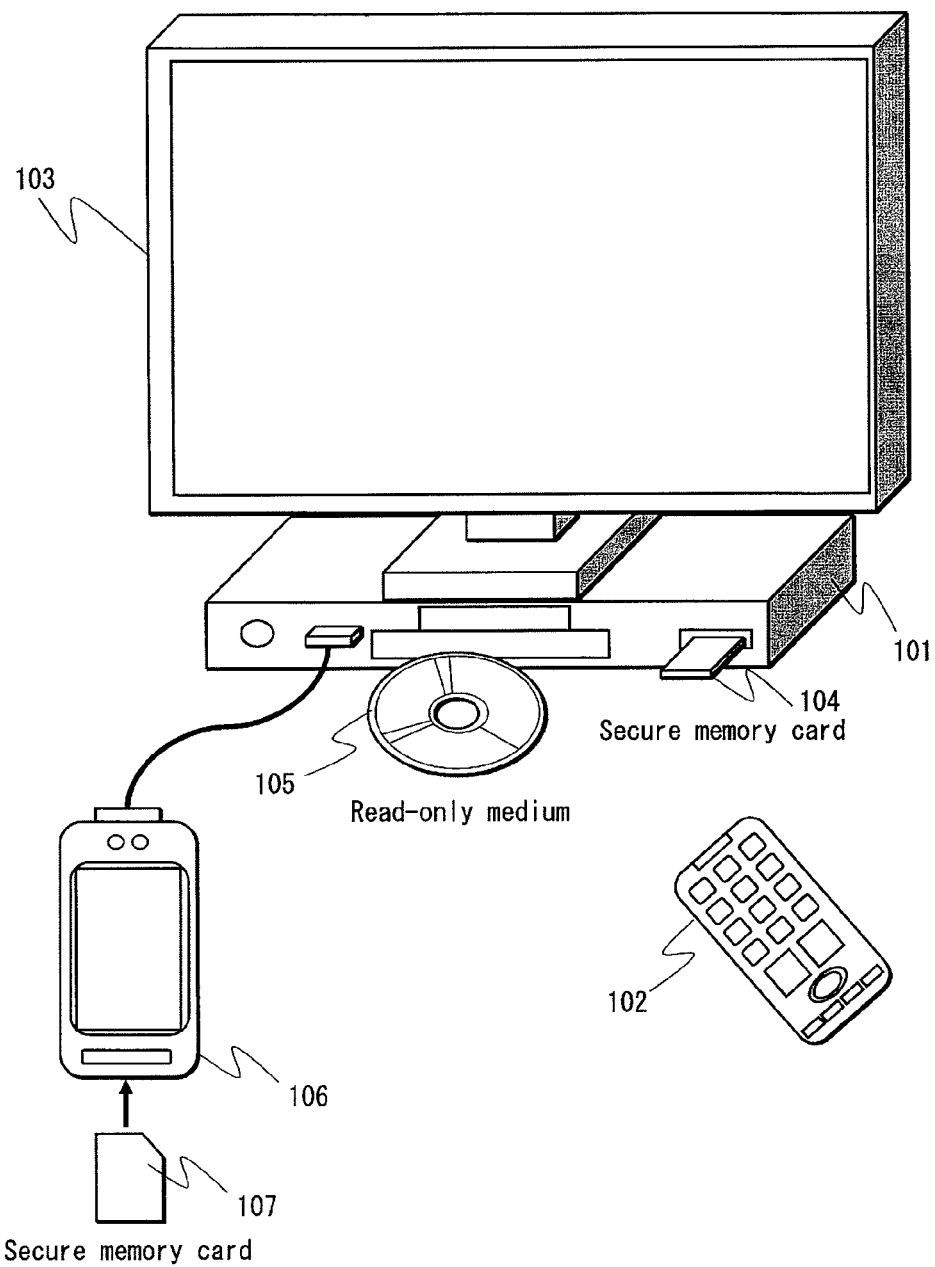
FIG. 1 shows one example of a usage act of the playback device pertaining to the present invention.

First of all, of the implementation acts of the playback device pertaining to the present invention, the Embodiment describes a usage act. FIG. 1 shows one example of a usage act of the playback device pertaining to the present invention. As shown in FIG. 1, the playback device pertaining to the present invention is a playback device 101. This playback device 101 constitutes a home theater system accompanied by a remote control 102, a television 103, a secure memory card 104, a read-only medium 105, a mobile terminal 106, and a secure memory card 107.

The playback device 101 is equipped with slots through which some of an SD memory card, memory stick, Compact-Flash, SmartMedia, multimedia card, and other removable media 104 can be inserted. In addition, the playback device 101 is equipped with slots such as USB slots for connection with the mobile terminal 106.

The remote control 102 is an attachment to the playback device 101, and receives an operation indicating an instruction to the playback device 101 from the user, and transmits an instruction signal corresponding to the received operation to the playback device 101. The operations indicating instructions to the playback device includes an operation for causing the playback device to perform a playback control of a read-only medium, or an operation for causing the playback device to perform a machine unique function. Also, the playback device 101 has a network communication function to perform communications with an external server.

The television 103 provides the user with an interactive operation environment by displaying a playback image of a movie, a menu or the like.

The secure memory card 104 is a recording medium that is used to support protected contents for mobile terminal that are copied by using the machine unique function when the playback device performs the machine unique function. The secure memory card 104 is, for example, microSD card or SDHC card. The secure memory card 104 is provided with a protected area and a system area, wherein an encrypted decryption key is stored in the protected area. The system area stores a media key block (MKB) and medium IDs (MIDs) that are used to decrypt the decryption key.

The read-only medium 105 is a recording medium for providing the home theater system with movies.

The mobile terminal 106, in which the secure memory card 104 can be loaded, can used a protected content for mobile terminal recorded on the secure memory card 104. To use the protected content for mobile terminal, the mobile terminal 106 decrypts the encrypted decryption key written in the protected area of the secure memory card 104 by using the MKB recorded in the system area of the copy-destination medium, extracts the key information (title key) from the decryption key, and decrypts an encrypted digital stream contained in the protected content for mobile terminal by using the extracted key information as necessary. Here, the "using" means to decrypt an encrypted content into a content for taking out, and play back the content.

This completes the description of the home theater system. Next, the recording medium will be described in detail.

Figure 2:
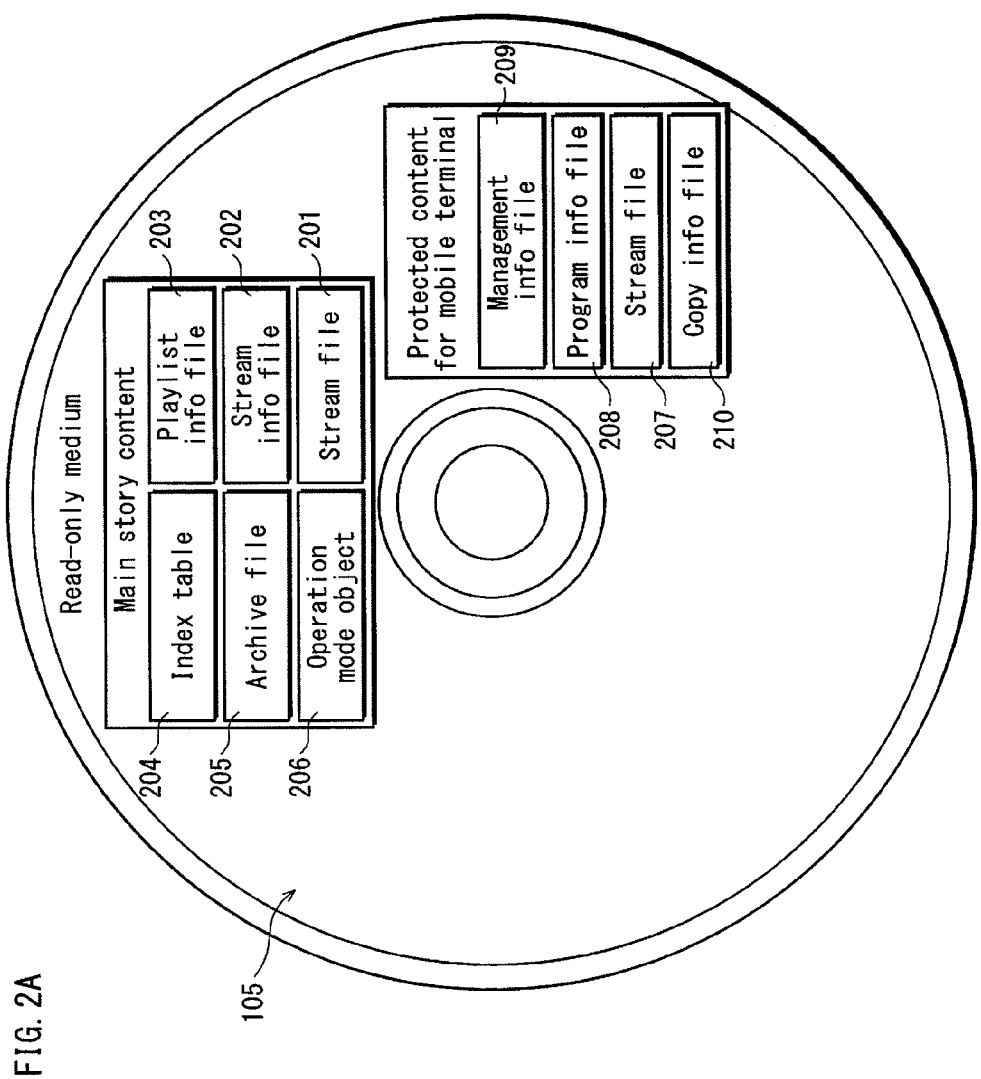
FIGS. 2A and 2B illustrate an internal structure of the recording medium in Embodiment 1 and the internal structure of the operation mode object.

FIG. 2A illustrates an internal structure of the recording medium in Embodiment 1. As shown in FIG. 2A, a main story content and a protected content for mobile terminal are recorded on the recording medium in Embodiment 1.

The main story content is a content that is stored by the recording method or the protection method of the read-only medium 105, and includes a stream file 201, a stream information file 202, a playlist information file 203, an index table 204, an archive file 205, and an operation mode object 206.

The stream file 201 stores a digital stream in the transport stream format in which a video stream, one or more audio streams, and a graphics stream are multiplexed.

The stream information file 202 ensures the random access to any source packet in the transport stream of the stream file, and the seamless playback with another transport stream. Via this stream information file, the stream files are managed as "AV clips". The stream information file includes an entry map that shows a plurality of pieces of information and source packet numbers positioned at the heads of GOPs, respectively in association with presentation time stamps of the frame periods, wherein the plurality of pieces of information include the encoding format, frame rate, bit rate, and resolution of a stream in the AV clip. Accordingly, by loading the stream information file into the memory, it is possible to recognize what kind of transport stream in the stream file is attempting to access, thereby ensuring the execution of the random access.

The playlist information file 203 is a file storing information for the playback device to play back the playlist. The "playlist" indicates a playback path defined by logically specifying a playback order of playback sections, where the playback sections are defined on a time axis of transport streams (TS). The playlist has a role of defining a sequence of scenes to be displayed in order, by indicating which parts of which TSs among a plurality of TSs should be played back. The playlist information defines "patterns" of the playlists. The playback path defined by the playlist information is what is called "multi-path". The multi-path is composed of a "main path" and one or more "sub-paths", wherein the main path is defined for the main TS, and the sub-paths are defined for sub TSs.

The index table 204 shows correspondence between the operation mode objects (which define the operation modes) and a plurality of title numbers that can be stored in the title number register provided in the playback device. Titles recorded on the recording medium are pairs of (i) an operation mode object identified by a title number and (ii) a playlist played back from that operation mode object. It should be noted here that title numbers that can be stored in the title number register include "0", "1" through "999", and an undefined value "0xFFFF". A title number "0" is a title number of the top menu title. The top menu title is a title that can be called by a menu call operation performed by the user. The title number by the undefined value "0xFFFF" is a title number of the first play title. The first play title is a title that displays a warning to the viewer, a logo of the content provider and so on immediately after the recording medium is loaded. The index table includes entries (title indexes) in one-to-one correspondence with title numbers. Each title index includes an operation mode object that defines an operation mode. With this structure, the title index table defines in detail how each title operates in a corresponding operation mode.

The archive file 205 is a file generated by archiving a file of the class structure of the bytecode application (class file) together with a digital certificate manifest file, a disc signature file, a disc signature encryption key file, and a permission request file. A loading of an application is made by handling the entire class archive file so that the authenticity of the application can be verified by using the digital certificate, disc signature, and disc signature encryption key when the class is loaded. Also, with the presence of the permission request file, it is possible to limit the operation of the application to the operation for which a predetermined right has been given.

The operation mode object 206 is a control unit that is associated with one of the title numbers shown in the index table. When the title number associated with the operation mode object 206 is set in the title number register as the title number of the current title, the operation mode object 206 indicates how the corresponding title is operated.

FIG. 2B illustrates the internal structure of the operation mode object. As shown in FIG. 2B, the operation mode object is composed of "application management table", "terminal management table", "application cache information", "playlist access information", and "key assignment table".

The "application management table" is a control table that instructs a title boundary application signaling to the application manager or the class loader. The "terminal management table" is a management table that indicates the HAVi configuration for realizing the GUI, fonts to be used in the GUI, and present/absence of masks of user operations to the multimedia home platform (MHP). The "application cache information" is a control table that indicates the Cache In/Cache Out of the archive file at the title selection to the cache manager. The "playlist access information" is a control table that indicates specification of the playlist access at the title selection to the playback control unit. The "key assignment table" is a control table that indicates correspondence between keys and events to the event manager.

The "class load" is a process of generating an instance of a class file archived in the archive file into the heap area of the platform. When the generated instance is present in the heap area, an application, which is the instance generated in the heap area, can be executed. The "application signaling" is a control for defining whether to automatically run the application, which is the instance of a class file, or whether to set the life cycle of the application as a title boundary or a disc boundary. Here, the title boundary is a control to generate, at a certain time point between a start and end of a title, an instance of a class file archived in the archive file, into the heap area of the platform; and erases the instance as an application from the heap area at the same time as the title ends. The disc boundary is a control to generate, at a certain time point between an insertion and ejection of a disc, an instance of a class file archived in the archive file, into the heap area of the platform; and erases the instance as an application from the heap area at the same time as the disc is ejected. Conversely, a control not to erase the instance in the heap area even if a disc is eject is called a "disc unboundary". The "HAVi device configuration" defines the resolution of the graphics plane, fonts to be used in display of characters and the like when the application executes the GUI process.

The "playlist access" is a specification of a playlist that can be played back by the activated application, and is a specification of a playlist that is played back automatically when a title is selected.

The "Cache In of the class archive file" is a process for reading a class archive file, which is a target of the class load, into the cache preliminarily. The "Cache Out of the class archive file" is a process for deleting a class archive file from the cache. The "correspondence between keys and events" is resulted from the process where an event, which has been registered in the event listener of the application, is assigned to a key that can be operated by the user. There are other operation mode objects for causing the playback device to operate by using navigation commands.

This completes the explanation of the main story content. Next, the protected content for mobile terminal will be explained in detail The protected content for mobile terminal is a content for taking out that is the same in part as the main story content, but is different in the storage and protection formats, and includes a stream file 207, a program information file 208, a management information file 209, and a copy information storage file 210. Of these, the stream file 207, program information file 208, and management information file 209 are management information which correspond to the stream file 201, stream information file 202, and playlist information file 203 constituting the main story content, respectively. However, the copy information storage file 210 is unique to the protected content for mobile terminal.

The copy information storage file 210 is a file storing copy information. The copy information includes content IDs. The content IDs are 128-bit identifiers assigned by the content provider to the protected contents for mobile terminal for the sake of identification thereof. With regard to the protected contents for mobile terminal that are targets of the machine unique functions, the content IDs are managed in the database of the server. The content IDs are assigned so that each content for mobile terminal can be identified uniquely. A certain number of upper bits in the identifier are used to identify the content provider.

This completes the explanation of the recording medium pertaining to the present invention. The following describes the internal structure of the playback device pertaining to the present invention.

Figure 3:
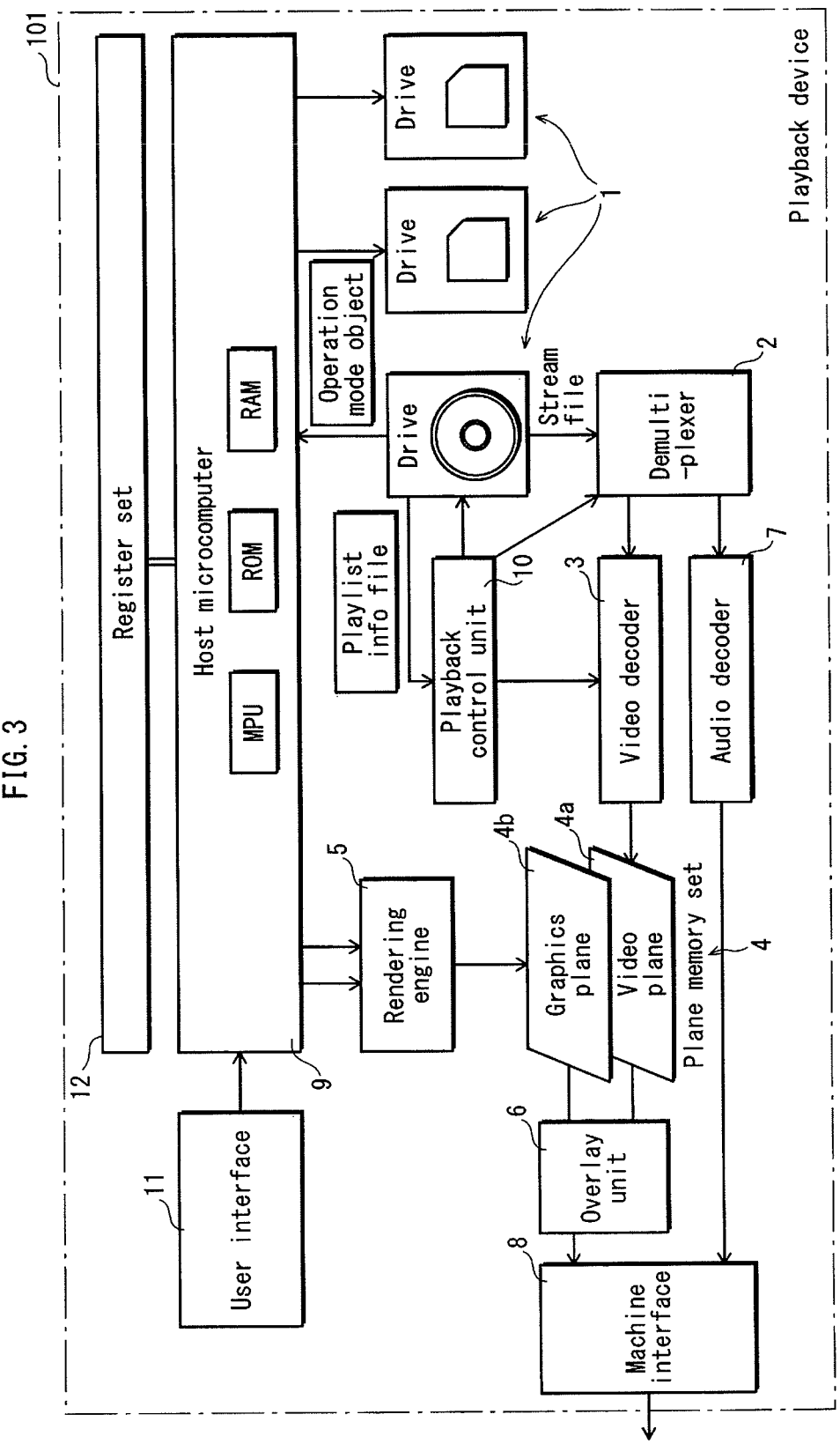
FIG. 3 illustrates the internal structure of the playback device.

FIG. 3 illustrates the internal structure of the playback device. As shown in FIG. 3, the playback device includes a drive device 1, a demultiplexer 2, a video decoder 3, a plane set 4, a video plane 4a, a graphics plane 4b, a rendering engine 5, an overlay unit 6, an audio decoder 7, a machine interface 8, a host microcomputer 9, a playback control unit 10, a user interface 11, and a register set 12.

The drive device 1 has a drive for the read-only medium 105 and a drive for the secure memory card 104. The drive for the read-only medium 105 holds the read-only medium 105 loaded therein, and reads a sequence of source packets constituting the digital stream from the read-only medium 105 via a buffer. The drive for the secure memory card 104 holds a recording medium such as the secure memory card 104 loaded therein and accesses the recording medium. When the secure memory card 104 is loaded in the mobile terminal 106 connected with the playback device via a USB cable or the like, the drive of the mobile terminal 106 is also assigned with a slot number and is managed as a "drive". The drives of the secure memory card 104 are managed in units of "slots". A list of devices that indicates, in association with a plurality of slot numbers, the states of the read-only medium 105 and the secure memory card 104 loaded in the drives is called a "device list".

The demultiplexer 2 obtains PES packets by demultiplexing the sequence of source packets read out from the read-only medium 105, and outputs the PES packets to corresponding decoders.

The video decoder 3 decodes a read-out video stream and writes non-compressed pictures onto the plane set 4.

The plane set 4 is composed of a plurality of plane memories. The plane memory is a memory for storing one screen of pixel data in units of lines so that the pixel data can be output in accordance with the horizontal and vertical sync signals. Each plane memory stores one screen of pixel data that is obtained by decoding a video, subtitle, GUI, or background image.

These plane memories constitute a layer model. The data stored in these plane memories are used for the layer overlay. The layer overlay is achieved by executing a superimposing process onto all combinations of the two layers in the layer model. In the superimposing process, pixel values of pixel data stored in the plane memories of the two layers are superimposed.

The video plane 4a, one of the plane memories constituting the plane set 4, stores non-compressed picture data having a resolution 1920×1080.

The video plane 4b, one of the plane memories constituting the plane set 4, stores non-compressed graphics that is to be superimposed on the video plane. Note that the "graphics" here means what is displayed by pixel data in the ARGB format stored in the graphics plane, and includes bit maps of characters and signs obtained by expanding the text codes by using the fonts, and GIF/JPEG/PNG images (called "drawing images") obtained by decoding the GIF/JPEG/PNG data.

The rendering engine 5 is provided with basic software such as Java2D or OPEN-GL, obtains an image or a widget by decoding JPEG data or PNG data in accordance with a request by the bytecode application, and writes the image or widget onto the graphics plane. Image data obtained by decoding JPEG data is used for the wallpaper of the GUI. Pixel data obtained by decoding PNG data is written onto the graphics plane to realize a display of an animated button. The image or widget obtained by decoding JPEG data or PNG data is used when the bytecode application displays a menu for receiving a selection of a title, subtitle, or audio, or used to represent GUI components when a game coupled with playback of a stream is played. The image or widget can also be used to represent a browser screen of a WWW site when the bytecode application accesses the WWW site.

The overlay unit 6 performs a layer overlay of a plurality of plane memories.

The audio decoder 7 decodes PES packets which, among the PES packets obtained by the demultiplexing, constitute the audio stream.

The machine interface 8, when the playback device is connected with another device in the home theater system via an interface, transfers to the data transfer phase to perform a data transfer, after passing through the mutual authentication phase and the negotiation phase. In the negotiation phase, the capabilities of the partner device (including the decode capability, playback capability, and display frequency) are grasped, and the capabilities are set in the player setting register, so that the transfer method for the succeeding data transfers is determined. After the mutual authentication phase and the negotiation phase, one line of the pixel data in the non-compression/plaintext format in the picture data after the layer overlaying is transferred to the display device at a high transfer rate in accordance with the horizontal sync period of the display device. On the other hand, in the horizontal and vertical blanking intervals of the display device, audio data in the non-compression/plaintext format is transferred to other devices (including an amplifier and a speaker as well as the display device) connected with the playback device. With this structure, the devices such as the display device, amplifier and speaker can receive the picture data and audio data both in the non-compression/plaintext format, and a reproduced output is achieved. Also, when the partner device has the decode capability, a pass-through transfer of the video and audio streams is possible. In the pass-through transfer, it is possible to transfer the video stream and audio stream as they are in the compressed/encrypted format.

The host microcomputer 9 is composed of an MPU, ROM, and RAM, and executes the bytecode application obtained by loading the archive file.

The playback control unit 10 controls the drive device 1 to read the index table, operation mode object, playlist information file, stream information file, and stream file from the read-only medium 105, and performs a playback control based on the playlist information and stream information read from the recording medium. In the reading of a stream file, a random access is available, namely, a source packet corresponding to any time point on the time axis can be read from the stream file.

The user interface 11 receives an operation performed onto the remote control 102.

The register set 12 is composed of a plurality of player status registers and a plurality of player setting registers. The player status registers are hardware resources for storing operands that are used when the MPU of the playback device performs an arithmetic calculation or a bit calculation. When an optical disc is inserted in the playback device, the player status registers are set to the initial values. Also, the validity of the values stored in the player status registers is judged when the status of the playback device is changed (for example, when the current title number or the current playlist number is changed). The values stored in the player status registers include the current title number, current playlist number, and current playback time point. Since the player status registers are set to the initial values when the read-only medium 105 is inserted in the playback device, the values stored therein are temporary, and become invalid when the read-only medium 105 is ejected or when the playback device is powered off.

The player setting registers differ from the player status registers in that they are provided with power handling measures. With the power handling measures, the values stored in the player setting registers are saved into a non-volatile memory when the playback device is powered off, and the values are restored when the playback device is powered on. The values that can be set in the player setting registers include: various configurations of the playback device that are determined by the manufacturer of the playback device when the playback device is shipped; various configurations that are set by the user in accordance with the set-up procedure; and capabilities of a partner device that are detected through negotiation with the partner device when the device is connected with the partner device.

This completes the description of the internal structure of the playback device. The following describes the software layer structure of the playback device.

Figure 4:
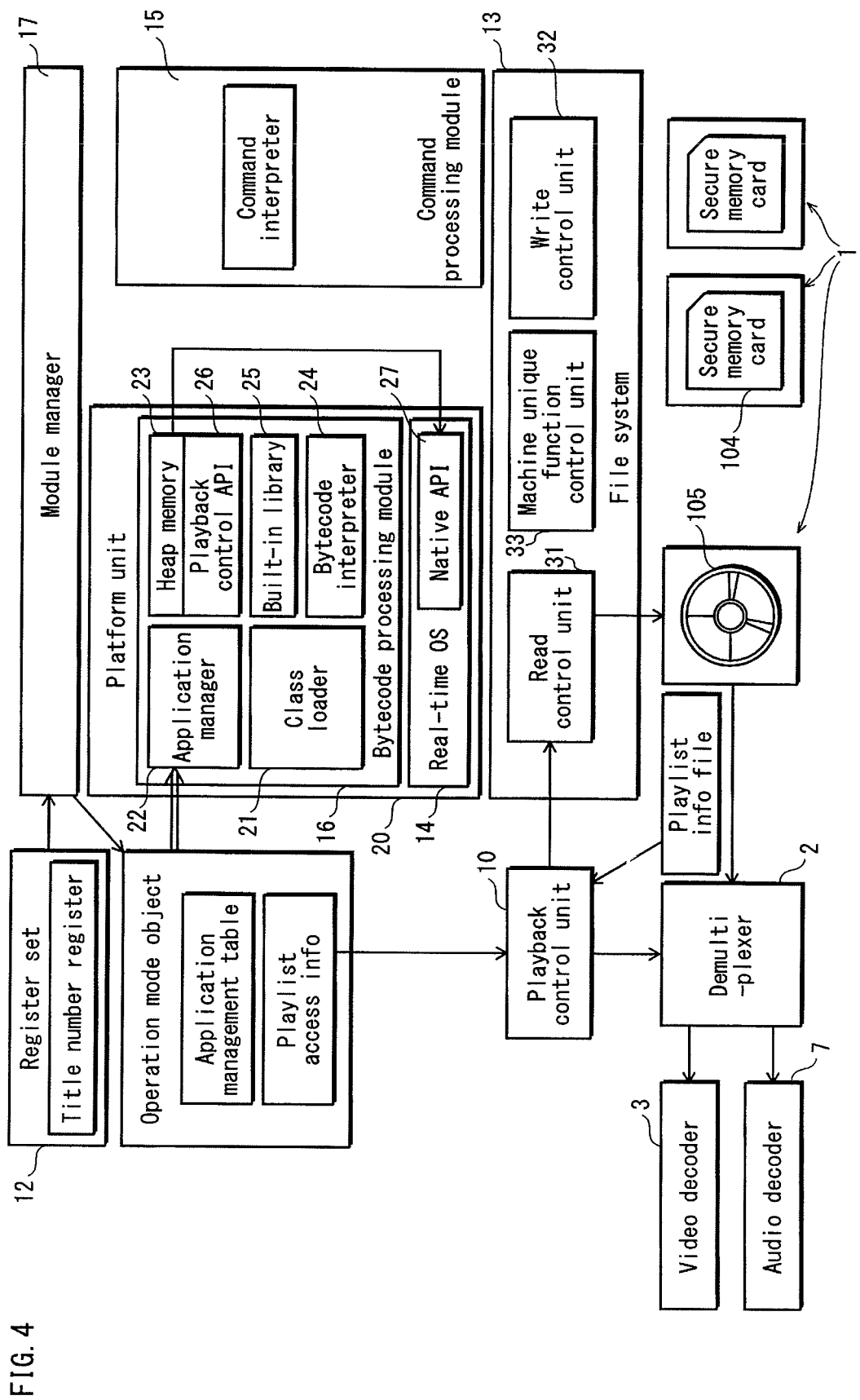
FIG. 4 illustrates the software layer structure of the playback device.

FIG. 4 illustrates the software layer structure of the playback device.

The basic layer structure is composed of a file system 13 and a real-time OS 14. In a layer above the basic layer, a command processing module 15 and a bytecode processing module 16 are present in parallel. In a layer above this layer, a module manage is present.

The file system 13 allows the read-only medium 105 or the secure memory card 104 to be accessed in units of directory files or the like.

The real-time OS 14 is an operating system (for example, Linux) for the built-in software, and is composed of the kernel of the operating system and a basic input/output unit.

The command processing module 15, including a command interpreter, decodes and executes a navigation command, and selects a playlist to be played back, depending on the result of the execution. The navigation command is written in a similar syntax to the DVD-Video. Accordingly, by executing the navigation command, the playback device can realize a DVD-Video-like playback control. For example, when the playback device plays back a BD-ROM, the command processing module 15 corresponds to the HDMV module.

The bytecode processing module 16, provided in a platform unit 20, runs an instance of a class structure in the archive file recorded on the read-only medium 105. The bytecode processing module 16 corresponds to, for example, a BD-J module when the playback device plays back a BD-ROM.

The module manager 17 holds the index table read from the read-only medium 105, and performs the mode management and branch control. The mode management performed by the module manager 17 is a module assignment in which it assigns a dynamic scenario to either the command processing module 15 or the bytecode processing module 16.

In the above layer structure, the real-time OS 14 and the bytecode processing module 16 constitute a platform unit 20 of the bytecode application. The platform unit 20 is provided with a programming interface that can be used by the bytecode application. The programming interfaces that can be used by the bytecode application include: a playback control programming interface that has been standardized for the playback control of digital stream using the playlist information; and a communication control programming interface that has been standardized for the communication.

Next, the internal structure of the bytecode processing module 16 will be described. The bytecode processing module 16 includes a class loader 21, an application manager 22, a heap memory 23, a bytecode interpreter 24, a built-in library 25, and a playback control API 26.

The class loader 21, which is one of the system applications, loads the bytecode application by reading a byte code from a class file stored in the archive file, and storing the byte code into the heap memory 23.

The application manager 22, which is one of the system applications, performs an application signaling for the bytecode application, such as starting or terminating the bytecode application, based on the application management table in the operation mode object.

The heap memory 23 is a stack area in which are arranged the bytecodes of the system application and the built-in library, the bytecodes of general application that are targets of the application signaling, and parameters used by these bytecode applications.

The bytecode interpreter 24 converts a bytecode stored in the heap memory 23 into a native code and causes the MPU to execute the native code.

The built-in library 25 provides the AV playback function, network communication function, and medium access function for the bytecode application. The AV playback function, network communication function, and medium access function have been standardized by standardization associations.

The playback control API 26 is a standardized playback control programming interface, and is a programming interface for providing the bytecode application with the playback control function via the built-in library 25.

This completes the description of the bytecode processing module 16. The following describes the internal structure of the real-time OS 14 and the file system 13. The real-time OS 14 includes a native API 27. The file system 13 includes a read control unit 31, a write control unit 32, and a machine unique function control unit 33.

The native API 27 is a programming interface for providing the bytecode application with the basic functions of the real-time OS 14, and is also a communication programming interface in the OSI reference model. The API for allowing the use of the basic functions of the real-time OS 14 is also called a "system function". The above native API 27 includes basic APIs for communication, and can support the TCP/IP and UDP/IP.

The read control unit 31 controls the file reading to read out files constituting the main story content and files constituting the protected content for mobile terminal from the read-only medium 105, and provide the bytecode processing module 16 with the read-out files.

The write control unit 32 controls the file writing to receive files constituting the protected content for mobile terminal from the read control unit 31, and write the files onto the secure memory card 104.

The machine unique function control unit 33 realizes functions that are unique to the machine. In the present description of the invention, the machine unique functions refer to functions that can be executed only by player machines manufactured by the manufacturer that developed the playback device, and cannot be executed by player machines manufactured by other manufacturers.

There are various machine unique functions. For example, in the case where the playback device is provided with functions of a game machine, the machine unique functions are functions that are available only on an operation device dedicated to the game machine. In the case of an operation device that detects an operation of the user from a movement of the device itself made while held by the person, or an operation device that detects an operation of the user by detecting a movement of a person, the machine unique functions are functions that are available only on the operation device and unique to the game machine. Furthermore, online functions unique to the game machine may be the machine unique functions. If the above various types of functions were to be the machine unique functions, the explanation would be complicated. Accordingly, in the following description, it is presumed that the copy function described in Patent Literature 1, namely, the copy function for copying the content for taking out shown in FIGS. 2A and 2B is the machine unique function.

The use of the machine unique function by the bytecode application is restricted. That is to say, only bytecode applications created by content providers who are permitted to use the machine unique function can use the machine unique function. Bytecode applications created by content providers who are not permitted to use the machine unique function cannot use the machine unique function. To check whether or not a content provider is permitted to use the machine unique function, the machine unique function control unit transmits a pair of a content ID and a serial number to the external server and causes the server to judge whether or not the content provider, who is the supply source of the main story content, is an authorized licensee for using the machine unique function (an entity permitted to use it). When the server judges that it is an authorized licensee, the machine unique function is executed; when the server judges that it is not an authorized licensee, the machine unique function is not executed.

The following will describe the bytecode application that realizes the process using the machine unique function in the above layer structure.

The bytecode application in the present embodiment is characterized in that command-response-type communications with the machine unique function control unit 33 are performed via the local communication in the terminal by the socket protocol.

Here, the "socket" refers to a bound combination of one of predetermined port numbers and an IP address of the local host, and in the socket communication, the on-media library transmits a command to the machine unique function control unit, and receives a response from the machine unique function control unit.

The socket protocol first executes four steps: a socket creation step for receiving a request; a bind step for binding the IP address (address information of the server) and port number with the socket; a listening step for preparing a connection request by setting a request connection queue; and an accept step for creating a new socket connection by receiving a request waiting for a connection and establishing a socket connection, and then the socket protocol performs the steps of transmitting a command and receiving a response via the socket connection.

Among these steps, the socket creation step, bind step, listening step, accept step, and transmission/reception step are performed by using system functions such as the socket function, bind function, listen function, accept function, send function, recv function, and closesocket function. Also, the binding of the IP address and port number with the socket is performed in the SOCKADDR_IN structure. These function and structures are provided by the native API 27 of the real-time OS 14. The socket protocol using the local communication in the terminal is provided by the native API of the real-time OS 14, except for the special ports to be used therein. Therefore the bytecode application can use the machine unique function only by using the native API 27 of the real-time OS 14, without use of the built-in library 25 in the bytecode processing module 16.

As the IP address for use in the local communication in the terminal, the IP address of the local host is used. Here the local host means a system that is currently used, and the TCP/IP is used as necessary for performing a communication with the terminal itself. For example, the IP address of the local host in IPv4 is "127.0.0.1", and the IP address of the local host in IPv6 is a loop-back device assigned to "::1".

The socket protocol exclusively uses a port called "copier's socket port". For this reason, the port number for the digital copy process is implemented independently. To notify the port number to be used in the process, the bytecode application needs to determine a set of port numbers to be used in the process.

The bytecode applications that realize processes using the machine unique function fall under three types: (1) the on-media library that provides other bytecode applications with a programming interface for using the machine unique function; (2) the bytecode application that realizes an interactive control with use of a programming interface for the machine unique function; (3) the integrated bytecode application in which the functions of the on-media library and bytecode application above are integrated.

The following explains the on-media library that provides for a programming interface for use of the machine unique function.

Figure 5:
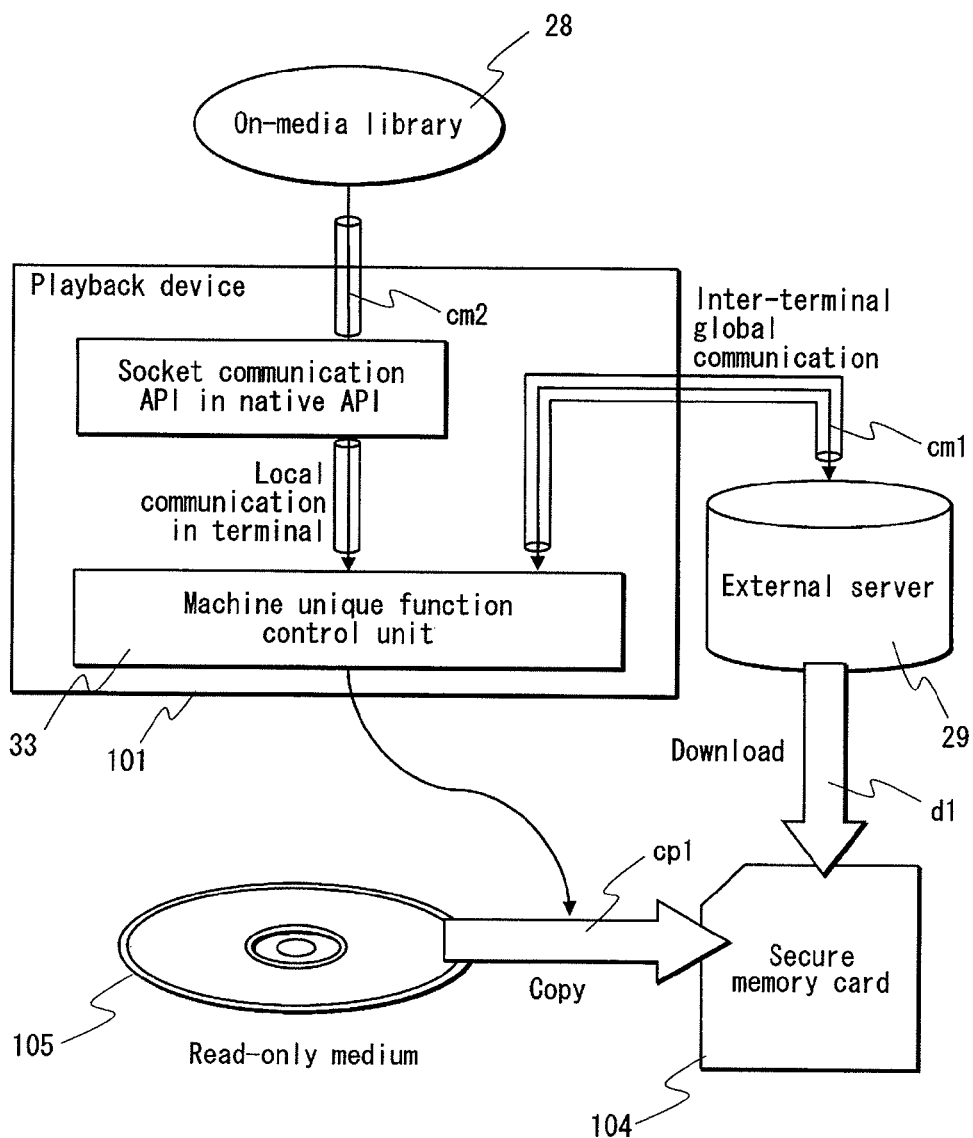
FIG. 5 illustrates the external server 29 and the machine unique function control unit 33 in the playback device.

FIG. 5 illustrates an on-media library 28, a machine unique function control unit 33 in the playback device, and an external server 29. In the following, the on-media library 28 and the external server 29 are described.

The on-media library 28 is a library for data transmissions/receptions with the machine unique function control unit 33 via local network accesses so that it can be supplied from the read-only medium 105 for data transmissions/receptions separated from the other bytecode applications. The built-in library 25 is built in the playback device. The on-media library 28 is different from the built-in library 25 in that it is supplied from the read-only medium 105. The protocol used for the data transmissions/receptions with the machine unique function control unit 33 does not depend on each bytecode application, but is defined as a protocol common to a plurality of bytecode applications. The protocol for a digital copy using local network accesses between the on-media library 28 and the machine unique function control unit 33 is call "digital copy socket protocol". The digital copy socket protocol converts an API provided by the on-media library 28 to a bytecode application into a command on the digital copy socket protocol (the command is called "digital copy socket command"), and performs, by the socket communications, a transmission of a command to the machine unique function control unit 33 and a reception of a response from the machine unique function control unit 33.

The external server 29 manages playback devices that can use the machine unique function, and contents that can be targets of the machine unique function. The external server 29, upon a request by the machine unique function control unit 33, updates the use history of the machine unique function and permits a use of the machine unique function.

The following explains how data flows among the on-media library 28, the machine unique function control unit 33, and the external server 29 described above, with reference to FIG. 5. In FIG. 5, the read-only medium 105 and the secure memory card 104 are illustrated at the bottom, with the playback device and the server thereabove, and the on-media library 28 on top thereof. The pipe cm2 represents communications between the on-media library 28 and the machine unique function control unit 33. The communications are local communications in the same terminal, and are performed via the native API 27. The arrow cp1 represents a copy from the read-only medium 105 to the secure memory card 104. The copy is a writing of management information to use the machine unique function, and is performed in accordance with an instruction received from the on-media library 28 by a local communication in the terminal.

The pipe cm1 represents communications between the on-media library 33 and the external server 29. The communication is an inter-terminal global communication. Downloading of data into the secure memory card 104 is performed when the machine unique function control unit 33 sends a communication request to the external server 29 via the global network. As described above, the present embodiment makes it possible to call functions that are unique to a terminal and are not defined as APIs of a bytecode processing module, by using socket communication APIs, which are conventional network APIs, toward inside the terminal. Conventionally, bytecode applications like BD-J applications in the BD-ROM have used network APIs mainly for connections with an external server to download additional contents such as a bonus image and an additional subtitle/application. The present embodiment makes it possible to perform local communications in the same terminal without expanding the network APIs. With this structure, the bytecode applications can access the currently running playback terminal as if it is a server, and can call various functions without being bound by the existing APIs.

This completes the explanation of the machine unique function control unit 33. Next, the procedure performed by a bytecode application to use the machine unique function will be explained.

Figure 6:
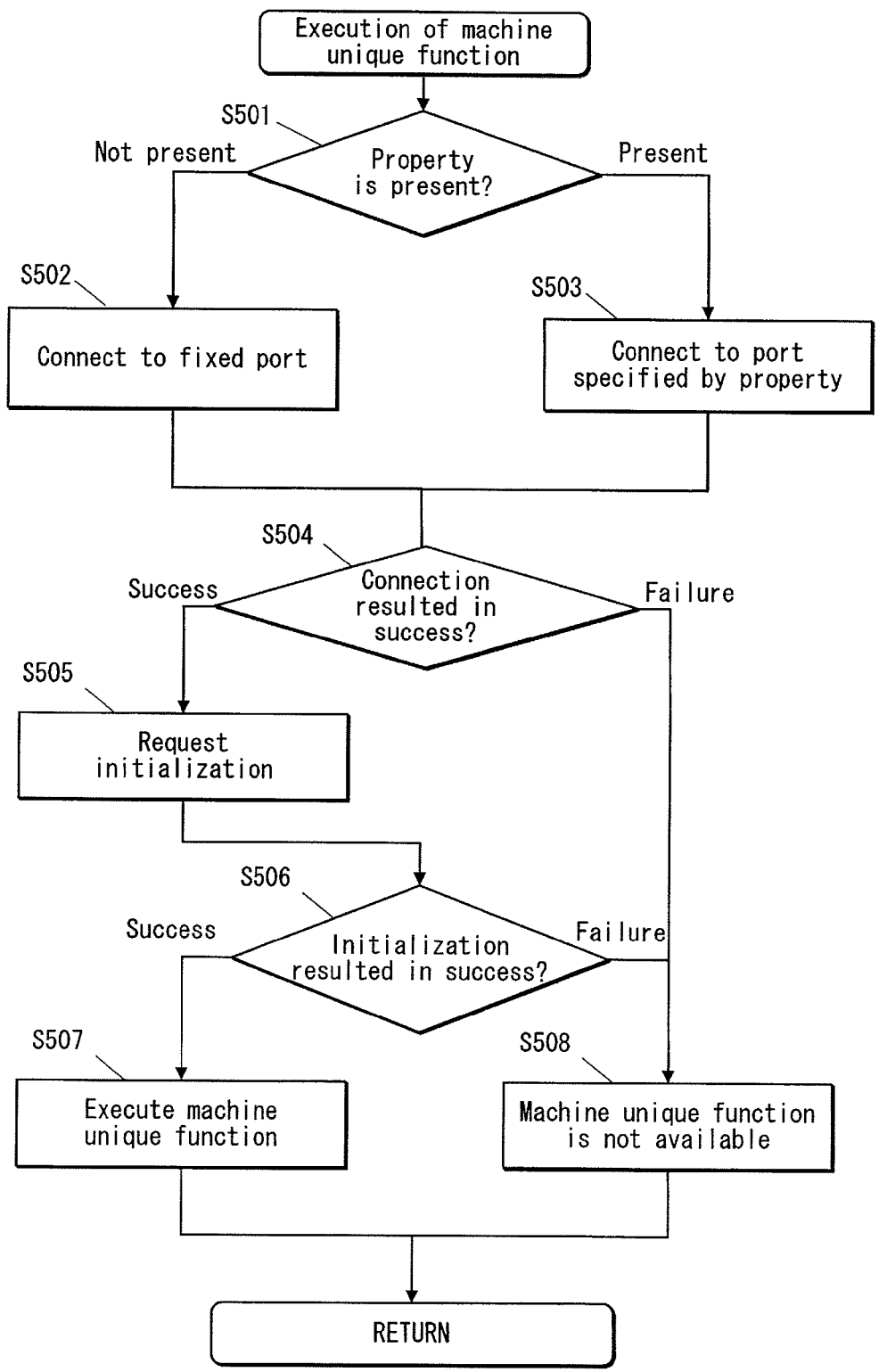
FIG. 6 is a flowchart of the procedure performed by a bytecode application to use the machine unique function.

FIG. 6 is a flowchart of the procedure performed by a bytecode application to use the machine unique function.

First, the bytecode application judges whether or not the playback device supports the digital copy. When the bytecode application requests the on-media library 28 to check whether or not the playback device supports the digital copy, the on-media library 28 judges whether a system property ("digitalcopy.port") indicating a communication port assigned to the digital copy is present (step S501).

When it is judged in step S501 that the system property is not present, a connection is made to a fixed port (step S502). When it is judged in step S501 that the system property is present, a connection is made to a port specified by the system property (step S503). Subsequently, it is judged whether or not the connection to the communication port resulted in a success (step S504). When the connection to the communication port has resulted in a failure, it is determined that the current playback device does not support the digital copy (step S508).

When the connection to the communication port has resulted in a success, the digital copy library requests the machine unique function control unit 33 to perform an initialization via the communication port (step S505). The digital copy library receives a response to the initialization request sent in step S505 from the machine unique function control unit 33 via the currently connected communication port (step S506). When an initialization success response is received in step S506, which means that the current playback device can execute the machine unique function, the machine unique function is executed (step S507). When no response is received or an initialization failure response is received from the machine unique function control unit 33 in step S506, which means that the current playback device cannot execute the machine unique function, the machine unique function is not executed and the process returns (step S508). In this way, the bytecode application makes a judgment on the executability of the machine unique function based on the results of judgments on whether or not the port connection has resulted in a success and whether or not the initialization of the machine unique function control unit 33 has resulted in a success.

As described above, according to the present embodiment, the machine unique function is provided to the bytecode application by using a socket function supported as a native API. With this structure, it is possible to cause an application to use the machine unique playback function without making an addition or change to the API for the digital stream playback control that has already been standardized. It is expected that, when it becomes possible to cause an application to use the machine unique function without making an addition or change to the API for the digital stream playback control that has already been standardized, various applications using special functions will be developed and brought to the market by various content providers. As a result, a variety of user interfaces for activating the special functions will be available, and the users will be able to use special functions developed by manufacturers, via user interfaces that are easier to use and more user-friendly.

As far as a special function is implemented as a machine unique function, it is possible to prevent follower manufacturers to provide similar products. It is therefore possible for a few products, in which a special function developed by a manufacturer as a machine unique function, to be sold exclusively in the market.

Embodiment 2

In Embodiment 1, the machine unique function is not specifically indicated. In the present embodiment, an explanation will be made on the premise that the machine unique function is a digital copy. The digital copy dealt with in the present embodiment is a function to copy a content for taking out from the read-only medium 105 to the secure memory card 104 so that the content can be viewed on the mobile terminal, namely an inter-media copy. A service for allowing a content in the read-only medium 105 to be taken out via the mobile terminal, which is realized when the playback device executes the inter-media copy under the control of the external server, is called "e-move service". The content (namely, a content for taking out), which is the target of the e-move service and thus is presumed to be taken out, is called "e-move content".

The advantages of the e-move service over the existing similar functions or services are as follows.

One of the existing similar functions is Managed Copy in the AACS, and one of the existing similar services is Digital Copy by Apple Inc.

Managed Copy in the AACS requires transcoding. For example, an AV stream for two hours of playback needs to be subjected to two hours of transcoding process. On the other hand, the e-move service only requires the process of writing a content recorded on the read-only medium 105 to the secure memory card 104. The time required for the process is far shorter than transcoding.

In Digital Copy by Apple Inc., a BD-ROM, as well as a DVD-Video disc and a DVD-ROM disc on which a content for copying is recorded, are included in the same set package so that the user can copy data to the memory card by inserting the DVD-ROM disc into a personal computer to cause a program recorded thereon to run on the personal computer. Digital Copy is not desirable for the user in that it is expensive because its package contains the BD-ROM, DVD-Video and DVD-ROM discs.

Compared with such Digital Copy, the e-move does not require a DVD-ROM disc for causing the PC to execute Digital Copy since the e-move service directly causes the bytecode application recorded on the read-only medium 105 to copy the content for taking out.

This completes the explanation of the e-move service. Next, the inter-media copy will be explained in detail.

A copy of the protected content for mobile terminal for personal use is permitted under the right management of an external server. Accordingly, the digital copy by the machine unique function control unit 33 needs to be performed under the right management of a digital copy server, one of external servers.

The following explains the digital copy module 35 and the digital copy server 36 for the right management.

Figure 7:
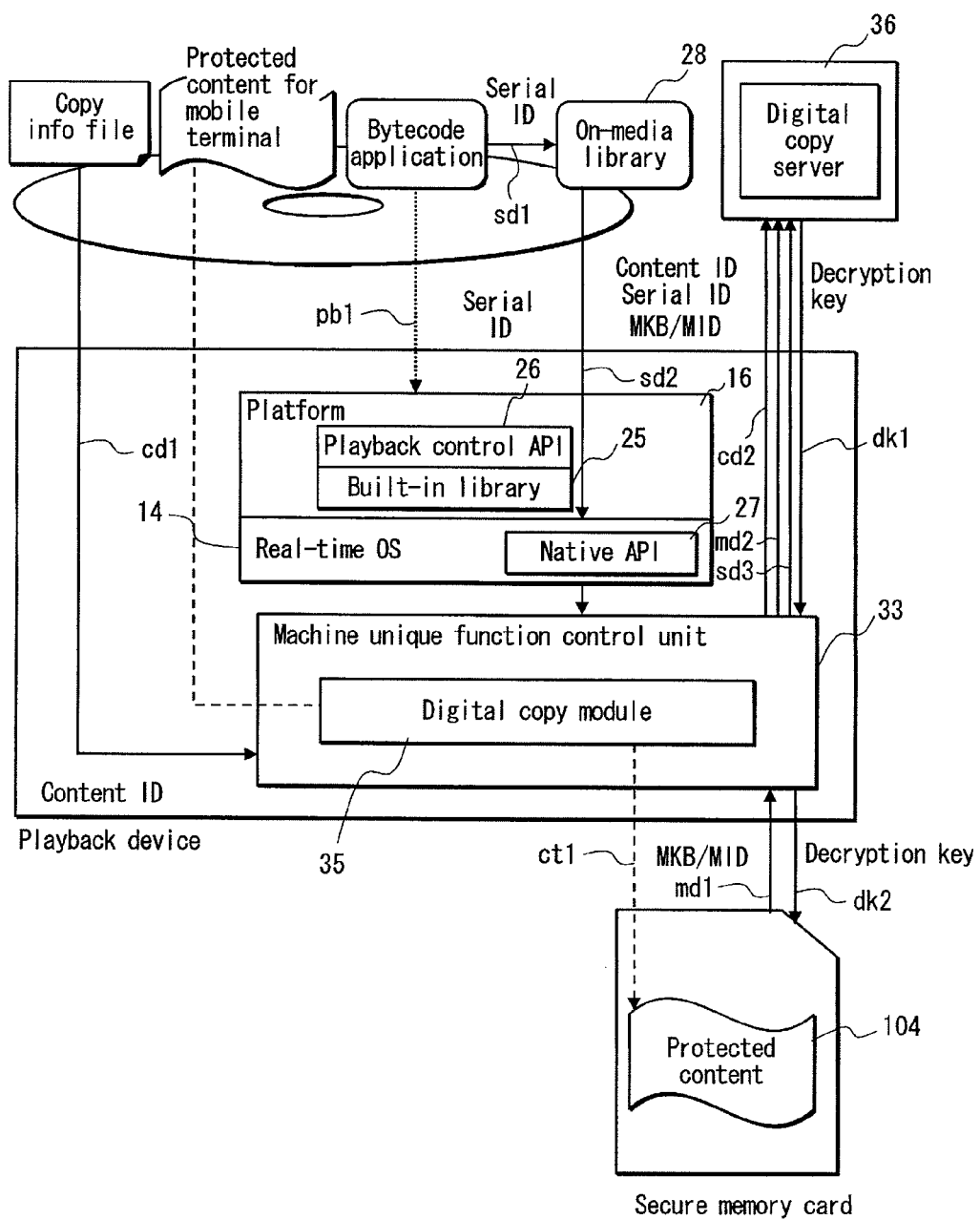
FIG. 7 illustrates the data flow between the inside and outside of the playback device in the digital copy.

FIG. 7 illustrates the data flow between the inside and outside of the playback device in the digital copy. To realize the digital copy, the machine unique function control unit 33 is provided with the digital copy module 35, and the external server 29 is replaced with the digital copy server 36.

The digital copy module 35 copies files constituting the protected content for mobile terminal by reading the files constituting the protected content for mobile terminal from the read-only medium 105, and writing the files onto the secure memory card 104. A plurality of parameters for file reading/writing are preliminarily set in the digital copy module 35, and the digital copy module 35 performs the pre- and post-processing of the copy based on these parameters.

The plurality of parameters include a current serial ID, current source location, current server URL, current output device, and current resume position. In the pre-processing performed by the digital copy module 35, the remaining number of times of copying the target protected content for mobile terminal is obtained from the server. More specifically, the digital copy module 35 extracts a content ID from a copy information file under the directory of the read-only medium 105 that is identified by the file path indicating the current source location, and extracts a medium ID from the secure memory card 104 loaded in the drive that is identified by the current output device. The digital copy module 35 transmits the combination of the content ID, medium ID, and current serial ID to a server identified by the current server URL, causes the server to search the database for the remaining number of times of copying that matches the combination, and the digital copy module 35 returns the remaining number of times of copying, which is extracted by the server as a result of the search, to the bytecode application.

In the post-processing, which is performed to download what is called a "decryption key", the digital copy module 35 transmits the combination of the content ID, serial ID, medium ID, and current output device to the server to cause the server to search the database for a title key that matches the combination, extract the title key, and generate a decryption key, and the digital copy module 35 downloads the decryption key to the secure memory card 104.

The digital copy server 36 has the database of title keys in correspondence with a plurality of serial IDs used in the right management of the protected contents for mobile terminal. The database manages the title keys in one-to-one correspondence with the serial IDs. When the digital copy server 36 receives a search request together with the combination of the content ID, serial ID, medium ID, and MKB to be used as the key words, from the machine unique function control unit 33, the digital copy server 36 searches the database for a title key that matches the combination, reads out the title key, encrypts the title key by using the content ID, serial ID, medium ID, and MKB, obtains a decryption key, and downloads the decryption key to the digital copy module 35, the request source having requested the search.

Also, the digital copy server 36 manages a plurality of copy tickets in correspondence with combinations of a content ID, serial ID, and medium ID. The copy ticket is right management information for managing the permitted number of personal copies for each combination of a content ID, serial ID, and medium ID. In the present embodiment, the permitted number of personal copies is managed based on the remaining number of times of copying determined by the digital copy operating company. Each time a digital copy is performed, the remaining number of times of copying is reduced by one. When the digital copy server 36 receives a search request together with the combination of the content ID, serial ID, and medium ID to be used as the key words, from the digital copy module 35, the digital copy server 36 searches the database for the remaining number of times of copying that matches the combination, reads out and returns the remaining number of times of copying to the digital copy module 35, the request source having requested the search. Here, when the downloading of a title key is performed in response to a search request sent together with the combination of the content ID, serial ID, medium ID and MKB from the digital copy module 35, the remaining number of times of copying is reduced by one. With this structure, the performance of digital copy is restricted to the remaining number of times of copying managed by the digital copy server 36.

In the following, the data flow in the digital copy process will be explained with reference to FIG. 7. In FIG. 7, the playback device is illustrated in the middle, the secure memory card 104 at the bottom, and the read-only medium 105 and the digital copy server 36 at the top.

The main data to be dealt with in the digital copy process includes the serial ID, content ID, medium ID (MID), media key block (MKB), protected content for mobile terminal, and decryption key. The read-only medium 105 stores a file storing the content ID, protected content for mobile terminal, bytecode application, and on-media library 28.

The serial ID is identification information for identifying each read-only medium 105. The database of the digital copy server 36 manages serial IDs of read-only media 105 that are targets of the machine unique function, among the read-only media 105 distributed in the market. As the serial ID, PMSN (Pre-recorded Media Serial Number) recorded in the BCA (Burst Cutting Area) may be used. Other than this, a value of the coupon ID, which is printed on a sheet of paper contained in the package, may be manually entered by the user for use. If the PMSN is used as the serial ID, there is no need for the user to manually enter the value, and the automatic authentication is possible. On the other hand, if the PMSN is used for a rental disc, only a user who first rents the rental disc is entitled to the service, which is unfair to the second user and after. In the case of a rental disc, manual entering of the coupon ID is desirable, and in the case of a marketed disc, the use of PMSN is desirable.

The medium ID (MID is a value recited in the system area of the copy destination medium.

In the operation example illustrated in FIG. 7, what is copied is a protected content for mobile terminal, and what is downloaded is a decryption key. In this downloading, the MKB is read out from the secure memory card 104, and is transmitted to the digital copy module 35, together with the content ID and serial ID.

Here, the flow of the serial ID is traced. When a bytecode application obtains a serial ID, the bytecode application does not hand the serial ID directly to the digital copy module 35, but hands it to the on-media library 28, which hands it to the digital copy server 36. As indicated by the arrows sd1, sd2, and sd3, a serial ID specified by the bytecode application is handed to the digital copy library, and then it is handed to the socket communication API, then to the digital copy module 35, and then to the digital copy server 36.

The content ID flows as follows. The content ID is read out and transmitted to the server. The content ID is read out by the digital copy module 35 from the copy information file on the disc specified by the bytecode application, as indicated by the arrow cd1.

The medium ID and MKB are read out by the digital copy module 35 from the system area of the secure memory card 104, the copy destination, specified by the bytecode application, as indicated by the arrow md1.

The serial ID, content ID, medium ID (MID), and MKB obtained in this way are sent to the digital copy server 36 as indicated by the arrows sd3, cd2, and md2. In return, a decryption key is transmitted from the digital copy server 36 as indicated by the arrow dk1. This is downloading from the server. The digital copy module 35 writes the decryption key to the protected area of the copy destination medium as indicated by the arrow dk2. This completes the flow of the main data dealt with in the digital copy process.

The decryption key written to the protected area of the copy destination medium includes key information (a title key) for decrypting the encrypted data in the protected content for mobile terminal. The decryption key has been encrypted so that it can be decrypted by using the MKB recorded in the system area of the copy destination medium.

The completes the explanation of the data flow among the digital copy module 35, digital copy server 36, bytecode application, and secure memory card 104. Next, communications performed between the bytecode application and the machine unique function control unit 33 will be explained in detail.

Figure 8:
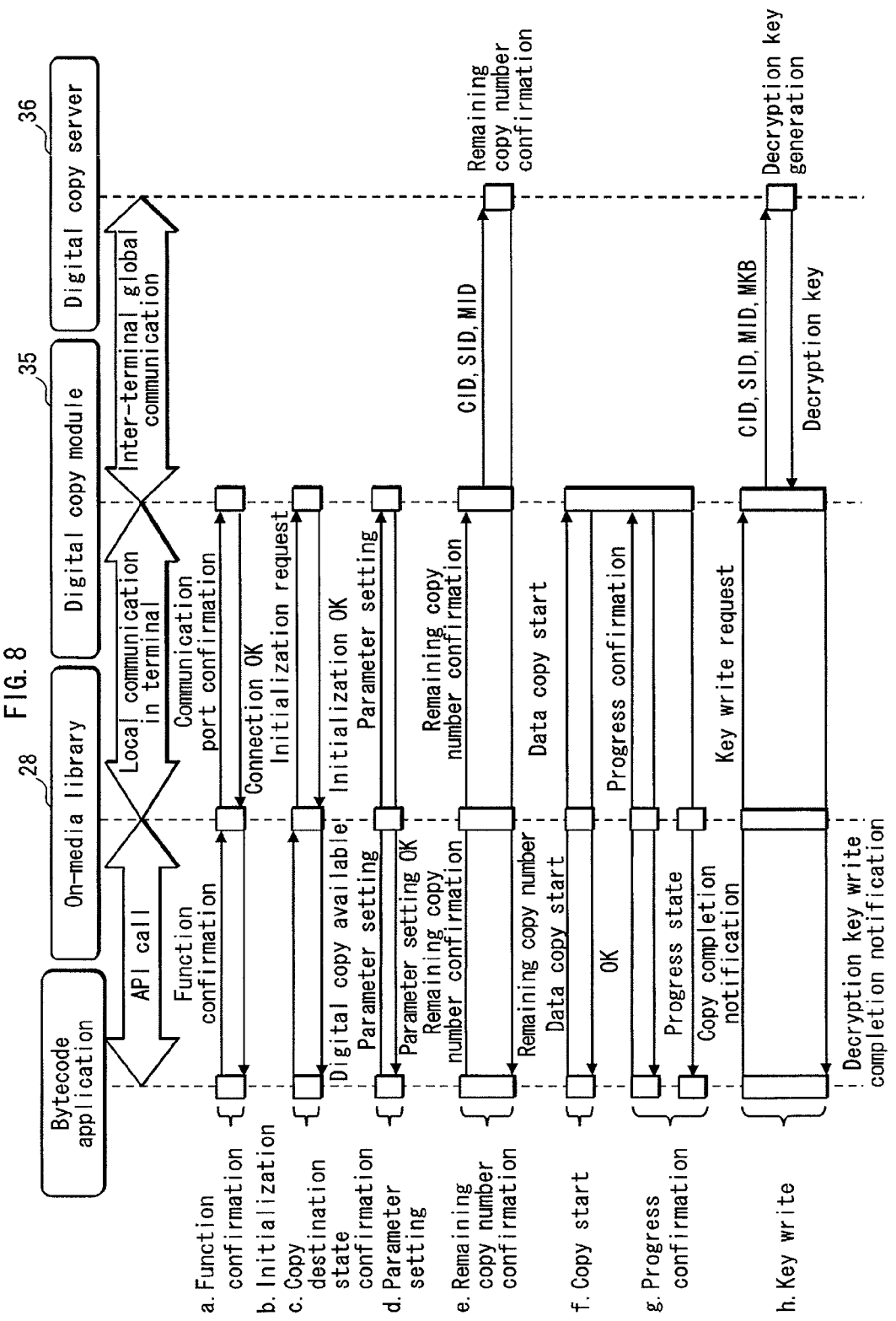
FIG. 8 is a sequence diagram illustrating the data transmissions/receptions performed among the bytecode application, digital copy module 35, and digital copy server 36.

FIG. 8 is a sequence diagram illustrating the data transmissions/receptions performed among the bytecode application, digital copy module 35, and digital copy server 36. FIG. 8 is a sequence diagram indicating the communication sequence in the system. The bytecode application, on-media library 28, digital copy module 35 and digital copy server 36 are arranged in the horizontal direction in FIG. 8. A plurality of time axes are drawn in the vertical direction. These time axes are managed by the clock provided in the device. Any time point on the time axes may be a timing for an API call.

A communication path is not established between the bytecode application and the on-media library 28, and only a normal API call in the application is performed. However, a socket communication in the same terminal is performed between the on-media library 28 and the digital copy module 35. With regard to between the digital copy module 35 and the digital copy server 36, a global socket communication between different terminals is formed. The sequence in FIG. 8 is composed of the phases of: a. machine confirmation; b. initialization; d. parameter set; e. remaining copy number confirmation; f. copy start, g. copy progress confirmation; and h. key write. These phases will be described in the following.

The "a. function confirmation phase" is constituted from the following communications between the bytecode application and the digital copy module 35 via the on-media library 28: the bytecode application performs a function confirmation to the on-media library 28; and receives an answer indicating whether the digital copy is available.

The "b. initialization phase" is constituted from the following communications between the bytecode application and the digital copy module 35 via the on-media library 28: the bytecode application performs an initialization to the on-media library 28; and receives an answer indicating whether the initialization is available.

The "d. parameter set phase" is constituted from the following communications between the bytecode application and the digital copy module 35 via the on-media library 28: the bytecode application performs a process of setting copy parameters to the on-media library 28; and receives an answer indicating whether the parameter set is available. That is to say, when the bytecode application receives a notification that the digital copy is available, the bytecode application sets parameters necessary for the digital copy into the digital copy module 35 via the digital copy library.

When these parameters are specified by the bytecode application, the digital copy library transmits the specified parameters to the digital copy module 35 by using a communication port being connected therewith.

The "e. remaining copy number confirmation phase" is constituted from the following communications between the bytecode application and the server via the on-media library 28 and the digital copy module 35: the bytecode application performs a process of confirming the remaining number of times of copying to the on-media library 28; and receives the remaining number of times of copying from the on-media library 28. Subsequently the bytecode application confirms the remaining number of times of copying. In this confirmation of the remaining number of times of copying, as in the setting of the parameters, the bytecode application asks the digital copy module 35 via the digital copy library by using a communication port being connected therewith. Since the remaining number of times of copying is managed by the digital copy server 36, the digital copy module 35, upon receiving the request to confirm the remaining number of times of copying, extracts the content ID, serial ID, and medium ID from the parameters being currently set and sends the values of the three IDs to the digital copy server 36, as indicated by the arrows. The bytecode application, the on-media library 28, and the digital copy module 35 are connected with each other via the local communication in the terminal, and no external Internet connection is necessary for them to perform a communication with each other. However, a global Internet connection is required for the digital copy module 35 and the digital copy server 36 to perform a communication therebetween. The digital copy server 36 detects the remaining number of times of copying based on the received values, and returns the remaining number of times of copying to the digital copy module 35. The digital copy module 35 notifies the bytecode application of the remaining number of times of copying via the digital copy library.

The "f. copy start phase" is constituted from the following communications between the bytecode application and the digital copy module 35 via the on-media library 28: the bytecode application requests the on-media library 28 to start a copy; and receives one of a copy start success, a copy start failure, and a copy completion notification from the on-media library 28. When the bytecode application recognizes that one or more times of copying remain, it requests a copy start. This copy start request is transmitted to the digital copy module 35 via the digital library by using a communication port, as in the above cases. Upon receiving the copy start request, the digital copy module 35 starts a copy, and during the copy, sends a copy progress state in response to a request from the bytecode application as necessary.

The "g. copy progress confirmation phase" is constituted from the following communications between the bytecode application and the digital copy module 35 via the on-media library 28: the bytecode application performs a process of requesting the on-media library 28 to send a progress confirmation; and receives a progress state from the on-media library 28.

The "h. key write phase" is constituted from the following communications between the bytecode application and the server via the on-media library 28 and the digital copy module 35: the bytecode application performs a process of requesting the on-media library 28 to perform a key write; and receives a decryption key write completion notification from the on-media library 28. More specifically, after receiving the copy completion notification, the bytecode application requests the digital copy module 35 to write the decryption key. Upon receiving the decryption key write request, the digital copy module 35 extracts the content ID, serial ID, medium ID and MKB from the currently set parameters, and sends these four values to the digital copy server 36.

The digital copy server 36 generates a decryption key based on the received values, and returns the decryption key to the digital copy module 35. The digital copy module 35 writes the decryption key received from the digital copy server 36 to the copy destination medium, and when the writing is completed, notifies the bytecode application of the completion of the writing via the digital copy library.

This completes the explanation of three communications performed for the machine unique function in the playback device. The following describes the procedure of the digital copy in detail.

Figure 10:
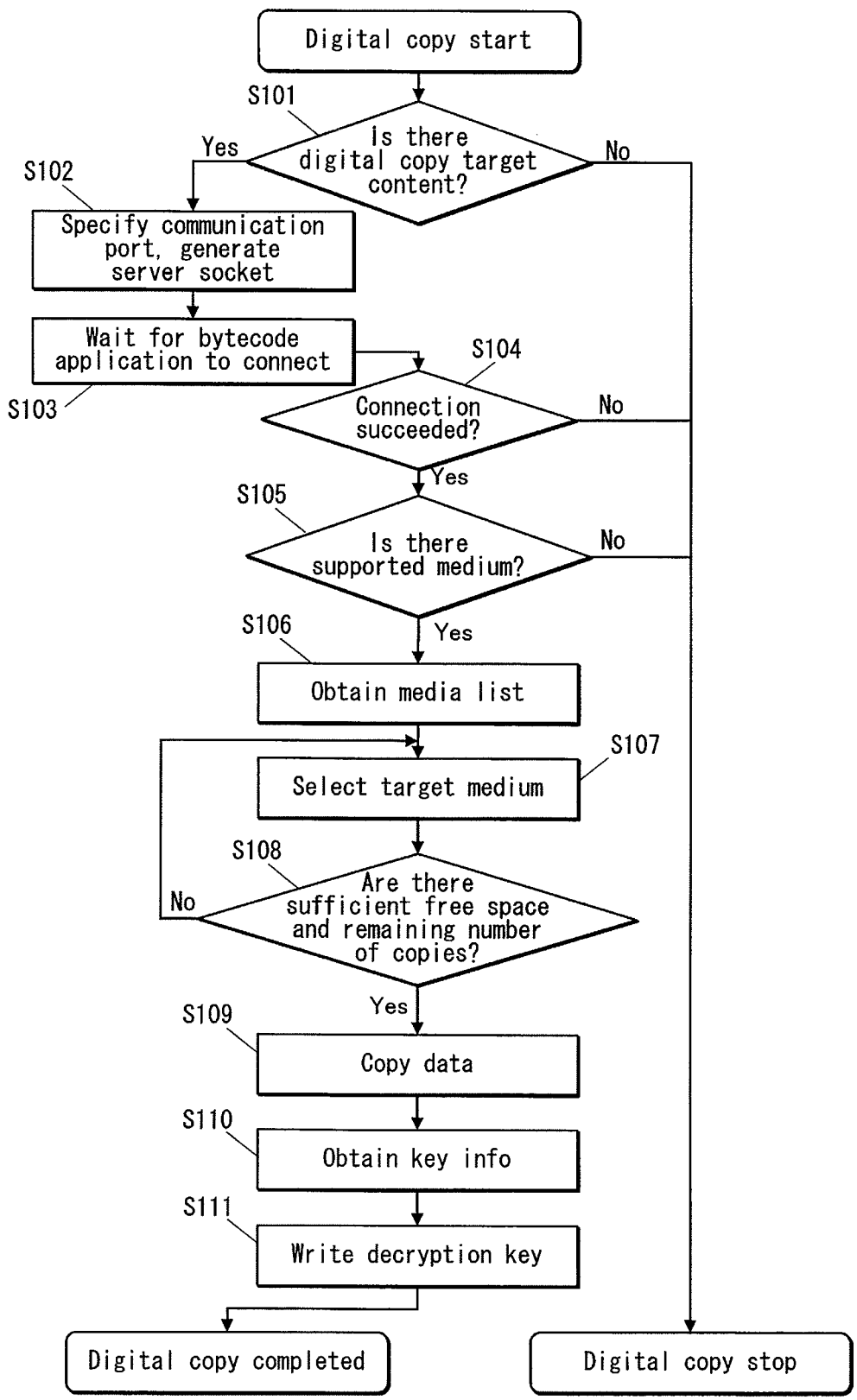
FIG. 10 is a flowchart of the procedure of the digital copy process in the digital copy module 35.

When the digital copy can be executed, the bytecode application executes the digital copy by performing an inter-application communication with the on-media library 28. FIG. 10 illustrates the procedure of the digital copy process by the on-media library 28.

This completes the detailed explanation of the communication sequence. The following describes the internal structure of the digital copy module 35.

Figure 9:
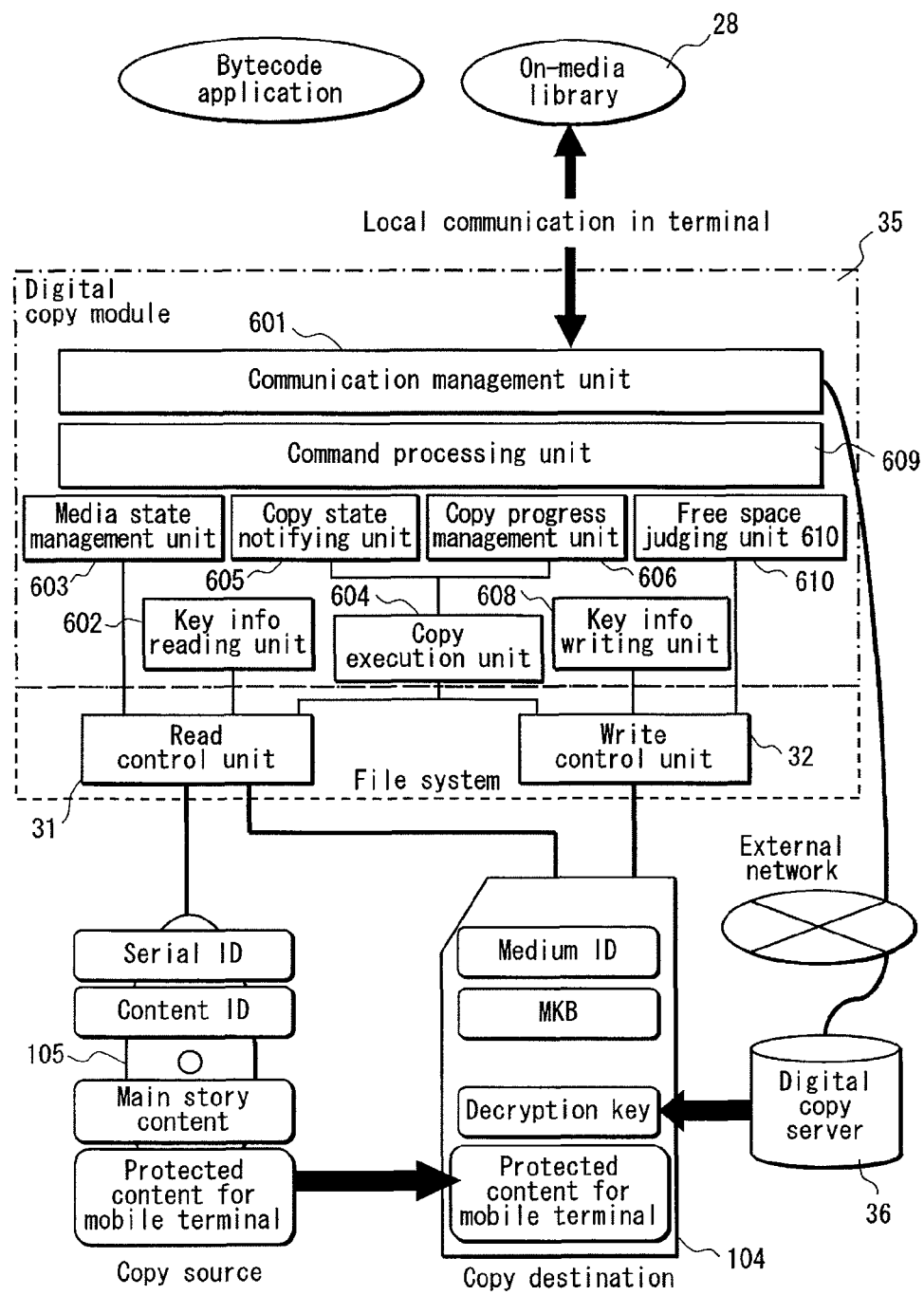
FIG. 9 illustrates a detailed structure of the digital copy module 35.

FIG. 9 illustrates a detailed structure of the digital copy module 35. The digital copy module 35 includes a communication management unit 601, a key information reading unit 602, a media state management unit 603, a copy execution unit 604, a copy state notifying unit 605, a copy progress management unit 606, a key information writing unit 608, a command processing unit 609, and a free space judging unit 610.

The communication management unit 601 assigns one of the communication ports in the playback device to the digital copy control, and performs a protocol communication with the bytecode processing module using this digital copy communication port. More specifically, the communication management unit 601 opens the digital copy communication port as a server socket, waits for a request from the bytecode processing module, and when the digital copy communication port receives data, analyzes the received data, and performs a process corresponding to the analyzed data. The communication management unit 601 returns the analysis results to the bytecode processing module via the digital copy communication port. In addition, the communication management unit 601 manages the data communications with the digital copy server 36. More specifically, the communication management unit 601 performs communications with the digital copy server 36 to obtain a decryption key necessary for decoding the digital stream for the protected content for mobile terminal.

The key information reading unit 602 reads information necessary for generating the decryption key from the read-only medium 105 that is the copy source and from the secure memory card 104 that is the copy destination. More specifically, the key information reading unit 602 reads PMSN (Pre-recorded Media Serial Number) indicating the physical serial ID of the recording medium, from the BCA (Burst Cutting Area) which is a special area provided on the read-only medium 105 (the copy source), and reads information (medium ID) unique to the recording medium and the Media Key Block (MKB) storing key information necessary for generating the decryption key, from the secure memory card 104 (the copy destination).

The media state management unit 603 manages a list of types of media that the playback device can use as the copy destinations currently. For example, when the playback device is provided with an SD card slot and a USB memory slot, and currently only an SD card is inserted, it recognizes the SD card as the current target for the copy destination. When both an SD card and a USB memory (or a mobile terminal connected via USB) are inserted, it judges that both the SD card and the USB memory can be used as the copy destinations. In addition, the media state management unit 603 manages the free space of the copy destination medium.

The copy execution unit 604 performs a process of copying a protected content for mobile terminal specified by the bytecode application from the read-only medium 105 to another medium. The specification by the bytecode application is sent to the digital copy communication port via the on-media library 28. Note that the data copy by the copy execution unit 604 is not sufficient for the protected content for mobile terminal in the copy destination to be played back. The playback of the protected content for mobile terminal in the copy destination becomes possible only after the decryption key is completely written to the copy destination by the key information writing unit 608, as will be described later.

The copy state notifying unit 605 manages the copy state transfer among the start, normal end, abnormal end and the like. The copy state notifying unit 605 notifies the state transfer to the bytecode application that is currently connected with the digital copy module 35 by the local communication, via the digital copy communication port.

The copy progress management unit 606 manages the remaining number of bytes and the number of copied bytes of the copy target, and notifies the current state of progress in response to a request sent from the bytecode application via the digital copy communication port.

The key information writing unit 608 writes a decryption key which is generated based on the serial ID of the read-only medium 105, medium ID of the copy destination medium, and MKB that are obtained by the key information reading unit 602. The decryption key is generated based on a secret key stored in the digital copy server 36. Accordingly, after the key information reading unit 602 obtains the serial ID of the read-only medium 105, medium ID of the copy destination medium, and MKB, the digital copy module 35 transmits these values and the content ID of the copy-target content to the digital copy server 36 via the communication management unit 601. The digital copy server 36 generates a decryption key based on the received values and the secret key held by the digital copy server 36 itself, and transmits the generated decryption key to the communication management unit 601. The decryption key is encrypted so that it can be decrypted by using the MKB of the copy destination medium. After the communication management unit 601 receives the decryption key, the key information writing unit 608 writes the decryption key to the protected area of the copy destination. The decryption key includes key information (a title key) which is used to decrypt an encrypted protected content for mobile terminal.

Without the decryption key including the key information, the protected content for mobile terminal cannot be played back even if only the protected content for mobile terminal is copied to another medium without permission.

The command processing unit 609 performs a control in accordance with an operation code of a command issued by the on-media library 28, by interpreting the command and controlling the communication management unit 601 through the command processing unit 609 by using the operand of the command.

The free space judging unit 610 judges whether or not the copy destination medium has an amount of free space necessary for the copy, based on the remaining amount of free space in the copy destination medium and the content in the copy source.

The digital copy module 35 includes the above structural elements, and the operation of these structural elements can be controlled by the bytecode application that is connected to the digital copy communication port by the local communication connection. An API that can directly control the operation is not included in the bytecode processing module. Thus a bytecode application that is not connected to the digital copy communication port cannot control the operation.

FIG. 10 is a flowchart of the digital copy process performed by the digital copy module 35. The digital copy module 35 first judges whether or not there is a protected content for mobile terminal on the read-only medium 105 having been inserted in the playback device (step S101). When there is a rule that protected contents for mobile terminal should be recorded under the EMOVE directory immediately under the root directory of the disc, the digital copy module 35 makes the judgment on whether or not there is a protected content for mobile terminal on the read-only medium 105 by checking whether or not there is the EMOVE directory on the read-only medium 105. The EMOVE directory is a directory for storing a set of files that are targets of the e-move service.

When it is judged in step S101 that there is no protected content for mobile terminal, the digital copy process is stopped; and when it is judged that there is a protected content for mobile terminal, the digital copy module 35 generates a server socket by specifying a communication port for digital copy socket command, and waits for a connection of the bytecode application to the communication port for digital copy socket command (step S102).

The reason why a server socket is generated on the condition that there is a protected content for mobile terminal is that the period during which the port is opened is desirably as short as possible because resources may be unnecessarily consumed and there might be attacks from unauthorized applications if the server socket is always opened. As a result, a server socket is generated and a port is opened only when it is judged in step S101 that there is a protected content for mobile terminal. Other methods for minimizing the time period for which the port is opened include: a method in which a server socket is generated and a port is opened only when a bytecode application is running (namely, only when a title is played back in linkage with a bytecode application); and a method in which a port is opened after a port open instruction is received from a bytecode application.

The port open instruction is issued while the port is closed, and thus the port open instruction needs to be received by a method other than the port communication. However, adding an API to achieve that would defeat the purpose of the present application that no API is added to maintain the compatibility. Therefore the instruction needs to be received without addition of any API. To have the port open instruction conveyed, for example, a general-purpose system property API is used in the following way: when a value is set in a predetermined property by the bytecode application, or when a predetermined value is set in one of general-purpose registers of a register set, it is recognized that a port open request was made. When a system property API is used, for example, a property name "digitalcopy.portstatus" is prepared in advance so that a port is opened when "OPEN" is set to a value indicated by the property name. After a server socket is generated and a communication port for digital copy socket command is opened in step S102, a bytecode application (including a digital copy library) is waited to connect to the port (step S103). It is desired that the connection request by the bytecode application is made as follows: a predetermined command character sequence (or binary data) is mutually exchanged between the digital copy module 35 and the bytecode application (digital copy library), and each of the two parties confirms whether or not the received data matches the expected value. Naturally, when the received data does not match the expected value, it is judged to be unauthorized, and the subsequent process is stopped (step S104).

When it is judged in step S104 that the digital copy module 35 has succeeded in connecting with the bytecode application, the digital copy module 35 waits for a request for a list of digital copy destination candidates (a list of copy destination media supported by the playback device) to be made by the bytecode application, and when it receives the request via the communication port, the digital copy module 35 confirms the media that are supported by the playback device as copy destinations of the protected content for mobile terminal (step S105). When there is no medium that is supported by the playback device as a copy destination of the protected content for mobile terminal, the digital copy is stopped; and when there are one or more supported media, the digital copy module 35 transmits a list of the media to the bytecode application via the communication port (step S106). At this point in time, the digital copy module 35 may judge whether or not there is a sufficient amount of free space. However, the list of media returned to the bytecode application in step S106 includes media that do not have a sufficient amount of free space and media that have not been inserted. The reason is that, if the list of media, from which media that do not have a sufficient amount of free space have been excluded, is handed, it cannot be judged from which of the reasons certain media are excluded from the list: because they are not supported by the playback device; or because they do not have a sufficient amount of free space. It is desired that the list of media returned to the bytecode application in step S106 includes media that do not have a sufficient amount of free space because, when a medium is supported by the playback device but lacks a sufficient amount of free space, the user can have a choice of securing a necessary amount of free space by deleting unnecessary files from the medium, for example. Similarly, when the list of media returned to the bytecode application includes media that have not been inserted, it is possible to notify the user that he/she has forgot to insert the media.

Next, the bytecode application presents the user with the obtained list of copy destination candidates, and notifies the digital copy module 35 of a medium selected by the user (step S107). The digital copy module 35 judges whether or not with regard to the selected medium, there is a sufficient amount of free space to perform the copy and there is a remaining number of times of copying (step S108). When it is judged that there is not a sufficient amount of free space or a remaining number of times of copying, the digital copy module 35 notifies the bytecode application that there is not a sufficient amount of free space or a remaining number of times of copying. To check the remaining number of times of copying, the digital copy module 35 needs to query the digital copy server 36. When the bytecode application receives from the digital copy module 35 a notification that there is not a sufficient amount of free space, the bytecode application returns to step S107 and urges the user to select another medium or delete unnecessary files, or displays a message suggesting the user to replace the current medium with a medium of the same type and having a larger amount of free space. The confirmation of the free space in the copy destination medium in step S108 includes the confirmation of the free space in not only the user area but the protected area.

When a content decryption key has already been written in the protected area and there is no space for another decryption key to be written therein, it is necessary to notify the bytecode application that there is not a sufficient amount of free space, even if there is free space in the user area. If the amount of free space in the protected area is not checked, the writing of the decryption key in the last step of the digital copy process may result in a failure. When it happens, the user has a time loss and in the worst case, may waste one time of using the copy right away because the decryption key has already been downloaded from the digital copy server 36. Accordingly, the free space in not only the user area but the protected area needs to be checked in step S108. When it is judged in step S108 that there is a remaining number of times of copying and there is a sufficient amount of free space in the copy destination medium, the digital copy module 35 copies the protected content for mobile terminal from the disc to the specified medium (step S109). While the copying is performed, the bytecode application can query the digital copy module 35 about the progress of the copying to grasp the current progress of the copying and display the copy progress state to the user. When the data copying of the protected content for mobile terminal is completed, the digital copy module 35 obtains a decryption key used to decrypt the protected content for mobile terminal, from the digital copy server 36 (step S110). To obtain the decryption key, the digital copy module 35 transmits the serial ID, content ID, medium ID, and MKB to the digital copy server 36 via the network interface. The digital copy server 36 creates the decryption key, which is used by the copy destination medium to decrypt the protected content for mobile terminal, based on a secret key held by the digital copy server 36. The digital copy module 35 receives the decryption key created by the digital copy server 36, and writes the decryption key into the protected area of the copy destination medium (step S111).

As described above, in the present embodiment, the on-media library 28 and the digital copy module 35 copy the protected content for mobile terminal having been recorded on the read-only medium 105 onto the secure memory card 104 by the local communication in the terminal. Accordingly, the manufacturer of the playback device can allow a specified content provider to use the inter-media copy function. This will generate momentum to create contents using the inter-media copy function, and enrich the contents.

Embodiment 3

Figure 11:
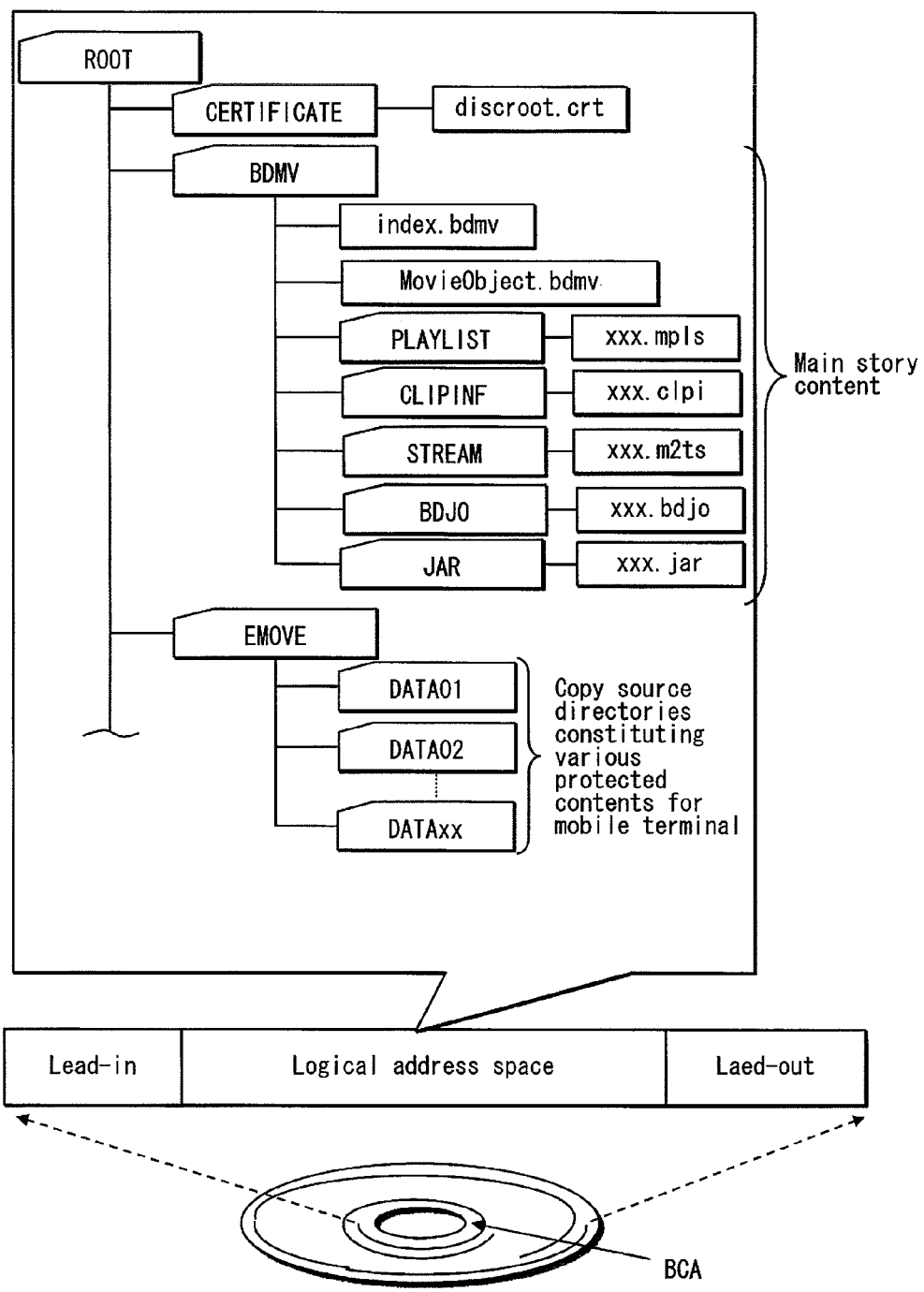
FIG. 11 illustrates the structure of the BD-ROM.

In Embodiment 1, the read-only medium 105, which can be a copy source in a digital copy, also stores the operation mode object and the bytecode application. In the present embodiment, it is presumed that the above recording medium is a "BD-ROM". FIG. 11 illustrates the structure of the BD-ROM (also abbreviated "BD" below). In the present embodiment, the BD-ROM is explained mainly as a recording medium storing an AV application for the playback of an AV content such as a movie. However, the BD-ROM may of course be used as a recording medium for use in a computer, much like a CD-ROM or DVD-ROM. The BD-ROM, like other optical discs such as DVDs and CDs, has a recording area extending spirally from the inner circumference to the outer circumference. Between a lead-in at the inner circumference and a lead-out at the outer circumference is a logical address space in which logical data are recorded. Also, inside the lead-in, there is a special area called the BCA (Burst Cutting Area) that can only be read only by a drive. Because this area cannot be read by applications, it is used for copyright protection technologies and the like. The PMSN (Pre-recorded Media Serial Number), a physical serial number that identifies the recording medium, is recorded in the BCA.

Beginning with file system information (volume), application data such as video data are recorded in the logical address space. The file system is UDF, ISO9660, or the like. Much like in an ordinary PC, a directory and file structure is used so that the recorded logical data may be read out. File names and directory names of up to 255 characters may be read.

In the present embodiment, the directory and file structure of the BD-ROM is as follows. Under a root directory ("ROOT") are arranged a BDMV directory, CERTIFICATE directory, and EMOVE directory. Data such as AV content and management information handled on the BD-ROM are recorded in the BDMV directory. A certificate used in the signature verification of application is recorded as the file "discroot.crt" (fixed file name) which is found under the CERTIFICATE directory.

A main story content is, for example, data filed under the BDMV directory. The storage format by which the digital AV stream constituting the main story content is stored is, for example, BD-Video; and the protection format is, for example, AACS.

AV content and management information for use in mobile terminal viewing is recorded in the EMOVE directory.

For example, the data recorded under the EMOVE directory represent the protected contents for mobile terminal. In the example shown in FIG. 11, respective different protected contents for mobile terminal are recorded in the DATA1, DATA2, and DATA3 directories.

The storage format by which a digital AV stream constituting a protected content for mobile terminal is stored is, for example, SD-Video; and the protection format is, for example, CPRM.

Under the BDMV directory are found five directories, namely a PLAYLIST directory, a CLIPINF directory, a STREAM directory, a BDJO directory, and a JAR directory. Two types of files, "index.bdmv" and "MovieObject.bdmv", are placed in the BDMV directory. The STREAM directory is a directory that stores the files constituting a so-called main body of the digital stream, files with the extension "m2ts" ("xxx.m2ts" where "xxx" is variable and "m2ts" is fixed). In the PLAYLIST directory are found files with the extension "mpls" ("xxx.mpls" where "xxx" is variable and "mpls" is fixed). In the CLIPINF directory are found files with the extension "clpi" ("xxx.clpi" where "xxx" is variable and "clpi" is fixed). In the JAR directory are found files with the extension "jar" ("xxx.jar" where "xxx" is variable and "jar" is fixed). In the BDJO directory are found files with the extension "bdjo" ("xxx.bdjo" where "xxx" is variable and "bdjo" is fixed).

Any file with the extension "m2ts" is an AV digital stream in the MPEG-TS (Transport Stream) format obtained by multiplexing a video stream, one or more audio streams, and one or more sub-picture streams. The video stream represents the video portion of the movie, the audio streams represent the audio portions of the movie, and the sub-picture streams represent the subtitle portions of the movie.

Files with the extension "clpi" are pieces of stream management information that correspond one-to-one to digital AV streams. The stream management information has information such as the digital AV stream encoding format, frame rate, bit rate, and resolution, and has an entry map (EP_map) that shows starting positions of GOPs.

Any file with the extension "mpls" is a file storing the playlist information in which the stream playback section ("In Time/Out Time") is recorded.

Any file with the extension "jar" is a Java archive file that describes program of a bytecode application (BD-J application) which performs the dynamic scenario control using a BD-J object. The above file is necessary for the BD-J application to control the playback of each title that represents a playback unit of a content recorded on the BD-ROM. The above archive file includes a permission request file that permits a socket communication to be performed between the bytecode application and the local host.

Any file with the extension "bdjo" is a file that stores the operation mode object in the BD-J mode.

The file "index.bdmv" (fixed file name) serves as an index table for the entire BD-ROM. The file has an organizationID (32-bit), which is an identifier specifying the film provider, a discID (128-bit), which is an identifier assigned to each BD-ROM supplied by the provider, and other such information. Once the disc has been inserted in the playback device, the first file to be read is "index.bdmv", and thus the disc can be uniquely recognized by the playback device. In addition, "index.bdmv" includes a table indicating the correspondence between multiple titles on the BD-ROM that may be played back and the BD-J objects defining respective titles.

The file "MovieObject.bdmv" (fixed file name) is a file storing navigation commands for the selection of a playlist and reading and writing from/to the player status registers and player setting registers. This completes the explanation of the BDMV directory. The following explains the EMOVE directory.

Under the EMOVE directory, AV digital streams and management information for viewing the content recorded on the BD-ROM on the mobile terminal, and a plurality of copy source storage directories are formed. The DATA01, DATA02, . . . DATAxx in the drawing represent the copy source storage directories. The copy source storage directories are units of targets of digital copies. For example, when four copy targets are present on a BD-ROM, four copy source storage directories (DATA01 directory, DATA02 directory, DATA03 directory, and DATA04 directory) are recorded under the EMOVE directory.

Since a various number of copy source storage directories can be generated, it is possible to generate, preliminarily at the stage of authoring, protected contents for mobile terminal that are in high demand for digital copy, such as a plurality of protected contents for mobile terminal that are different in stream format, and a plurality of various protected contents for mobile terminal that are different in content. This completes the explanation of the directory and file structures of the BD-ROM. Also, a set of files stored in a copy source storage directory can be a target of digital copy. Such a set of files, which can be a target of digital copy because it is stored in a copy source storage directory, is called a "copy source unit".

Figure 12:
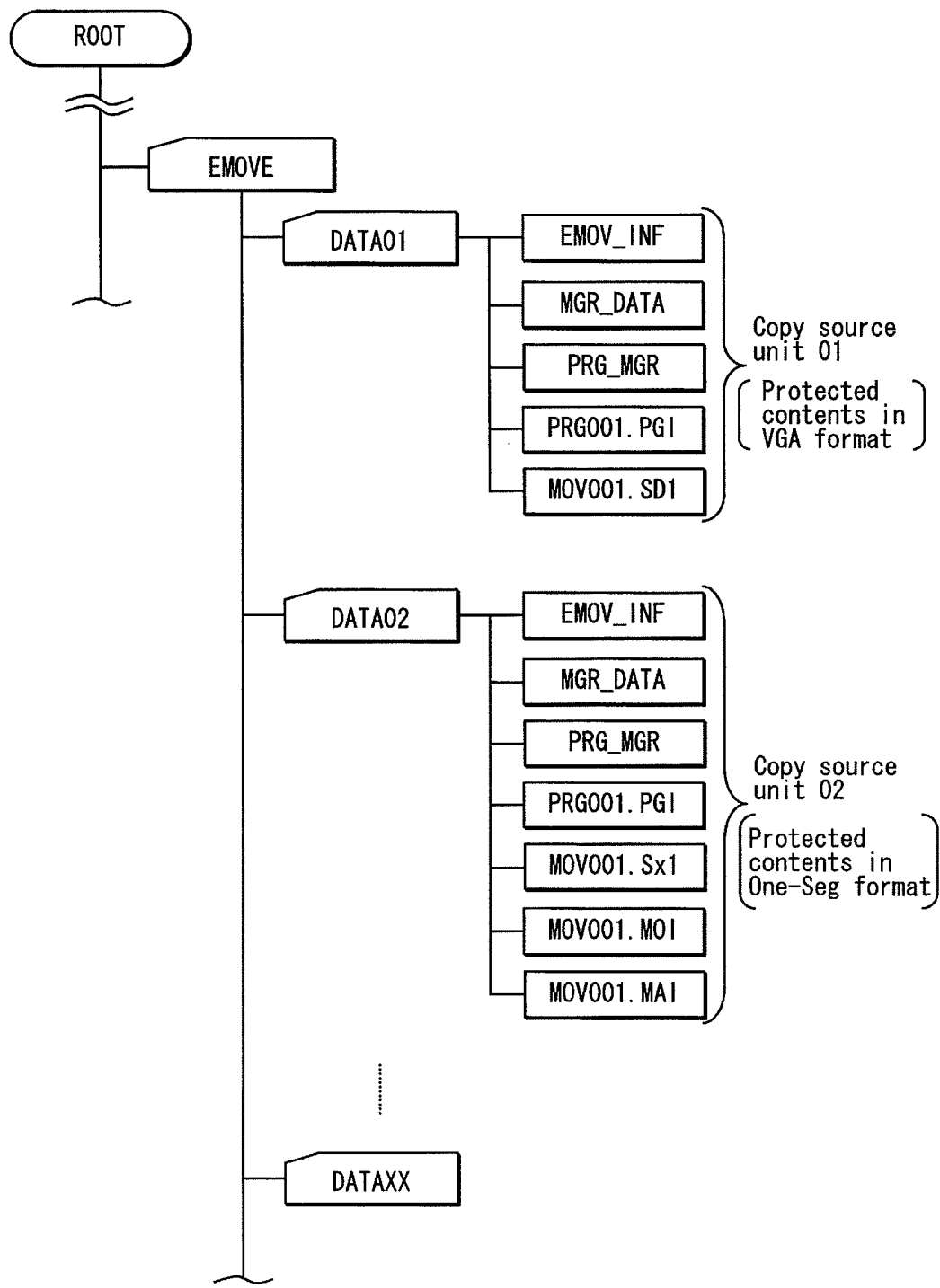
FIG. 12 shows one example of the directory structure of the BD-ROM in which a plurality of protected contents for mobile terminal that are different in stream format are recorded.

FIG. 12 shows one example of the directory structure of the BD-ROM in which a plurality of protected contents for mobile terminal that are different in stream format are recorded. It is presumed in this example that there are two versions of protected contents for mobile terminal: one in the VGA (Video Graphics Array) format; and the other in the One-Seg format, and the respective two versions of protected contents for mobile terminal are dealt with as different copy source units, and are recorded in the DATA01 directory and the DATA02 directory.

The DATA01 directory shown in FIG. 12 is a copy source storage directory for the protected contents for mobile terminal in the VGA format. Under the DATA01 directory, five files are present: EMOV_INF; MGR_DATA; PRG_MGR; PRG001.PGI; and MOV001.SD1. The EMOV_INF file is a copy information file storing content IDs (also referred to as "CIDs") assigned to respective contents for mobile terminal so that they can be identified uniquely. Since the EMOV_INF file is present in each copy source storage directory, it is possible for a plurality of copy source storage directories to have different content IDs, or have the same content ID. When a plurality of copy source storage directories have different content IDs, the digital copy server 36 can deal with a plurality of protected contents for mobile terminal that are deposited at respective content IDs, as different contents. When a plurality of copy source storage directories have the same content ID, the digital copy server 36 can deal with a plurality of protected contents for mobile terminal that are deposited at respective content IDs, as one content.

The MOV001.SD1 file is an encrypted video stream in the MPEG4 format, and the resolution of the picture data is 640×480. Information for random access is included in the video stream. The MOV001.SD1 file corresponding to the digital stream is, for example, encrypted by a predetermined encryption method (for example, the CPRM method). The key information used to decrypt the digital stream having been encrypted by a predetermined encryption method (for example, the CPRM method) is not recorded on the BD-ROM, and thus is protected from an unauthorized playback.

The PRG001.PGI file is information corresponding to the playlist information, and indicates the playback order of the MOV001.SD1 file, as well as the encoding method of the audio stream and the title name of the protected content for mobile terminal. The playlist for the main story content in the BD-ROM is composed of a playback order of a plurality of AV streams, and a ratio of the playlist for the main story content to the AV streams is "one to plurality". On the other hand, a ratio of the playlist for the protected content for mobile terminal to the AV stream is "one to one". This means that the protected content for mobile terminal is not a target of an interactive playback control, and is restricted to a simple playback control for the viewing of an AV stream on the mobile terminal.

The MGR_DATA file stores the resume position of the protected content for mobile terminal.

The PRG_MGR file stores the total playback time of the content for mobile terminal.

The DATA02 directory is a copy source storage directory for the protected contents for mobile terminal in the One-Seg format. The DATA02 directory and the DATA01 directory have in common that the EMOV_INF, MGR_DATA, PRG_MGR, and PGR001.PG1 files are present therein. On the other hand, the DATA02 directory differs from the DATA01 directory in that it includes the MOV001.Sx1 file instead of the MOV001.SD1 file, and further includes the MOV001.MAI, and MOV001.MOI files that are not present in the DATA01 directory.

The MOV001.Sx1 file is a stream file storing a digital stream in the MPEG4-AVC format, and the resolution of the picture data is 320×240.

The MOI (Media Object Information) file includes an EntryPESPacketNum table. The EntryPESPacketNum table shows the number of TS packets that are present in the space from the head of the PES packet judged to cover the IDR picture of MPEG4-AVC to the head of the next PES packet.

The MAI (Media Attribute Information) file shows the start time, end time, position information, and time offset of the time period in which TS packets constituting the digital stream of MPEG4-AVC are discontinuous.

The MOV001.SD1 file in the DATA01 directory stores information for a random access. On the other hand, the MOV001.Sx1 file does not store such information for a random access. Instead of this, the MOV001.Sx1 file is associated with the MOV001.MAI and MOV001.MOI files. That is to say, the protected content for mobile terminal in the One-Seg format additionally has management information for each stream. In this way, in the BD-ROM, protected contents for mobile terminal for various stream formats are preliminarily recorded in a plurality of copy source storage directories. This enables a digital copy to be performed by selecting a protected content for mobile terminal that matches a desired stream format among the MPEG4 and MPEG4-AVC formats. The meaning of the presence of a plurality of copy source storage directories in the BD-ROM is significant because it enables a content in a desired stream format to be taken out without performing the transcoding. The DATA03 and DATA04 directories shown in FIG. 12 may store copy source units for taking out, in other storage formats, such as the QuickTime format and Windows Media Player format. However, description of these formats is omitted for the sake of conciseness.

In the following, how to manage the applications in the read-only medium 105 will be described.

Figure 13A:
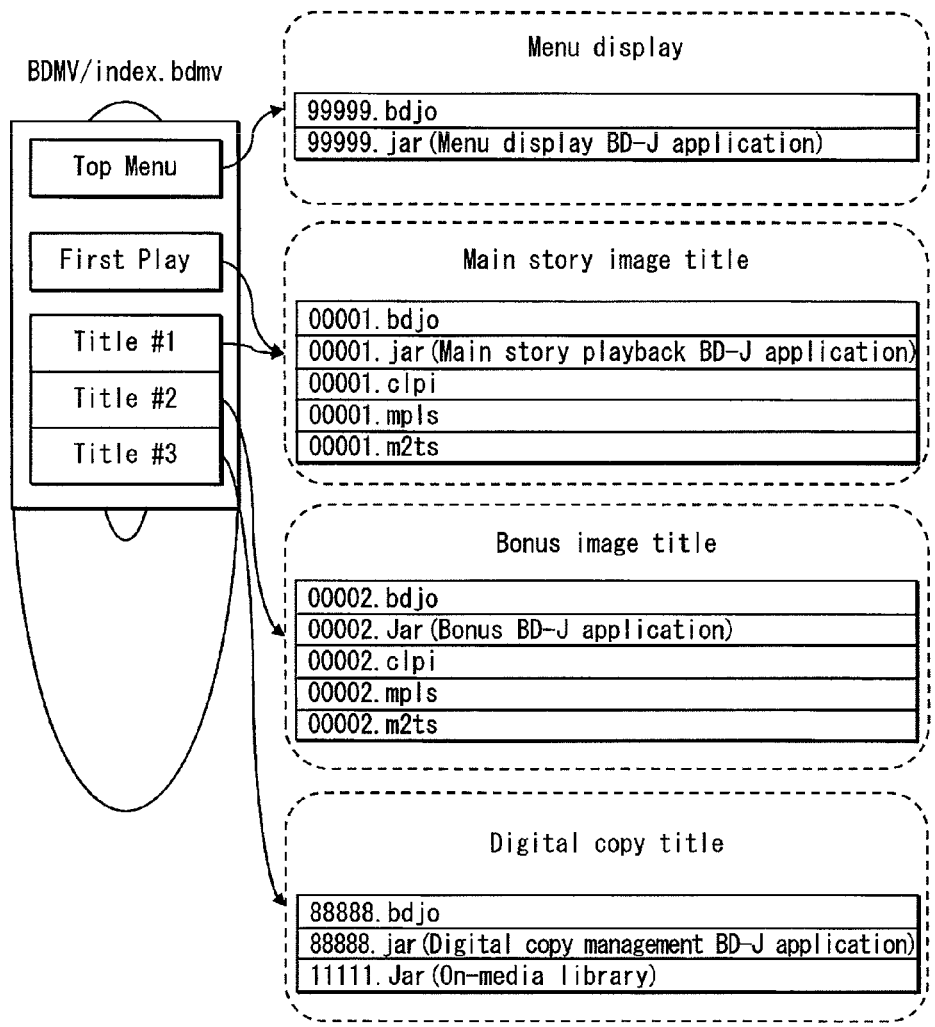
FIGS. 13A and 13B illustrate one example of the relationships between the index.bdmv file and titles, and the contents of the application management tables included in the BD-J objects of the titles, and the contents of the playlist access information.

FIG. 13A illustrates one example of the relationships between the index.bdmv file and titles. The title is a unit of playback composed of a pair of an application and an AV stream. In the index.bdmv file, the title structure on the disc is described, and the file is used to manage the reference relationships between each title on the disc and a corresponding application (a BD-J application corresponds to a BD-J mode title; and a scenario program corresponds to a HDMV mode title).

In the example shown in FIG. 13A, titles "First Play", "TopMenu", "Title#1", "Title#2", and "Title#3" are present.

The "Top Menu" is a title that is played back when the user presses a menu key on the remote control or when a playback of a title ends, and is mainly used for a selection of a title or a selection of a language for subtitle/audio. After a selection of a title is made, the playback device is instructed to start a menu display BD-J application defined by the archive file (99999.jar), in accordance with the application management table included in the BD-J object (99999.bdjo).

The "First Play" is a title that is automatically played back at the start-up of the BD, and is mainly used to display the terms of service regarding the BD.

The "Title#1" is a title of the main story video, and when this title is selected, a digital stream (00001.m2ts) is played back with use of a playlist information file (00001.mpls) in accordance with the playlist access information included in the BD-J object (00001.bdjo). The playback device is instructed to start a main story playback BD-J application defined by the archive file (00001.jar), in accordance with the application management table included in the BD-J object (00001.bdjo).

The "Title#2" is, for example, a title of a bonus video, and when this title is selected, a digital stream (00002.m2ts) is played back with use of a playlist information file (00002.mpls) in accordance with the playlist access information included in the BD-J object (00002.bdjo).

The "Title#3" is, for example, a title corresponding to the digital copy, and when this title is selected, an archive file (88888.bdjo) of the digital copy management BD-J application which manages the GUI and the like of the digital copy, and an archive file (11111.jar) of the on-media library are loaded. The archive file of the on-media library includes a class file called "e-MoveLibrary.class", and the digital copy management BD-J application includes a declaration statement "ClassPass=e-MoveLibrary" stating that this class file is incorporated. With this declaration, the API calls in the digital copy management BD-J application are linked with the API calls in the on-media library.

Note that the digital copy management BD-J application and the on-media library 28 that constitute Title#3 may be recorded in different archive files separately, or may be recorded in one JAR file.

The above example is merely one example. For example, the digital stream is not played back if a playlist is not shown in the playlist access information included in the BD-J object associated with "Title#1".

Also, if a playable playlist is shown in the playlist access information included in the BD-J object associated with "Title#3", the playlist is played back by the playback device in accordance with the playlist access information included in the BD-J object, in parallel with the executions of the BD-J application shown in the application management table and the on-media library 28.

Figure 13B:
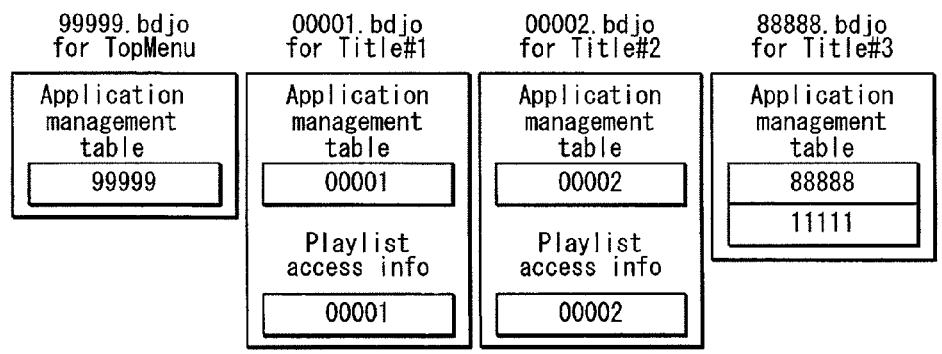

FIG. 13B illustrates the contents of the application management tables included in the BD-J objects of the titles, and the contents of the playlist access information.

In the application management table included in the BD-J object (99999.bdjo) corresponding to the Top Menu, "99999", representing an identification number of the menu display BD-J application is recited. Accordingly, when the Top Menu is selected, the playback device is instructed to start a menu display BD-J application defined by the archive file (99999.jar), in accordance with the application management table included in the BD-J object (99999.bdjo).

In the application management table included in the BD-J object (00001.bdjo) corresponding to the Title#1, "00001" representing an identification number of the main story playback BD-J application is recited. Accordingly, when the Title#1 is selected, the playback device is instructed to start a main story playback BD-J application defined by the archive file (00001.jar), in accordance with the application management table included in the BD-J object (00001.bdjo).

Also, in the playlist access information included in the BD-J object (00001.bdjo), "00001" representing the identification number of the playlist information file (00001.mpls) is recited. Accordingly, when the Title#1 is selected, the playback device is instructed to play back a stream file (00001.m2ts) with use of a playlist information file (00001.mpls).

In the application management table included in the BD-J object (00002.bdjo) corresponding to the Title#2, "00002" representing an identification number of the bonus video BD-J application is recited. Accordingly, when the Title#3 is selected, the playback device is instructed to start a bonus video BD-J application defined by the archive file (00002.jar), in accordance with the application management table included in the BD-J object (00002.bdjo).

Also, in the playlist access information included in the BD-J object (00002.bdjo), "00002" representing the identification number of the playlist information file (00002.mpls) is recited. Accordingly, when the Title#2 is selected, the playback device is instructed to play back a stream file (00002.m2ts) with use of a playlist information file (00002.mpls).

In the application management table included in the BD-J object (88888.bdjo) corresponding to the Title#3, "88888" representing an identification number of the digital copy management BD-J application and "11111" representing an identification number of the on-media library 28 are recited. Accordingly, when the Title#3 is selected, the playback device is instructed to start the digital copy management BD-J application defined by the archive file (88888.jar), and to start the on-media library 28 defined by the archive file (11111.jar) in accordance with the application management table included in the BD-J object (88888.bdjo).

In the above example, the on-media library 28 and the digital copy management BD-J application are present only in the Title#3, and the on-media library 28 and the digital copy management BD-J application are recited in the application management table included in the BD-J object of the Title#3. Accordingly, after the title number of the Title#3 is set in the title number register, and the Title#3 becomes the current title, the class loading is performed with regard to the on-media library 28 and the digital copy management BD-J application and the on-media library 28 and the digital copy management BD-J application are executed by the bytecode application.

On the other hand, the on-media library 28 and the digital copy management BD-J application are not constituent elements of the Title#1 and Title#2, and are not recited in the application management table of the Title#1 and Title#2. Therefore the operation of the on-media library 28 and the digital copy management BD-J application ends when the playback of the Title#3 ends and the playback of the Title#1 or Title#2 is started. In this way, the on-media library 28 and the digital copy management BD-J application are subjected to the application signaling in which the title is regarded as the life cycle.

In this way, by setting the life cycle of the on-media library 28 to be the same as the life cycle of the digital copy management BD-J application (in the present example, the period from the start time point to the end time point of the Title#3 is set to be the life cycle in which the on-media library 28 and the digital copy management BD-J application can be executed), a BD-J application whose life cycle is different from the life cycle of the on-media library 28 (in the present example, a BD-J application that is recited only in the application management table of the Title#1 or Title#2, which is different from Title#3) can be restricted from using the on-media library 28.

As described above, according to the present embodiment, the user receives a supply of a BD-ROM in which are recorded (i) the on-media library 28 for controlling the machine unique function control unit 33, (ii) the digital copy management BD-J application that executes the machine unique function by using the on-media library 28, and (iii) the SD_Video content that is the target of the machine unique function. With this structure, the user can execute a digital copy while the BD-ROM is inserted in the playback device, without using a PC.

Embodiment 4

The present embodiment describes commands that can be interpreted by the command processing unit 609 of the machine unique function control unit 33. The commands that can be interpreted by the command processing unit 609 include the following.

1. Initialization Request Command (REQUEST_INITIALIZE)

The initialization request command initializes the digital copy module 35 and makes other socket commands available. Once an initialization is performed, some parameters (serial IDs, source location, server URL, slot for secure memory card 104, resume point) are reset. When the command is executed again and the execution results in a success, these parameters are reset.

The command becomes valid in any of the transferring, transferred, and finalizing states. Responses to the command include an OK response and a fatal error response. The OK response indicates the initialization and activation of the digital copy module 35. The fatal error indicates that the initialization has failed due to a fatal error.

2. Check Ticket Command (REQUEST_CHECKTICKET)

The check ticket command requests the digital copy server 36 to check a copy ticket by using a parameter set by the parameter set command for copying. All parameters necessary for the process need to be set by the set command before the command is called. After checking the copy ticket, the on-media library 28 can request an execution of a data transfer by issuing a copy command. This command can be issued while the digital copy module 35 is in the initialization state or the ready state. There is no argument for this command. The responses include an OK response, invalid error response, and connection error response. The responses also include a busy error response.

The OK response indicates that the check of the copy ticket has been accepted, and that the digital copy module 35 has succeeded to receive the ticket response. The invalid error response indicates that some of the parameters for the process have not been set, and thus the check ticket has failed. The connection error response indicates that a response does not reach the digital copy server 36 or that a correct response has not been received from the digital copy server 36.

The busy error response indicates that the digital copy module 35 cannot access the BD-ROM since the BD-ROM is locked due to the AV playback process. This error occurs when the digital copy module 35 is being executed in a process different from the BD-ROM playback process. When this error code returns, the on-media library 28 must attempt a check-ticket-by-data-feed request instead of this commend.

The fatal error response indicates that the ticket request has failed due to a fatal error.

3. Check-Ticket-by-Data-Feed Request (REQUEST_CHECKTICKET_BYDATA-FEED)

The check-ticket-by-data-feed request requests the digital copy server 36 to check a copy ticket by using a parameter set by the parameter set command for copying. All parameters necessary for the process need to be set by the set command before the command is called. After checking the copy ticket, the on-media library 28 can request an execution of a data transfer by issuing a copy command. This command can be issued while the digital copy module 35 is in the initialization state or the ready state. When this command is called, the source location having been set by the set command is disregarded, and the binary data, which is identified by using, as the target information file, the binary data identified by this command.

This command is called only when the check ticket request returns with a busy error. Accordingly, the digital copy module 35 does not need to implement the command when there is no possibility that the check ticket request returns with a busy error.

The argument is the length of the information file. The responses include an OK response, invalid error response, connection error response, and fatal error response. The OK response is composed of the state number and the remaining number of times of copying. The OK response indicates that the check of the copy ticket has been accepted, and that the digital copy module 35 has succeeded to receive the ticket response. The invalid error response indicates that some of the parameters for the process have not been set, and thus the check ticket has failed. The connection error response indicates that a response does not reach the digital copy server 36 or that a correct response has not been received from the digital copy server 36.

The no-support response indicates that the digital copy module 35 does not support this command. The digital copy module 35 does not need to implement this command and returns a no-support error response when there is no possibility that the check ticket request returns with a busy. The digital copy module 35 should implement this command and should not returns a no-support error response when there is a possibility that the check ticket request may return with a busy. The fatal error response indicates that the ticket request has failed due to a fatal error.

4. Copy Request Command (REQUEST_COPY Command)

The copy request command causes a content to be output to the secure memory card 104 having been set by the output device set command. This command is asynchronous, and the on-media library 28 can check the transfer process via the progress obtain command. When an AV playback is executed during a transfer process, the copy speed is restricted until the AV playback ends, and the data transfer process temporarily stops. The copy process is cancelled when the cancel request is invoked, the close request is invoked, or the BD-ROM is ejected.

After the cancellation, whether or not to clear the partially copied data is a matter for implementation. The copy ticket must be checked by the check ticket request command before this command is called. This command is valid in the ready state. Responses to the command include an OK response and a fatal error response. The OK response is issued when the copy request is accepted and the digital copy module 35 starts copying the content. The fatal error response indicates that the digital copy module 35 has failed in copying.

5. Copy-by-Data-Feed Request Command (REQUEST_COPY_BYDATA-FEED Command)

The copy-by-data-feed request command causes a content to be output to the secure memory card 104 having been set by the output device set command. This command is asynchronous, and the on-media library 28 can check the progress of the copy via the process obtain command. When an AV playback is executed during a transfer, the copy speed is reduced or zeroed until the AV playback ends. The copy process is cancelled when the cancel request is invoked, the close request is invoked, or the BD-ROM is ejected. After the cancellation, whether or not to clear the partially copied data is a matter for implementation. The check with the check ticket command must be performed before this command is called. This command is valid only when the digital copy module 35 is in the ready state. When this command is called, the source location having been set by the source location command is disregarded, and the binary data, which has been identified by the data feed request command, is used as the target content. This command is called only when the copy request returns with a busy. Accordingly, there is no possibility for this command that the copy request returns with a busy error. The digital copy module 35 does not need to implement this command. As the argument, a management data file, program management file, program file, or movie file may be used. The responses to this command include an OK response, no-support response, and fatal error response. The OK response indicates that the copy request was accepted and the digital copy module 35 is caused to start copying the content.

The no-support response indicates that the digital copy module 35 does not support this command. The digital copy module 35 does not need to implement this command, but only needs to return a no-support error when there is no possibility that the copy request returns with a busy error. The digital copy module 35 only needs to implement this command, but no needs to return the no-support error.

The fatal error response indicates that a copy cannot be started due to a fatal error.

6. Data Feed Request Command (REQUEST_DATA-FEED Command)

The data feed request command causes copying of a data block identified for the copying to be started. The on-media library 28 can call this command only when the copy-by-data-feed request results in a success. When files with the same file name are identified successively, the on-media library 28 adds data into the identified files. The on-media library 28 must request copying of a plurality of files in succession. Other files should not be identified before copying of the current file is completed. The size of the data block should be 64 KB or less. When the end of file is reached, the length of the data block is set to "0".

The argument may be a file name of a file recorded on the BD-ROM, a data block length, or binary data of a data block. The OK response indicates that the data block was copied successfully. The no-support response indicates that the digital copy module 35 does not support this command. The fatal error response indicates that the digital copy module 35 has failed in copying. When this error occurs in the transfer state, the digital copy module 35 must transit to the stop state.

7. Cancel Request Command (REQUEST_CANCEL Command)

The cancel request command requests a cancellation of the current process. When the current process is cancelled successfully, partially copied data is deleted from the secure memory card 104. This command is valid only when the digital copy module 35 is in the in-transfer/post-transfer state.

8. Finalization Request Command (REQUEST_FINALIZE Command)

The finalization request command requests the digital copy module 35 to perform a key download and a finalization of the process. Once the digital copy module 35 starts the finalization, the on-media library 28 cannot cancel the finalization. The responses include an OK response, connection error response, and fatal error response. The OK response indicates that the digital copy server 36 has accepted the key download request, and the digital copy module 35 has succeeded in accept of the key download response. The connection error response indicates that the digital copy module 35 cannot reach the digital copy server 36 and that a correct response was not a response from the digital copy server 36. The fatal error response indicates that the key download request has failed due to a fatal error.

9. Close Request Command (REQUEST_CLOSE Command)

The close request command is a command that instructs the digital copy module 35 to complete the close operation, then close the digital copy module 35, release the resources for the process, and return to the non-initialization state. This command can be called in any state. When the command is called in the final state, the close operation is blocked until the final process is completed. When the command is called in the in-transfer or post-transfer state, the cancellation operation is executed and the close operation is started. The responses include an OK response that indicates a success of the closing, and a fatal response that indicates a failure of the command due to a fatal error.

10. Server URL Set Command (SET_SERVERURL)

The server URL set command sets a URL of the digital copy server 36 to be connected for the copy process. When this command is successfully completed, the current server URL is overwritten with a new server URL. The responses include an OK response that indicates a successful setting of the server URL in the process, and a fatal response that indicates a failure of the command due to a fatal error. When a blanc character is detected, a previously set URL becomes valid.

11. Source Location Set Command (SET_SRCLOCATION)

The source location set command sets a source location of a content to be copied. This source location must exist in the read-only medium 105. When the command is successfully completed, the current source location is overwritten with a new source location. The argument is an absolute path that indicates a directory in the read-only medium 105 having been inserted in the device. The path name for the setting of the source location must be enclosed in /mnt/bdrom/ EMOVE/DATA01. The detected file path needs to include a valid content.

The responses include an OK response that indicates a successful setting of the source location in the copy process, a fatal error response that indicates a failure of the command due to a fatal error, and an invalid response. The OK response indicates a position that has been successfully set for the process. The invalid response occurs for any of the reasons: the detected path name does not specify 12. Serial ID Set Command (SET_SERIALID)

The serial ID set command sets a serial ID specified for this copy process. When a serial ID has been set and this command is completed successfully, the current serial ID is overwritten with a new serial ID. The responses include an OK response that indicates a successful setting of the server ID in the process, and a fatal response that indicates a failure of the command due to a fatal error.

13. Output Device Set Command (SET_OUTPUTDEVICE)

The output device set command sets a slot of a drive device for the copy process. When a slot has been set and this command is completed successfully, the current target slot is overwritten with a new slot. The responses include an OK response that indicates an output device having been set successfully in the process, and a fatal response that indicates a failure of the command due to a fatal error.

14. Resume Set Command (SET_RESUME)

The resume set command sets a resume point for the process. When a resume point is specified by this command, the digital copy module 35 updates a management data file of the secure memory card 104 after the process is completed. This is performed for the SZ_DATAV content to be played back from the resume point. When the resume point is set, the current resume point is overwritten with a new resume point when this command is completed successfully. The resume point is reflected into a target secure memory card 104 only in the completed state. When this command is called in the completed state, it is immediately reflected into the target secure memory card 104. As the argument, an offset may be specified in a unit of second. The responses include an OK response that indicates a resume point having been set successfully in the process, and a fatal response that indicates a failure of the command due to a fatal error.

15. Revocation List Set Command (SET_REVOCATIONLIST)

The revocation list set command specifies, by operands, a device list length and a revocation list device list. This command sets the revocation list in the digital copy module 35. The revocation list is a list of unauthorized playback devices that performed an unauthorized copying in the past, and is used in the authentication process with the authentication circuit mounted in the secure memory card 104. This is used to prevent an unauthorized playback device listed in the revocation list from executing a digital copy. The on-media library 28 needs to set the revocation list in the digital copy module 35 before it calls the check ticket request command. When the revocation list has already been set, the current revocation list is overwritten with a new revocation list when the above command is successful. The responses include an OK response that indicates a successful setting of the revocation list for the process, and a fatal response that indicates a failure of the command due to a fatal error.

16. Device List Obtain Command (GET_DEVICELIST)

The device list obtain command obtains a list of devices for the secure memory card 104 slot supported by the playback device for the process. The response to this command is in the following format in which card slots to which numbers Xs have been assigned, card slots to which numbers Xs have been assigned via the USB connection, and other devices to which numbers Xs have been assigned are listed. The response indicates that the command was completed successfully. A local storage positioned as one of a plurality of slots is specified, by its name, at the end of a response message.

17. Device Information Obtain Command (GET_DEVICEINFO)

The device information obtain command obtains the total space/valid space of the secure memory card 104 having been inserted in the specified slot. This slot name is one of the names having been obtained by the device list obtain command, and the responses include a total space, a free space, and the number of programs. When the device information obtain command is successful, the target secure memory card 104 is inserted, and when it is valid, the response message includes the total space/valid space and the number of programs.

18. Progress Obtain Command (GET_PROGRESS)

The progress obtain command obtains progress state information indicating the progress state of the data transfer. The response includes the remaining size/total size. When the data has not been transferred, merely OK is returned. When the data has been transferred (the finalizing has been completed after the transfer by the digital copy module 35), "0/total size" is returned. When the transfer process is stopped or cancelled (stop, cancellation), the total size of data having been copied is returned.

19. State Obtain Command (GET_STATE)

The state obtain command indicates any of the non-initialization, initialization, ready, in-transfer, post-transfer, finalizing, completion, cancellation, or stop.

20. Parameter Obtain Command (GET_PARAMETER)

The parameter obtain command is a command that is used to obtain the current state, current source location, current output device, current server URL, current serial ID, or current resume point. When some parameters do not exist, a blanc character sequence is returned.

Also, events that are output independently of the command transmission to the on-media library 28 asynchronously include the following asynchronous events. The asynchronous events in the present example include: an asynchronous device state insert event indicating that the secure memory card 104 was inserted; an asynchronous device state eject event indicating that the secure memory card 104 was ejected; and an asynchronous state change event. The asynchronous state change event notifies that there is no space in the secure memory card 104, a write protection has been set in the secure memory card 104, or an I/O error has occurred in the secure memory card 104.

The asynchronous state change event occurs when the state of the digital copy module 35 changes, except for the following cases i) and ii).

i) The asynchronous state change event indicates the initialization state after the digital copy module 35 is initialized, although the state of the digital copy module 35 has not changed.

ii) The asynchronous state change event indicating the ready state occurs after the digital copy module 35 enters the ready state and the check ticket request command succeeds, although the state of the digital copy module 35 has not changed.

In the following, a specific communication sequence for realizing a digital copy by using the above commands will be explained.

Figure 14:
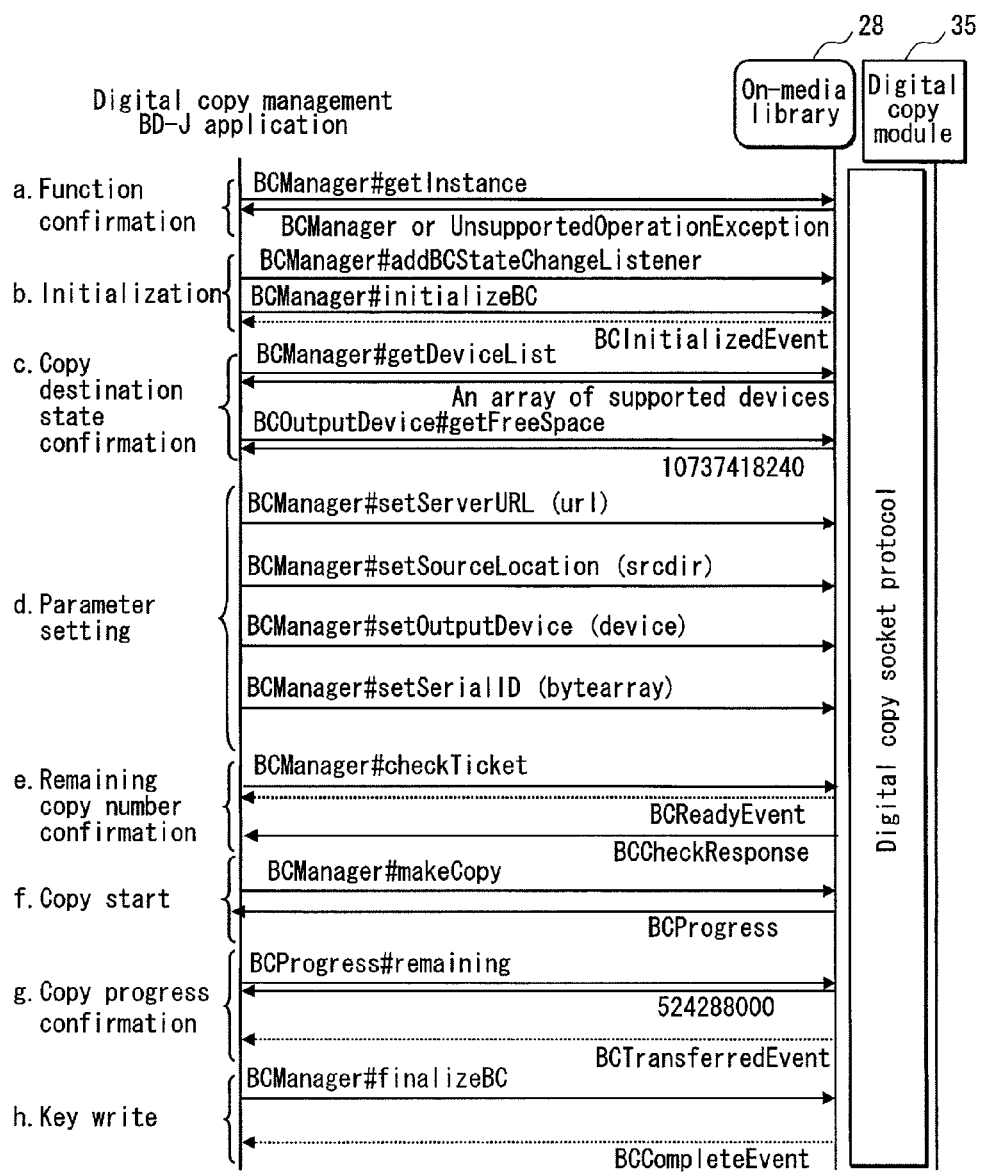
FIG. 14 is a sequence diagram illustrating details of API call issuances in the application.

FIG. 14 is a sequence diagram illustrating details of API call issuances in the application. This sequence was written using the API for the on-media library 28. The digital copy management BD-J application, on-media library 28, and digital copy module 35 are arranged in the horizontal direction in FIG. 14. A plurality of time axes are drawn in the vertical direction. The timings at which messages are transmitted/received are represented by the time points on the time axis. The sequence in FIG. 14 is composed of the phases of: a. function confirmation; b. initialization; c. copy destination state confirmation; d. parameter set; e. remaining copy number confirmation; f. copy start, g. copy progress confirmation; and h. key write.

The "a. function confirmation phase" is constituted from the following inter-application communications: an API call in which the BD-J application calls "BCManager#getInstanceAPI"; and an event throw (throw of BCManager or UnsupportedOperationException) by the digital copy library in response to the call.

The BCManager#getInstanceAPI obtains an instance of the BCManager class which has various types of methods for controlling the digital copy module 35. When the playback device does not support the digital copy, the "UnsupportedOperationException" is thrown.

The "b. initialization phase" is constituted from the following inter-application communications: an API call in which the BD-J application calls "BCManager#addBCStatusChangeListenerAPI"; and a throw of an event, BCManagerInitialEvent, by the digital copy library in response to the call.

The BCManager#addBCStatusChangeListenerAPI is an API for monitoring the change in the state of the digital copy module 35. When a state change of the digital copy module 35 is detected, the state after change is notified to the BD-J application.

The BCManager#initializeBCAPI is an API for initializing the digital copy module 35. When this API is called, the on-media library 28 attempts a connection with the digital copy module 35. When the attempt to connect fails, the UnsupportedOperationException is thrown. When the initialization succeeds, the BCInitializedEvent is notified to the BD-J application.

The "c. copy destination state confirmation phase" is constituted from the following inter-application communications: an API call in which the BD-J application calls "BCManager#getDeviceListAPI"; a throw of an event by the digital copy library in response to the call; an API call in which the BD-J application calls "BCOutputDevice#getFreeSpaceAPI"; and a throw of an event by the digital copy library in response to the call.

The BCManager#getDeviceListAPI is an API for obtaining a list of media (SD card, USB memory) which are supported by the playback device as the copy destinations. Each medium is represented as an instance of the BCOutputDevice class. The BCOutputDevice class has a method (BCOutputDevice#getName) for obtaining the type and number (SD_1, USB_1) of the medium indicated by the instance, a method (BCOutputDevice#getFreeSpace) for obtaining the amount of free space, and a method (BCOutputDevice#getTotalSpace) for obtaining the total space. In FIG. 14, in response to a call of the method (BCOutputDevice#getFreeSpace) for obtaining the amount of free space, "10737418240(byte)" is returned as one example of the amount of free space.

The "d. parameter set phase" is constituted from the following API calls: an API call for calling BCManager#setServerURLAPI; an API call for calling BCManaget#setSourceLocationAPI; an API call for calling BCManager#setOutputDeviceAPI; and an API call for calling BCManager#setSerialIdAPI. The parameters set in the "d. parameter set phase" are a serial ID, a position of a content in the copy source, a URL of the digital copy server 36, and a medium being the copy destination. As the content ID, a value, which is written in the EMOV_INF file of the protected content for mobile terminal that is the copy target, is used.

The position of the content in the copy source is indicated by an absolute path up to the directory in which the content for mobile terminal is recorded. For example, it is "/mnt/bdrom/EMOVE/DATA01". In that case, "/mnt/bdrom" corresponds to the mount point of the BD-ROM medium.

As the URL of the digital copy server 36, a URL indicating a server on the global network is specified. For example, it is "http://xxx.yyy.zzz".

The copy destination medium to be specified is selected from among the list of copy destination media supported by the playback device. When the BD-J application requests the digital copy module 35 to send the list of media currently supported by the playback device, the digital copy module 35 sends the list of media indicated in the form of "<type of medium>_<number>". For example, when the playback device supports one SD card slot and one USB memory slot, a list containing "SD_1 USB_1" is sent. As another example, when the playback device supports not SD card slot and two USB memory slots, a list containing "USB_1 USB_2" is sent. Upon receiving the list of copy destinations, the BD-J application presents the list to the user, receives from the user an indication of a medium that the user selected as the copy destination, and specifies the medium selected by the user as the copy destination medium.

The BCManager#setServerURL(URL)API is an API for setting the URL of the digital copy server 36 into the digital copy module 35.

The BCManager#setSourceLocation(File srcdir) is an API for setting the position of the content in the copy source into the digital copy module 35. The position of the content in the copy source is indicated by an absolute path (for example, "/mnt/bdrom/EMOVE/DATA01") up to the directory in which the content for mobile terminal is recorded.

The BCManager#setOutputDevice(device) is an API for setting the copy destination medium into the digital copy module 35. The copy destination medium is selected from the media list obtained by the BCManager#getDeviceList( ).

The BCManager#setSerialId(byte[ ]) is an API for setting the serial ID into the digital copy module 35.

The "e. remaining copy number confirmation" is constituted from the following inter-application communications: an API call in which the BD-J application calls "BCManager#checkTicket"; and an event throw in response to the call.

The BCManager#checkTicketAPI is an API for requesting the digital copy module 35 to check the remaining number of times of copying. Upon receiving the request for checking the remaining number of times of copying, the digital copy module 35 asks the remaining number of times of copying to the digital copy server 36 by using the currently set parameters. The obtained remaining number of times of copying is returned to the BD-J application as an instance of the BCCheckResponse class. The BD-J application can check the remaining number of times of copying by calling the BCCheckResponse#remainingTimesOfCopyQ. Also, when the remaining number of times of copying is "1" (one) or more, BCReadyEvent is notified to the BD-J application.

The "f. copy start phase" is constituted from the following inter-application communications: an API call in which the BD-J application calls "BCManager#makeCopyAPI"; and an event throw by the digital copy library in response to the call.

The BCManager#makeCopyAPI is an API for requesting the digital copy module 35 to start copying. After requesting the digital copy module 35 to start copying, the on-media library 28 returns the BCProgress instance, which indicates the progress state, to the BD-J application, and the copy process is performed by the digital copy module 35 asynchronously.

The "g. copy progress confirmation phase" is constituted from the following inter-application communications: an API call in which the BD-J application calls "BCProgress#remainingAPI"; an event throw by the digital copy library in response to the call; an API call in which the BD-J application calls "BCProgress#totalAPI"; and an event throw by the digital copy library in response to the call.

The BCProgress#total( ) is an API for obtaining the total number of copied bytes which indicates the number of bytes having been copied so far.

The BCProgress#remaining( ) is an API for obtaining the number of bytes remaining to be copied (in FIG. 14, in response to a call of the BCProgress#remaining( ) "524288000(byte)" is returned as one example of the number of bytes that remains to be copied). After the copy process is completed, the BCTransferredEvent is notified to the BD-J application.

The "h. key write phase" is constituted from the following inter-application communications: an API call in which the BD-J application calls "BCManager#finalizeBCAPI"; an event throw in response to the call; an API call in which the BD-J application calls "BCManager#cancelCopy"; an event throw in response to the call; an API call in which the BD-J application calls "BCManager#closeAPI"; and a throw of BCManager or UnsupportedOperationException by the digital copy library in response to the call.

The BCManager#finalizeBC( ) is an API for requesting the digital copy module 35 to write a decryption key. After the writing of the decryption key is completed, the BCCompleteEvent is notified to the BD-J application.

The BCManager#cancelCopy( ) is an API for canceling the copy process of the digital copy module 35. After the cancellation succeeds, the BCCancelEvent is notified to the BD-J application.

The BCManager#close( ) is an API for releasing the resources assigned to the digital copy module 35 to end the digital copy process.

This completes the explanation of the communication sequence between the on-media library 28, digital copy module 35, and digital copy server 36.

Figure 15:
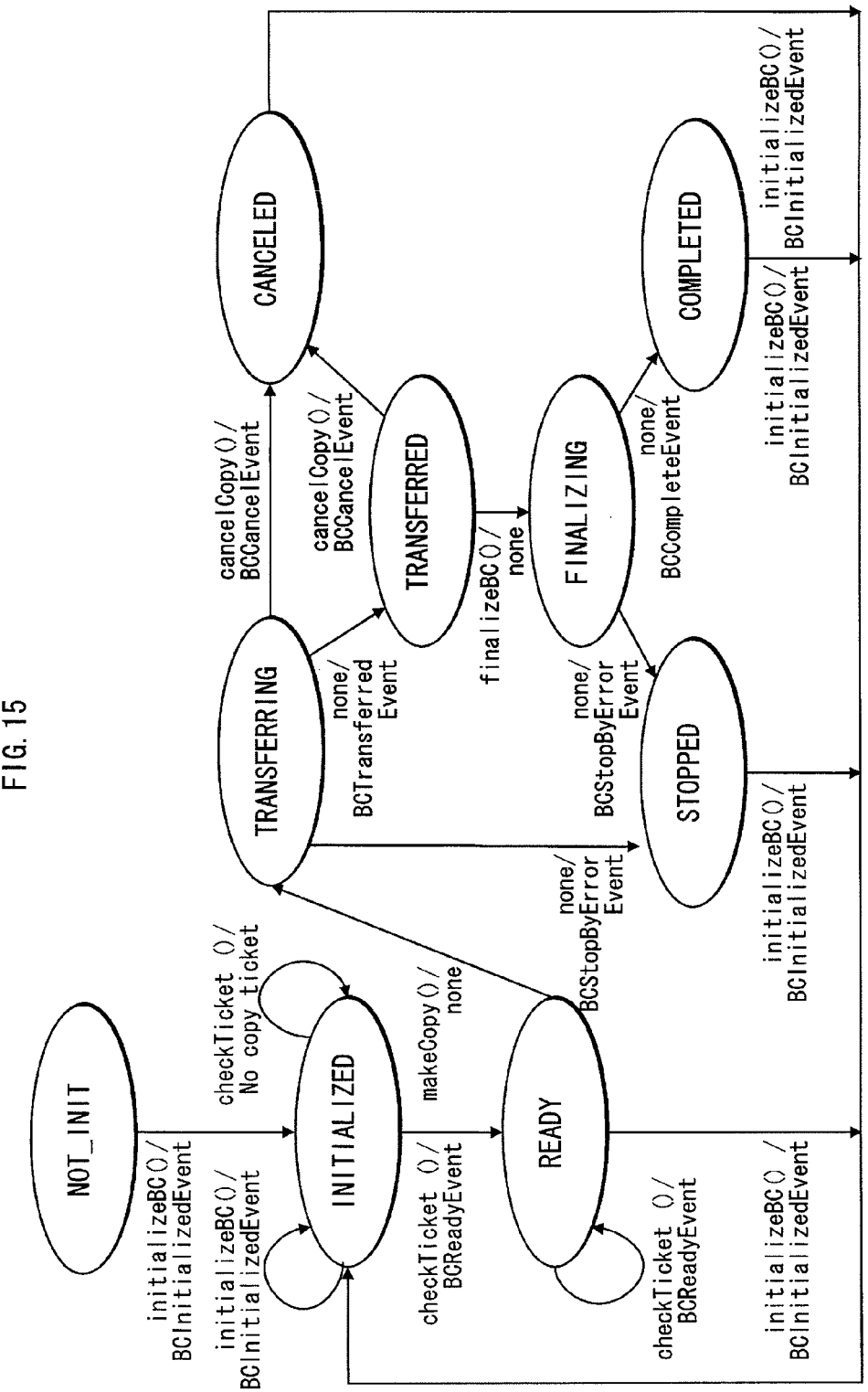
FIG. 15 illustrates the state transfer of the digital copy module 35.

FIG. 15 illustrates the state transfer of the digital copy module 35. The digital copy module 35 can transfer among nine states depending on the progress in the digital copy process. The oval frames in FIG. 15 represents the states in which the digital copy module 35 may be, and the arrows indicate events that trigger the state transfers. The notes attached to the arrows are specific names of the events that trigger the state transfers.

Here, the states illustrated in FIG. 15 to which the machine unique function control unit 33 may transfer will be described.

NOT_INIT: a state in which the digital copy module 35 has not been initialized yet. This state is the initial state of the digital copy module 35 immediately after the BD-ROM is loaded. When the BD-J application calls BCManager#close in another state, and ends the digital copy process, the digital copy module 35 returns to the NOT_INIT state again. When BCManager#initializeBC is called in this state, the state transfers to the INITIALIZED state, and BCInitializedEvent is notified to the BD-J application.

INITIALIZED: a state in which the digital copy module 35 has been initialized, and the function of the digital copy process can be called from the BD-J application. When, in this state, the BD-J application sets the necessary parameters (for example, the URL of the digital copy server 36 that is set by a call of BCManager#setServerURL(URL), the source location of the copy source that is set by a call of BCManager#setSourceLocation(File srcdir), the copy destination medium that is set by a call of BCManager#setOutputDevice(device), and the serial ID that is set by BCManager#setSerialId(byte[ ])), calls BCManager#checkTicket and finds that the remaining number of times of copying is one or more, the state transfers to the READY state, and BCReadyEvent is notified to the BD-J application. When it is found that the remaining number of times of copying is zero, the state remains to be the INITIALIZED state, not transferring to the READY state. After the digital copy process is executed, when the BD-J application calls BCManager#initializeBC( ) in the READY, CANCELED, STOPPED or COMPLETED state, the state transfers to the INITIALIZED state, and BCInitializedEvent is notified to the BD-J application.

READY: a state in which all parameters necessary for the digital copy process have been set, and the parameters are valid, thus the digital copy module 35 is ready to perform copying. When BCManager#makeCopy( ) is called in this state, the state transfers to the TRANSFERRING state.

TRANSFERRING: a state in which copying of a protected content for mobile terminal has been started. After the copying of a protected content for mobile terminal is completed, the state transfers to the TRANSFERRED state, and BCTransferredEvent is notified to the BD-J application. Also, when BCManager#cancelCopy is called before the data copy is completed, the data copy is cancelled, the state transfers to the CANCELED state, and BCCancelEvent is notified to the BD-J application. When an error occurs during a data copy due to a removal of the copy destination medium or the like, the state transfers to the STOPPED state, and BCStopByErrorEvent is notified to the BD-J application. TRANSFERRED: a state in which copying of a protected content for mobile terminal has been completed, and the digital copy module 35 is ready to write the decryption key. When BCManager#finalizeBC( ) is called in this state, the digital copy module 35 transfers to the FINALIZING state. Also, when BCManager#cancelCopy is called in this state, the state transfers to the CANCELED state, and BCCancelEvent is notified to the BD-J application.

FINALIZING: a state in which the decryption key is obtained from the digital copy server 36 and the obtained decryption key is written onto the copy destination medium. Once this state is established, the BD-J application cannot cancel even if it calls BCManager#cancelCopy( ) and the cancellation request is rejected. When an error occurs during writing of the decryption key due to a removal of the copy destination medium or the like, the state transfers to the STOPPED state, and BCStopByErrorEvent is notified to the BD-J application. When writing of the decryption key is completed, the digital copy module 35 transfers to the COMPLETED state, and BCCompleteEvent is notified to the BD-J application.

COMPLETED: a state in which a data copy of a protected content for mobile terminal has been completed, writing the decryption key has been completed, and the digital copy process has succeeded. When BCManager#initializeBC( ) is called in this state, the state transfers to the INITIALIZED state again, and BCInitializedEvent is notified to the BD-J application.

CANCELED: a state in which a data copy of a protected content for mobile terminal has been cancelled in the middle of the copy. A part of the data that has been copied so far is cleared when the state transfers to the CANCELED state.

STOPPED: a state in which a data copy or writing of the decryption key has failed due to an occurrence of an error. Possible causes of errors include a shortage of free space, a writing failure due to write protection of the copy-destination medium, a removal of the copy-destination medium in the middle of the process, and an occurrence of an I/O error due to a damage in the copy-destination medium. The causes of copy failures are included in the detailed information recorded in the BCStopByErrorEvent instance that occurs when the state transfers to the STOPPED state. The BD-J application can recognize a cause of an error by referring to the BCStopByErrorEvent. This concludes the explanation of the contents of the API calls transmitted between the BD-J application and the on-media library 28 when a digital copy is executed.

Figure 16:
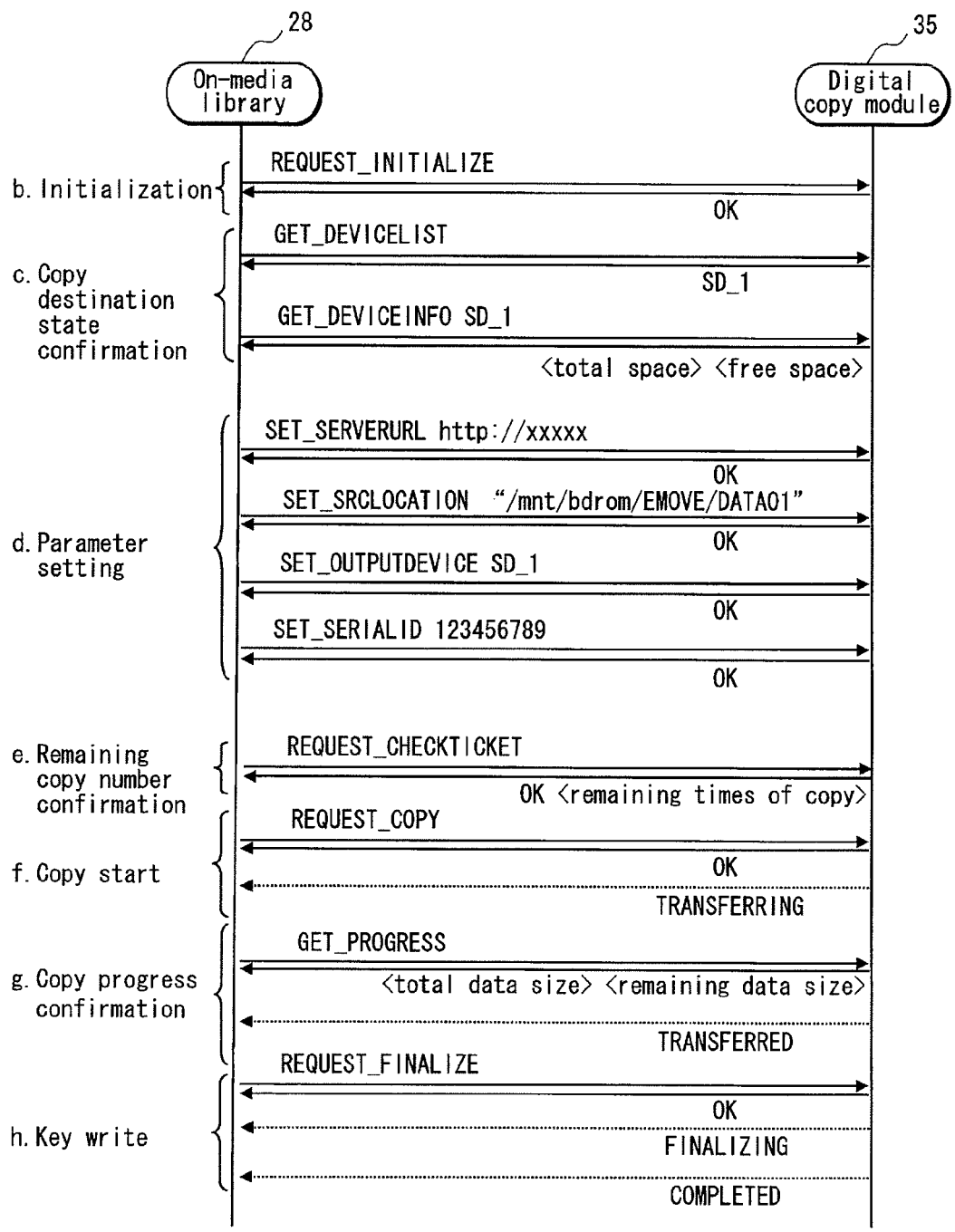
FIG. 16 is a sequence diagram illustrating details of the local communication in the terminal.

A digital copy socket command is transmitted to a module in correspondence with each API call in each phase. FIG. 16 shows details, in the case where this command is used, of the local communication in the terminal shown in FIG. 8.

FIG. 16 is a sequence diagram illustrating details of the local communication in the terminal, showing one example of a digital copy socket protocol for communications performed between the on-media library 28 and the digital copy module 35. This sequence was written using the digital copy socket command. The on-media library 28 and digital copy module 35 are arranged in the horizontal direction in FIG. 16. A plurality of time axes are drawn in the vertical direction. The timings at which commands or responses are transmitted/received are represented by the time points on the time axis. The commands and responses shown in FIG. 16 are transferred between these time axes. The sequence in FIG. 16 is composed of the phases of b. initialization; c. copy destination state confirmation; d. parameter set; e. remaining copy number confirmation; f. copy start, g. copy progress confirmation; and h. key write.

The example provided in FIG. 16 presumes that the playback device supports only the SD card slot.

The "b. initialization phase" is constituted from the following command-response-type communications: a command-response-type communication composed of a transmission of the REQUEST_INITIALIZE command and a reception of the response (SD_1), and a command-response-type communication composed of a transmission of the GET_ASYNCPORT command and a reception of the response.

The REQUEST_INITIALIZE command is a socket command that is issued when BCManager#initializeBC is called from the BD-J application. When a request for initialization of the digital copy module 35 is made, and the number of a port which is to be used in the communication with the digital copy module 35 is identified, this command is transmitted to the port.

When it receives a character sequence "REQUEST_INITIALIZE" via an open port, the digital copy module 35 determines that an initialization request was made, and newly opens a port for asynchronous event for clearing the parameters (for example, the URL of the digital copy server 36 having been set previously, the source location of the copy source, the output device of the copy destination medium, and the serial ID) and for notifying a state transfer, and then transmits a character sequence "OK" via the port via which it received the socket command, to notify that the initialization is completed. When it receives the character sequence "OK" via the port via which it transmitted the socket command, the on-media library 28 recognizes that the initialization has been completed.

The GET_ASYNCPORT command is a command for obtaining a port number of a port having been opened for an asynchronous notification for notifying a state transfer, wherein the digital copy socket protocol is composed of two types of ports: (1) a port for the digital copy socket command (synchronous command); and (2) a port for state transfer notification of the digital copy module 35 (asynchronous event). The port for the digital copy socket command is used for a command to be issued from the on-media library 28 to the digital copy module 35; and the port for state transfer notification is used such that an event is notified unilaterally from the digital copy module 35 to the on-media library 28. When BCManager#addBCStateChangeListner is called from the BD-J application, the on-media library 28 starts monitoring the port for state transfer notification, converts a state transfer notification sent from the digital copy module 35 into an event of the on-media library 28 API, and sends the state transfer notification to the BD-J application.

The "c. copy destination state confirmation phase" includes: a command-response-type communication composed of a transmission of the GET_DEVICELIST command and a reception of a response (SD_1); and a command-response-type communication composed of a transmission of the GET_DEVICEINFO_SD command and a reception of a response (<total space><free space>).

The GET_DEVICELIST command is a command that is used to request the digital copy module 35 to send a list of supported media, and the GET_DEVICELIST command is transmitted to the on-media library 28 when BCManager#getDeviceList is called from the BD-J application and the list of media that the playback device supports as the copy destinations is requested.

The response to the GET_DEVICELIST command is the list of supported media, and is returned via the port for the socket command. The list of supported media is returned in the form of <type of medium>_<number>. When a plurality of media are supported, they are divided by a blank character (example: SD_1<sp>USB_1, wherein <sp> represents a blank character). FIG. 16 illustrates an example in which the playback supports only an SD card slot and thus SD_1 is returned as a response.

The GET_DEVICEINFO command has an argument which may specify a type of medium, and the response thereto may be the total space/free space of the specified type of medium. When BCOutputDevice#getTotalSpace or BCOutputDevice#getFreeSpace is called from the BD-J application and information of the total space or free space is requested, the on-media library 28 transmits the GET_DEVICEINFO command to the digital copy module 35 via the port for the socket command, and receives information of the total space or free space. A blank character is inserted between the command name and the argument. For example, when information of SD_1 (type: SD card, number: 1) is requested, a character sequence "GET_DEVICEINFO<sp>SD_1" is transmitted to the digital copy module 35 via the port for the socket command.

The "d. parameter set phase" includes: a command-response-type communication composed of a transmission of the SET_SERVERURL command and a reception of a response (OK); a command-response-type communication composed of a transmission of the SET_SRCLOCATION command and a reception of a response (OK); a commandresponse-type communication composed of a transmission of the SET_OUTPUTDEVICE command and a reception of a response; and a command-response-type communication composed of a transmission of the SET_SERIALID command and a reception of a response. Similarly, when parameters necessary for the digital copy are to be set, the values are transmitted from the on-media library 28 to the digital copy module 35 via the digital copy socket command, and the parameters are set in the digital copy module 35. The command name and the argument are divided by a blank character.

The "e. remaining copy number confirmation phase" includes a command-response-type communication composed of a transmission of the REQUEST_CHECKTICKET command and a reception of a response "OK<remaining times of copy>.

The REQUEST_CHECKTICKET command is used to check the remaining number of times of copying, and the remaining number of times of copying is notified as the response. When necessary parameters have been set and BCManager#checkTicket( ) is called from the BD-J application, the on-media library 28 sends the REQUEST_CHECKTICKET to the digital copy module 35. Upon receiving the REQUEST_CHECKTICKET command, the digital copy module 35 extracts values of the content ID, serial ID and medium ID based on the parameters having been set, and checks the remaining number of times of copying by sending the three extracted values to the digital copy server 36. The remaining number of times of copying obtained from the digital copy server 36 is sent to the on-media library 28 as a return value of the REQUEST_CHECKTICKET command.

The "f. copy start phase" includes a command-response-type communication composed of a transmission of the REQUEST_COPY command and a reception of a response "TRANSFERRED".

The REQUEST_COPY command is a command that instructs to start copying the SD-Video content. When BCManager#makeCopy is called from the BD-J application, the on-media library 28 transmits the REQUEST_COPY command to the digital copy module 35, requesting to start copying. When it confirms that the remaining number of times of copying is one or more, the digital copy module 35 starts copying data, and returns OK as a return value of the REQUEST_COPY command.

The "g. copy progress confirmation phase" includes a command-response-type communication composed of a transmission of the GET_PROGRESS command and a reception of a response "TRANSFERRED".

The GET_PROGRESS command is a command for obtaining the total number of bytes to be copied and the remaining number of bytes. When BCProgress#remaining( ) or BCProgress#total( ) is called from the BD-J application during a data copy, the on-media library 28 transmits the GET_PROGRESS command to the digital copy module 35, obtains the total number of bytes to be copied and the remaining number of bytes from the digital copy module 35, and returns the obtained values to the BD-J application. Upon completion of the data copy, the digital copy module 35 transfers to the TRANSFERRED state, and notifies the on-media library 28 via the port for asynchronous event that it has transferred to the TRANSFERRED state.

The "h. key write phase" includes a command-response-type communication composed of a transmission of the REQUEST_FINALIZE command and a reception of responses "OK", "FINALIZING", and "COMPLETED".

The REQUEST_FINALIZE command instructs to extract values of the content ID, serial ID, medium ID, and MKB and sending the four extracted values to the digital copy server 36 to obtain a decryption key. When BCManager#finalizeBC( ) is called from the BD-J application after the data copy is completed, the on-media library 28 sends the REQUEST_FINALIZE command to the digital copy module 35. Upon receiving the REQUEST_FINALIZE command, the digital copy module 35 extracts values of the content ID, serial ID, medium ID, and MKB based on the parameters having been set, and sends the four extracted values to the digital copy server 36 to obtain a decryption key. The digital copy module 35 writes the obtained decryption key to the protected area in the secure memory card 104 that is the copy destination medium, and upon completion of the writing, notifies the on-media library 28 via the port for asynchronous event that it has transferred to the COMPLETED state.

This concludes the description of the digital copy socket protocol of communications performed between the on-media library 28 and the digital copy module 35. As described above, all transmissions of commands and event notifications between the on-media library 28 and the digital copy module 35 are performed through the local communication (the socket communication using the ports) in the playback device. When the remaining number of times of copying or the decryption key is to be obtained, the global communication is performed between the digital copy module 35 and the digital copy server 36.

Figure 17:
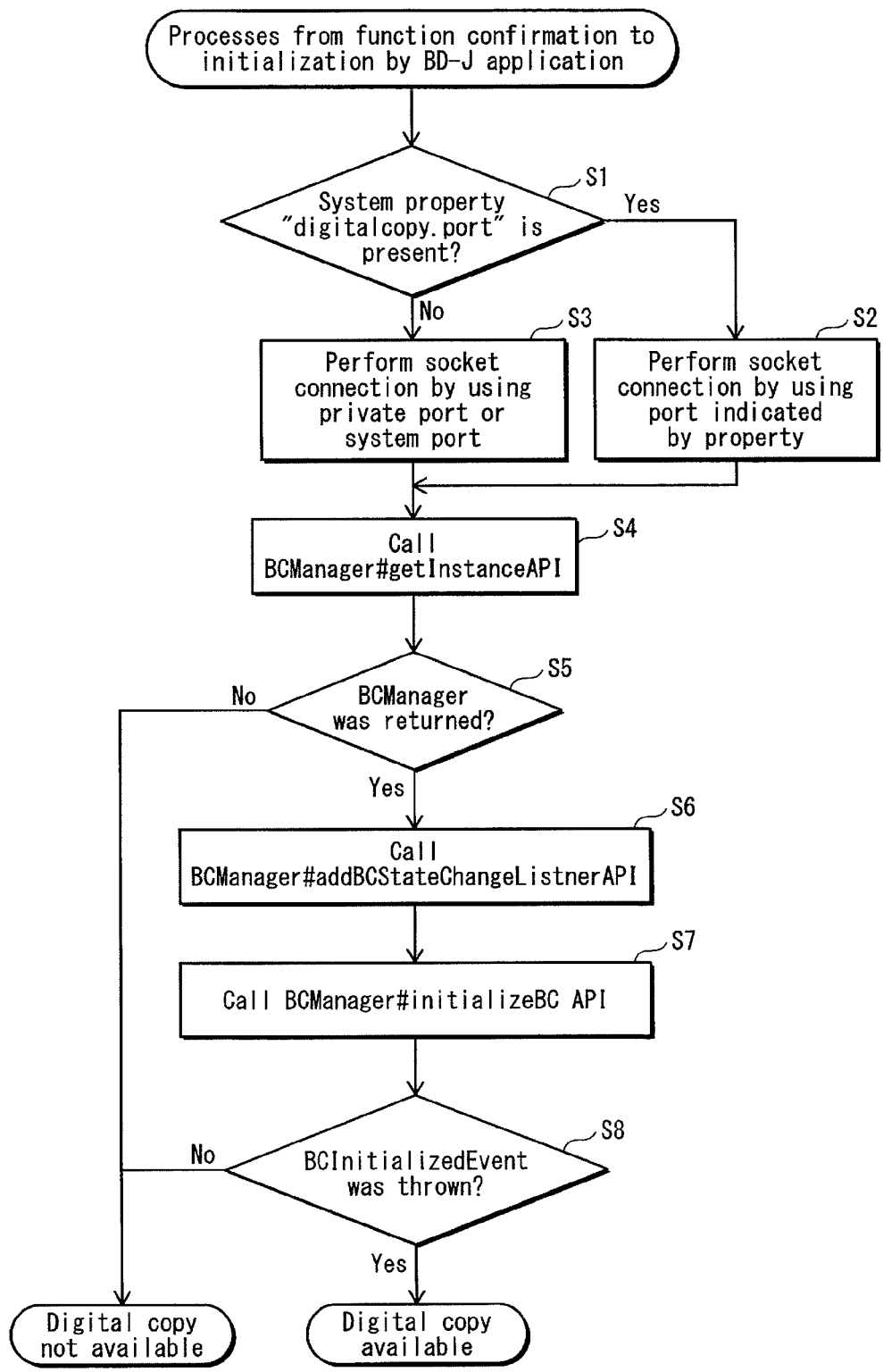
FIG. 17 is a flowchart showing the procedure for the processes from the function confirmation to the initialization performed by the BD-J application.

FIG. 17 is a flowchart showing the procedure for the processes from the function confirmation to the initialization performed by the BD-J application. In step S1, it is judged whether or not system property "digitalcopy.port" is present. When it is present, the socket connection is performed by using a port indicated by the system property "digitalcopy.port" (step S2).

When it is judged that the system property "digitalcopy.port" is not present, the socket connection is performed by using a private port or a free port (step S3). After this, BCManager#getINstanceAPI is called (step S4), and then in step S5, it is judged whether or not BCManager was returned. When it is judged that BCManager was returned, BCManager#addBCStateChangeListnerAPI is called (step S6), and then BCManagerinitialize is called (step S7). It is judged whether or not BCInitialized was thrown (step S8). When it is judged "Yes" in step S5 and step S8, it is judged that the digital copy is available. When it is judged "No" in step S5 or step S8, it is judged that the digital copy is not available.

Figure 18:
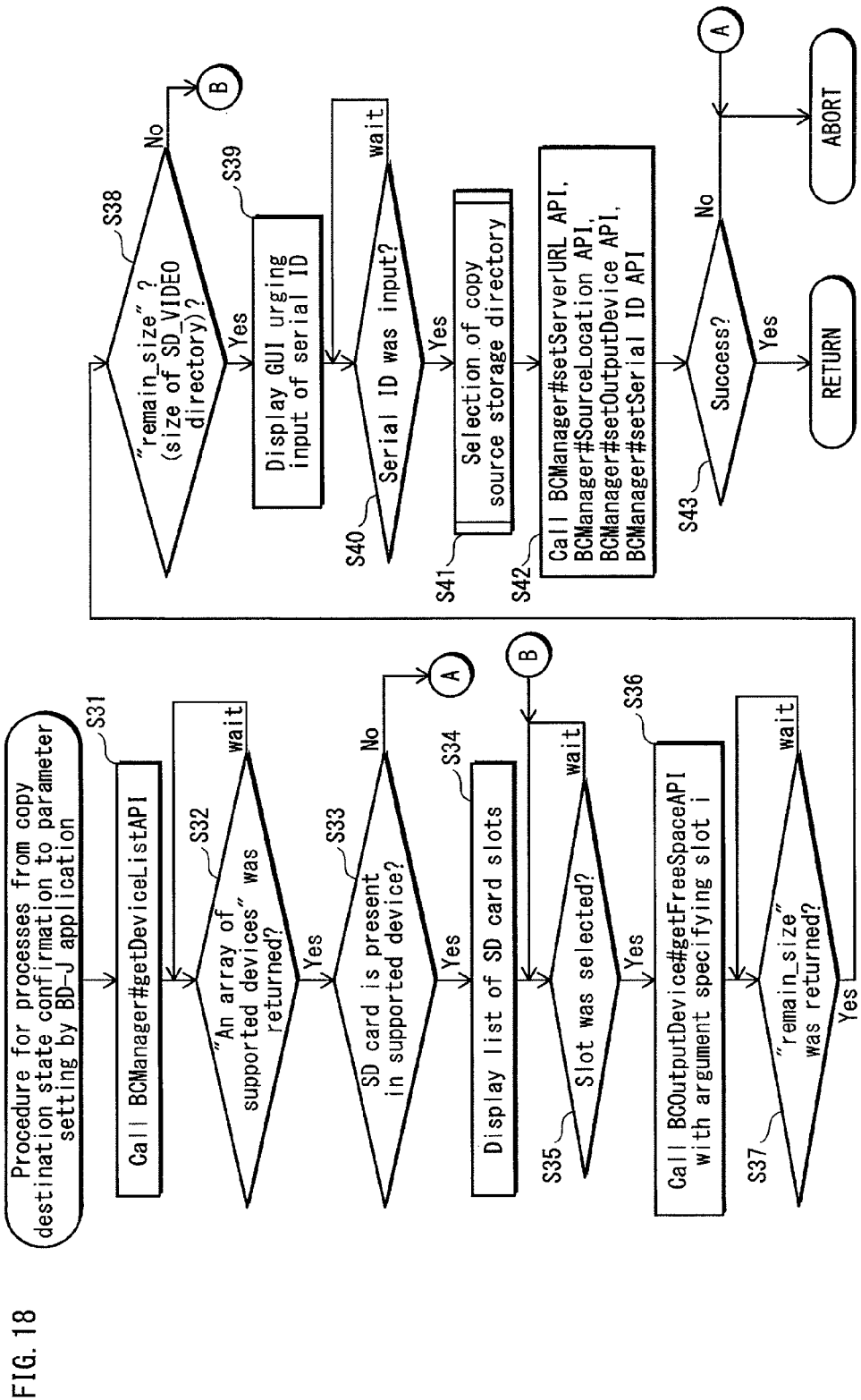
FIG. 18 is a flowchart showing the procedure for the processes from the copy destination state confirmation to the parameter set.

FIG. 18 is a flowchart showing the procedure for the processes from the copy destination state confirmation to the parameter set. The BCManagergerdeviceListAPI is called (step S31), and then the return of the device list "An Array of Supported Devices" is waited (step S32). When it is returned, it is judged whether or not the secure memory card 104 is present in the supported devices (step S33), and when the secure memory card 104 is not present, the process is aborted. When the secure memory card 104 is present, a list of slots for the secure memory card 104 is displayed (step S34), and a selection of a slot by the user is waited (step S35). When a slot "i" is selected, the process moves to step S36 in which BCOutputDevice#getFreeSpaceAPI with an argument specifying the slot "i" is called (step S36), and then the return of the remaining size is waited in step S37. When it is returned, the process moves to step S38 in which it is judged whether or not the remaining size is equal to or larger than the assumed size of SD_VIDEO directory. When it is judged that the remaining size is smaller than SD_VIDEO directory, the process moves to step S35 to urge the user to select a slot again. When it is judged "Yes" in step S38, the process moves to step S39 in which a GUI urging the user to input a serial ID is displayed, and in step S40, an input of a serial ID is waited, and then in step S41, a copy source storage directory is selected. When it is input, BCManagersetServerURLAPI, BCManagerSourceLocationAPI, BCManagersetOutputDeviceAPI, and BCManagersetSerialIDAPI are called (step S42), and then it is judged whether or not the success was returned in response to these API calls (step S43).

Figure 19:
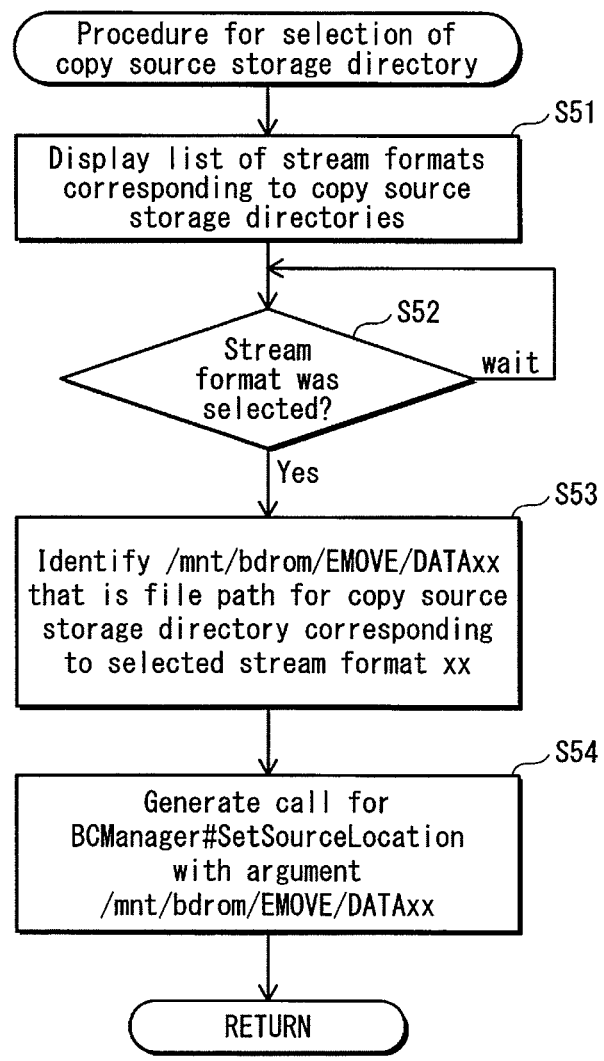
FIG. 19 is a sub-flowchart showing details of the procedure for the selection of a copy source storage directory.

FIG. 19 is a sub-flowchart showing details of the procedure for the selection of a copy source storage directory. A list of stream formats corresponding to a plurality of copy source storage directories under the EMOVE directory of the BD-ROM is displayed (step S51), and then the user's operation indicating a selected stream format is waited (step S52). When the selection is made, /mnt/bdrom/EMOVE/DATAxx, which is a file path for the copy source storage directory xx corresponding to the selected stream format xx, is identified (step S53). Subsequently, a call for BCManager SetServerURL having /mnt/bdrom/EMOVE/DATAxx, which is the identified file path, as the argument is generated (step S54).

The copy information storage directory xx under the copy source storage directory xx indicated by the file path /mnt/bdrom/EMOVE/DATAxx contains content IDxx that is unique to the copy source storage directory xx. Thus the machine unique function control unit 33 checks the remaining number of times of copying with regard to the protected content for mobile terminal by sending the content IDxx, serial ID, and medium IDy to the server. Also, to obtain the decryption key, the combination of the content IDxx, serial ID, and medium IDy is transmitted to the server.

With the procedures shown in the above flowcharts, when a digital copy is performed, it is possible to select a target of digital copy from among protected contents for mobile terminal in various formats such as the VGA format and the One-Seg format. With such a structure in which protected contents for mobile terminal in various formats are recorded on the read-only medium 105 in advance for the digital copying, it is possible to copy a protected content for mobile terminal in any stream format to the secure memory card 104 without performing transcoding.

Figure 20:
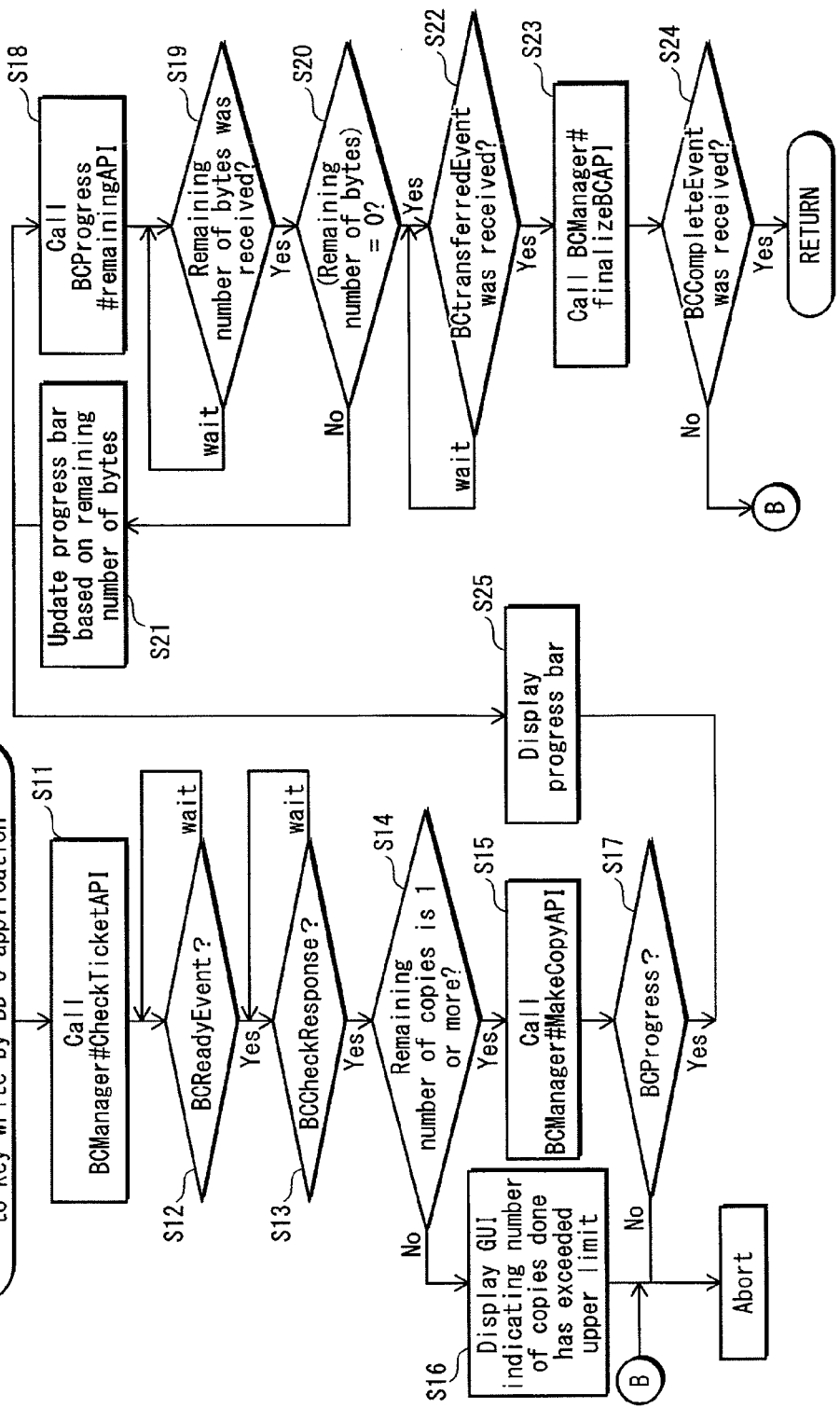
FIG. 20 is a flowchart showing the procedure for the processes from the remaining copy number confirmation to the key write performed by the BD-J application.

FIG. 20 is a flowchart showing the procedure for the processes from the remaining copy number confirmation to the key write performed by the BD-J application. The BCManagercheckTicketAPI is called (step S11), it is judged whether or not the BCReady event was issued (step S12), and it is judged whether or not a response was made (step S13). In step S14, it is judged whether or not the remaining number of times of copying is one or more, and when it is one or more, BCManagerMAKE is called (step S15), and the return of BCProgress is waited (step S17). After this, the progress bar is displayed (step S25), and the process enters a loop composed of steps S18 through S21. In this loop, BCProgress#remaingAPI is called (step S18), the remaining number of bytes is received (step S19), it is judged whether or not the remaining number of bytes is 0 (step S20), and the progress bar is updated based on the remaining number of bytes (step S21), and the process composed of these steps is repeated until it is judged "Yes" in step S20.

In step S22, the reception of BCtransferredEvent is waited. When it is received, BCManagerfinalizeBCAPI is called (step S23), the reception of BCComplete event is waited. When it is received, the process is stopped.

Figure 21A:
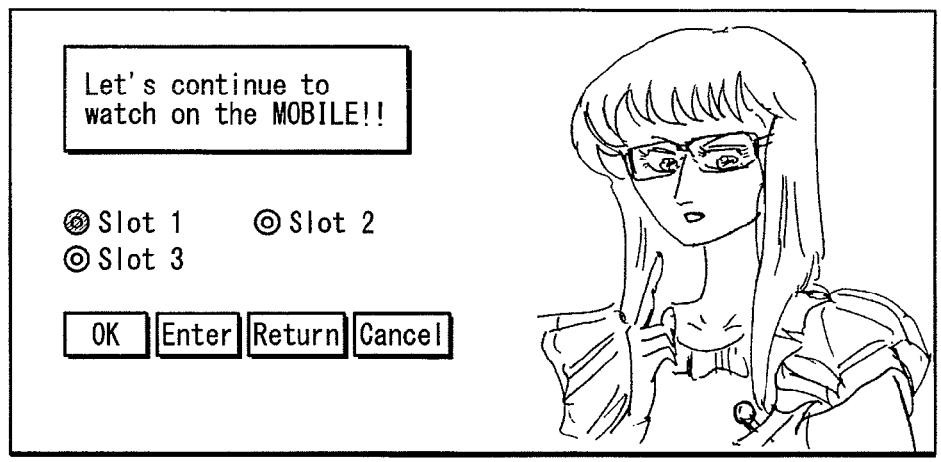
FIGS. 21A through 21C illustrate examples of screens displayed in the processes of digital copy.
Figure 21B:
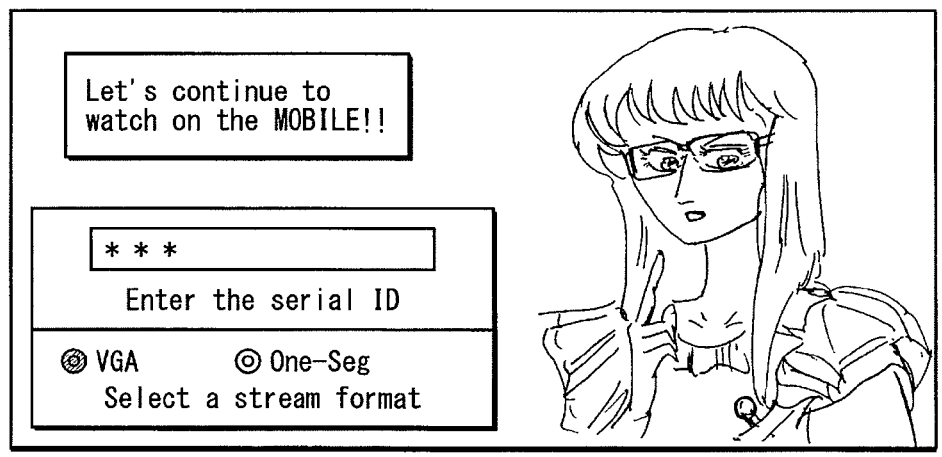
Figure 21C:
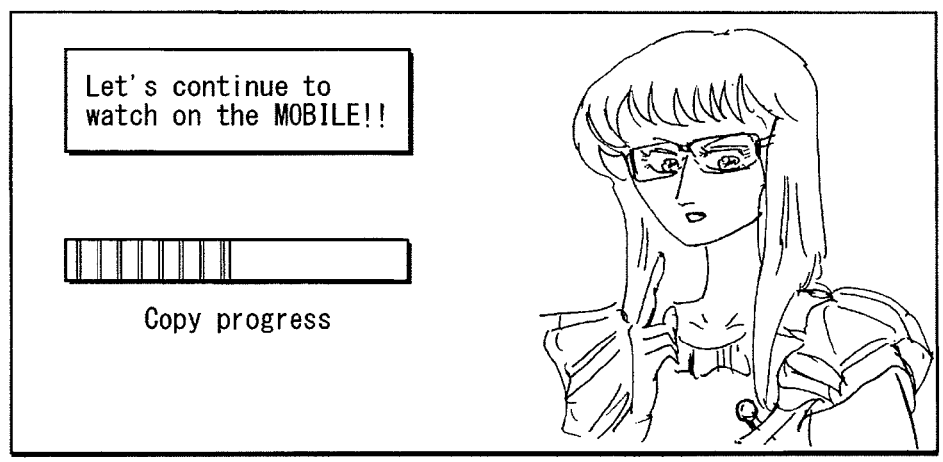

In the following, the screens displayed by the procedure of the above flowcharts will be described. FIGS. 21A through 21C show examples of screens displayed in the digital copy process.

FIG. 21A illustrates an example of a screen showing a list of slots for the secure memory card 104. The screen includes buttons corresponding one-to-one to the slots 1 through 3. FIG. 21B illustrates an example of an input screen on which the value of the serial ID is input and a stream format is selected. FIG. 21C illustrates an example of a GUI that displays the progress of copying. The menus shown in FIGS. 21A through 21C are displayed by the copy management BD-J application, and involve a playback of a video stream included in the main story content. Accordingly, the menus can be made attractive by using characters of the main story content or goods related thereto.

Figure 22:
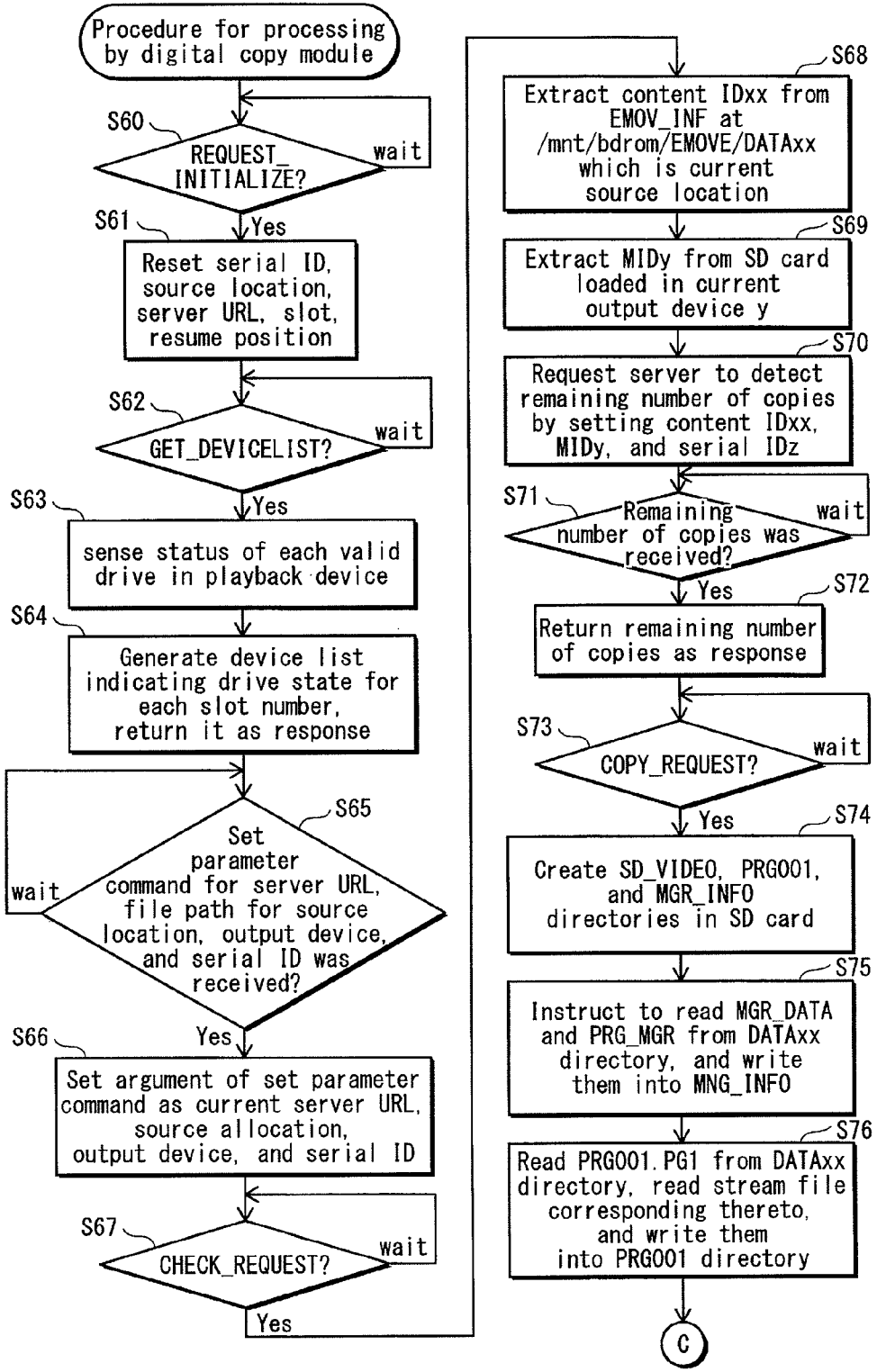
FIG. 22 is a flowchart showing the procedure of the process performed by the digital copy module.

FIG. 22 is a flowchart showing the procedure of the process performed by the digital copy module 35. In step S61, the reception of REQUEST_INITIALIZE is waited (step S60), and when it is received, the process moves to step S61 in which the current serial ID, source location, current server URL, output device, and resume position having been set are reset. Then the reception of GET_DEVICELIST is waited (step S62), and when it is received, the status of each valid drive in the playback device is sensed (step S63). A device list indicating the drive state for each slot number is generated and it is returned as the response (step S64). In step S65, the reception of the set parameters for the current URL, file path for source location, output device, and serial ID is waited is waited. In step S66, operands of the set parameter command are set as the current server URL, source location, output device, and serial ID. In step S67, the reception of CHECK_COPY_REQUEST is waited. In step S68, content IDxx is extracted from EMOV_INF of /mnt/bdrom/EMOVE/DATAxx which is the current source location. On the other hand, MIDy is extracted from the secure memory card 104 loaded in the current output device y (step S69), and the content IDxx, MIDy, and serial IDz are set in the server, and the server is requested to detect the remaining number of times of copying (step S70). After this, the reception of the remaining number of times of copying is waited (step S71). When it is received, the SD_VIDEO directory, MNG_INFO directory, and PRG001 directory are created in the secure memory card 104 (step S74). An instruction is made to read MGR_DATA and PRG_MGR from the DATAxx directory and to write them into the MNG_INFO directory (step S75). In step S76, PRG001.PGI is read from the DATAxx directory, a stream file corresponding thereto is read, and these are written the into PRG001 directory (step S76).

Figure 23:
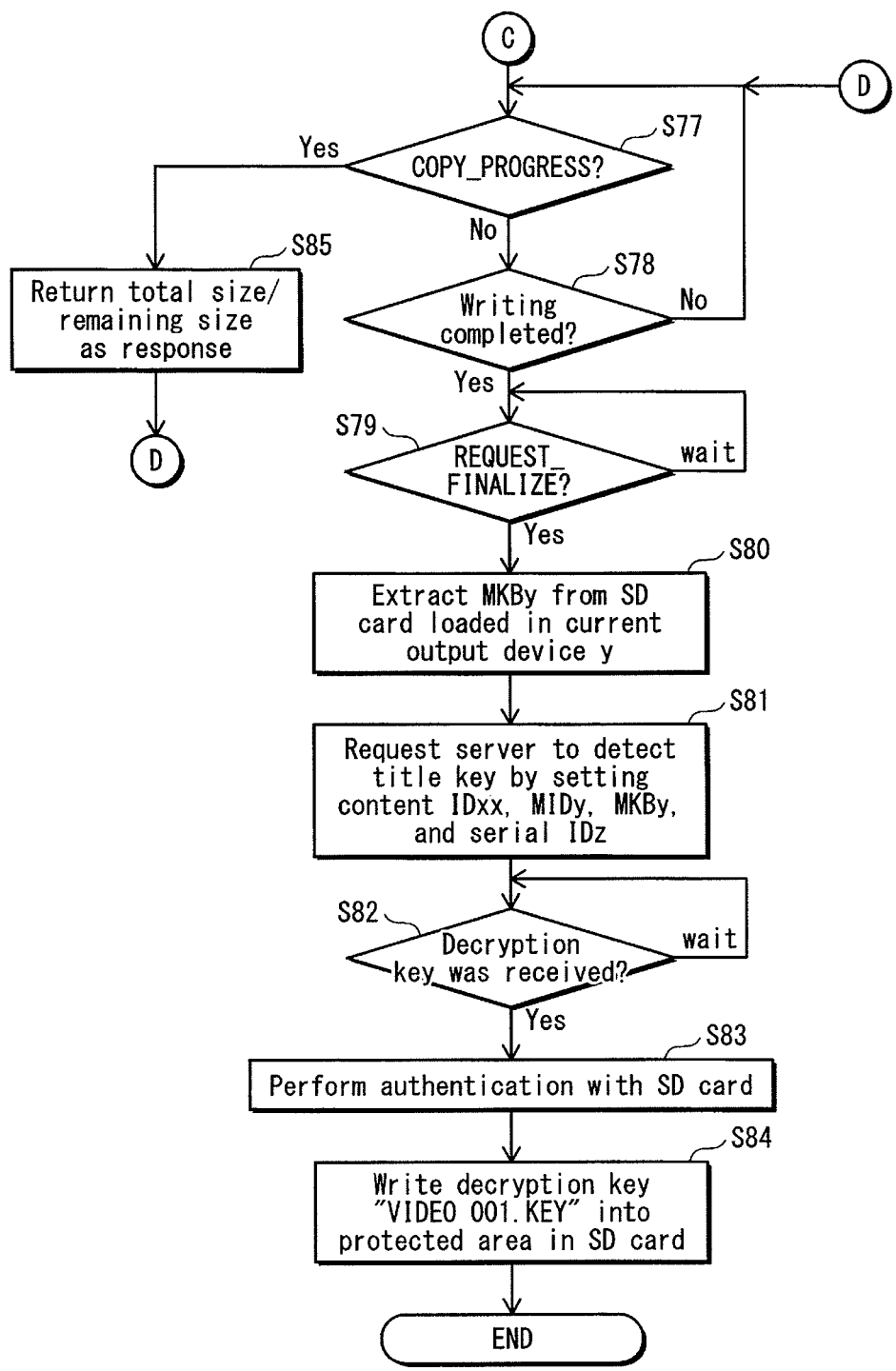
FIG. 23 is a flowchart that is a continuation of the flowchart of FIG. 22.

FIG. 23 is a flowchart that is a continuation of the flowchart of FIG. 22. The steps S77 and S78 constitute a loop, wherein the reception of COPY_PROGRESS is waited (step S77), and the reception of the write completion is waited (step S78). When COPY_PROGRESS is received, the total size/remaining size is returned as the response (step S85). When the writing is completed, the process moves to step S79 in which the reception of REQUEST_FINALIZE is waited. When REQUEST_FINALIZE is received, MKBy is read from the secure memory card 104 loaded in the current output device y (step S80). The content IDxx, medium IDy, MKBy, and serial IDz are transmitted to the server and the server is requested to detect the title key (step S81). In step S82, the reception of the decryption key is waited. When the decryption key is received, the process moves to step S83 in which the mutual authentication with the secure memory card 104 is performed. Then in step S84, VIDEO001.KEY storing the decryption key is written into the protected area in the secure memory card 104.

As described above, according to the present embodiment, the user is requested to input the serial ID and select the stream format on the interactive screen, and based on these information provided by the user, a protected content for mobile terminal that is unique to the stream format preliminarily recorded on the BD-ROM is written to the secure memory card 104. This enables a protected content for mobile terminal in a desired stream format to be recorded quickly onto the secure memory card 104 to be taken out outdoors.

Embodiment 5

In the above embodiments, the built-in library has not been described in detail. The present embodiment describes the built-in library 25 in detail.

The built-in library 25 is composed of basic packages, such as Java2Micro_Edition (J2ME) Personal Basis Profile (PBP 1.0) and Globally Executable MHP specification (GEM1.0.2) for package media targets, and extension packages. By using APIs of these packages, it is possible to describe a BD-J application by the structured programming that uses the method, constructor, interface, and event of classes such as java.net for the network process, java.awt for the GUI process, java.lang for the language process, java.io for the input/output process with the recording medium, java.util which is a utility, and javax.media for the media framework.

The extension package (called "BD-J extension") is composed of the following libraries.

"org.bluray.media" for realizing unique functions using the multi-path-type playlist information not provided by the Java™ Media FrameWork, such as the multi-angle playback using a plurality of digital streams, the picture-in-picture playback using a plurality of video streams, the audio mixing playback using a plurality of audio streams, and the menu playback or subtitle playback using a plurality of graphics streams "org.bluray.ti" for causing the application signaling based on the "service", which is realized in the home platform of the digital broadcast service, to operate while being mapped with the "title"

"org.bluray.application" for managing the life cycle of application

"org.bluray.ui" for defining a constant for a key event, and realizing the synchronization with the video playback "org.bluray.vfs" for mounting a content (off-disc content) contained in the local storage and not recorded on the BD-ROM onto a content (on-disc content) recorded on the BD-ROM These libraries include methods inherited from the methods of the java.net, java.awt, java.lang, java.io, java.util, and javax.media classes, and the playback control for playing back the BD-ROM is defined by using the interfaces of these classes as the embedded interface and super interface. By using these APIs of the BD-J extension, it is possible to create BD-J titles by an extension of a programming technique that uses the java.net, java.awt, java.lang, java.io, java.util, and javax.media classes.

Figure 24:
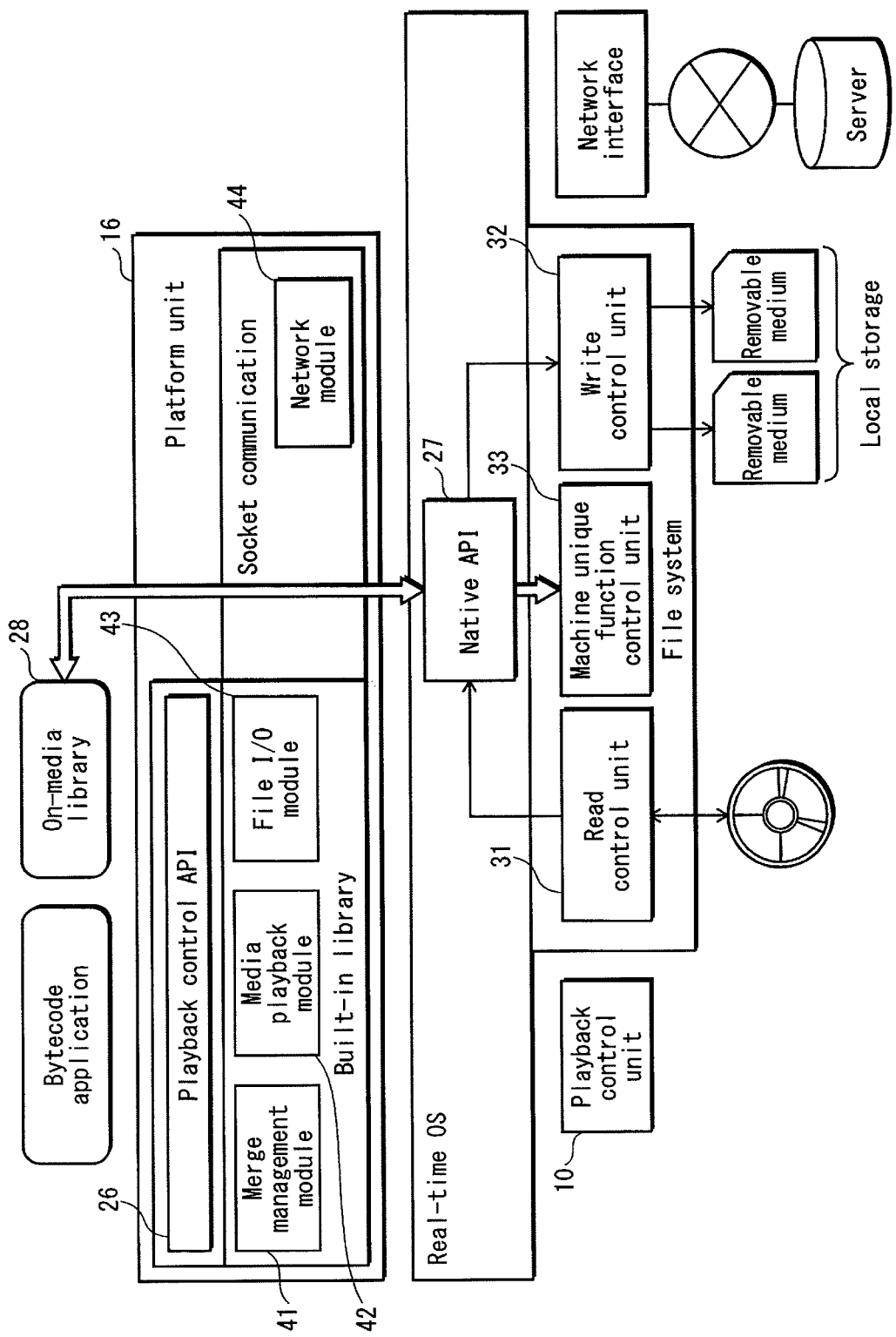
FIG. 24 illustrates a more specific structure of the platform unit 20 that is the bytecode processing module shown in FIG. 4.

FIG. 24 illustrates functional structural elements defined by the BD-J extension. FIG. 24 illustrates a more detailed structure of the built-in library 25 of the platform unit 20 shown in FIG. 4. As shown in FIG. 24, the BD-J extension of the built-in library 25 of the platform unit 20 includes a merge management module 41, a media playback module 42, a file I/O module 43, and a network module 44. Note that the playback control unit 10 and the machine unique function control unit 33 shown in FIG. 24 are the same as those shown in FIG. 4, and are recited here for the sake of explanation.

The merge management module 41 merges the BD-ROM and the local storage as one virtual file system. The virtual file system assigns a file path for the alias access, to a file on the file system in each recording medium of the local storage, and causes an application to execute a file access by using the file path for the alias access as a locator. Here, the assignment of the file path for the alias access to a local storage file is made when an application generates a virtual package in a virtual file system by calling a virtual package creation API with an argument specifying a mount rule file.

The virtual package created by this call indicates a file structure in which files other than the files on the BD-ROM have been added, and/or a file structure in which any files on the BD-ROM have been replaced with other files. The substance of the virtual file package is file management information that indicates the above file structure in which files other than the files on the BD-ROM have been added, and/or the above file structure in which any files on the BD-ROM have been replaced with other files, and is obtained by adding new file entries to the file management information read from the BD-ROM to the memory, or by replacing certain file entries of the file management information read from the BD-ROM to the memory with other file entries.

Note that the mount rule file is a file in which a correspondence between file paths in the local storage and file paths for alias accesses is described by tags in a markup language. Also, a file path for alias access assigned to a file in the local storage is a combination of the BDMV directory and any of the CLIPINF, PLAYLIST, and STREAM directories in the BD-ROM.

When a virtual package is created by the API call by the application, a file in the virtual package can be specified by a locator for the BD-ROM. This makes it possible to use the files in the local storage as if they were recorded on the BD-ROM.

The media playback module 42 provides a bytecode application with APIs for the media playback control. When the bytecode application calls the media playback control API, the media playback module calls a corresponding AV playback library function to control the AV playback.

The file I/O module 43 processes file access requests from the bytecode application to media like the BD-ROM, local storage, and BD writer. The network module 44 provides the bytecode application with APIs for network control. The network module 44 is used to perform a network connection in accordance with a network control request from the bytecode application.

The network module 44 realizes a connection with the server on the Internet. The network I/O module is required to support either the TCP/IP protocol stack or UDP/IP protocol stack and be able to use the HTTP protocol. Physical connections with Ethernet and telephone may be different from each other. To use the network connection, the platform must be authenticated and an appropriate permission must be obtained. This completes the description of the BD-J extension in the built-in library 25. Next, the characteristics of the on-media library 28 based on the BD-J extension in the built-in library 25 will be explained.

The on-media library 28 of the present embodiment is a "digital copy library" dedicated to the analysis of protocol, and provides the bytecode application with APIs (digital copy library APIs) which appear to be extensions of the BD-JAPIs that are playback control APIs. A protocol used for data transmissions/receptions with the digital copy module 35 does not depend on each bytecode application, and the details of the protocol are hidden in the digital copy library, and the protocol is defined as a protocol common to a plurality of bytecode applications. With such a structure, the bytecode application does not need to analyze the protocol that is used in the data transmissions/receptions with the digital copy module 35. This makes it possible to consolidate the management of the analysis of protocol into the library, thereby improving the productivity of the bytecode application. The on-media library 28 is defined by the archive file, and the permission request file in the digital copy library permits the socket communication between the bytecode application and the local host.

This completes the explanation of the built-in library 25. Next, the local storage used to create the virtual file system will be described in detail. As the local storage, the secure memory card 104 may be used.

Figure 25:
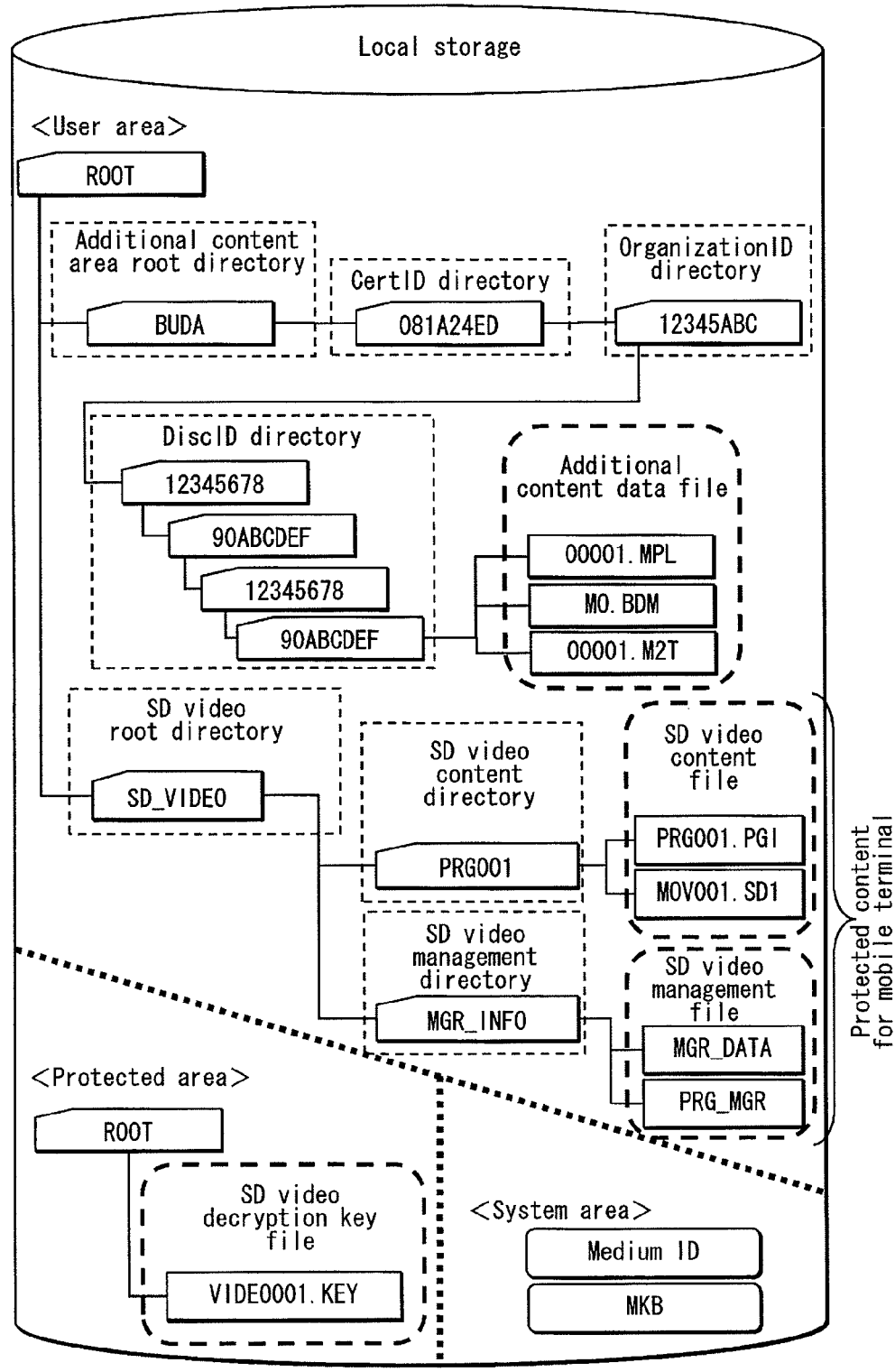
FIG. 25 shows the directory structure in the secure memory card when the card is used as the local storage.

FIG. 25 shows the directory structure in the secure memory card 104 when the card is used as the local storage. The local storage has the following three types of areas: "user area" to/from which the user can freely write/read data and which is visible to the user; "protected area" to/from which the user cannot write/read data and only a system supporting the copyright protection can write/read data, and which is invisible to the user; and "system area" to/from which the user cannot write/read data, to which the system cannot write data, and from which the system can read data. The user area is divided into an additional content area and an SD video area. The additional content area stores contents that are supplementarily used when the BD-ROM is played back, and the SD video area stores contents conforming to the SD video (SD video contents) that are aimed to be played back mainly on the mobile terminal. Both the additional content area and SD video area are provided immediately under the root directory of the user area of the local storage. The directory name of the additional content area is a fixed value composed of a predetermined number or less of characters (BUDA). The applications can store any files, such as an additional file downloaded from the server, into the BUDA directory (including the subdirectory and the subsequent files).

Under the BUDA directory, the OrganizationID directory and the DiscID directory are provided. With this structure in which the directory assigned to a specific provider includes directories that correspond to respective BD-ROMs, download data for each BD-ROM is stored separately.

On the other hand, the directory name of the SD video area is SD_VIDEO, and as is the case with the additional content area, it is provided immediately under the root directory of the user area. Under the SD_VIDEO directory, an SD video content directory ("PRGxxx" wherein "xxx" is variable) and an SD video management directory ("MGR_INFO") are provided. The SD video content directory is divided for each SD video content. The SD video management directory stores a management file of the whole SD video area. The SD video content directory stores the above PRG001.PGI and MOV001.SD1. The SD video management directory stores the above MGR_DATA and PRG_MGR.

A decryption key (VIDEO001.KEY) for decrypting an encrypted protected content for mobile terminal is recorded in the protected area which cannot be accessed by the user. Only a system supporting the copyright protection can access the decryption key.

A media key block (MKB) and medium IDs (MIDs) are recorded in the system area which cannot be accessed by the user and whose data can only be read by the system, wherein the media key block stores key information that is necessary for generating the decryption key, and the medium IDs are identifiers for identifying respective media uniquely.
Media are Assigned with Different Medium IDs Even if they are the Same Type.

Each secure memory card 104 that is used as a local storage is denoted as "BDJstorage=<devicename" in the device list. This arrangement is made in order to distinguish secure memory cards 104 used as local storages from the other secure memory cards 104. That is to say, a secure memory card 104 used as a local storage is often combined with a BD-ROM to form a virtual file system. When such a secure memory card 104 is ejected after a content is written therein, the virtual file system containing the card as a component is destroyed. This is not desirable.

In view of this, the digital copy module 35, when it is requested to confirm the states of the devices in the copy destination state confirmation phase, returns, as a response, a device list indicating for each secure memory card 104 whether it is used as a local storage. With this structure, when a certain secure memory card 104 is used as a local storage, the digital copy management BD-J application performing the copy management can display a warning not to eject the certain secure memory card 104 while the virtual file system is constructed. More specifically, the digital copy management BD-J application can display a warning not to eject the certain secure memory card 104 while a title in a virtual package constructed by the virtual file system is being played back.

As described above the present embodiment enables a secure memory card 104 being used as a local storage to be selected as a destination to which a protected content for mobile terminal is to be copied, while taking a care not to destroy the virtual file system. This increases the usability of the recording medium.

Embodiment 6

In the above embodiments, descriptions have been made of structures that enable various functions to be called independently of the existing APIs. In this connection, as the range of control that an application on a disc can perform expands, the security becomes a growing concern. In Embodiment 6, an example of an embodiment with a tightened security is described. Note that in Embodiment 6, explanation of the same parts as those of Embodiment 1 is omitted, and only differences from the above embodiments are recited. Parts of the present embodiment not recited in the following may be considered as the same as those of the above embodiments.

Figure 26:
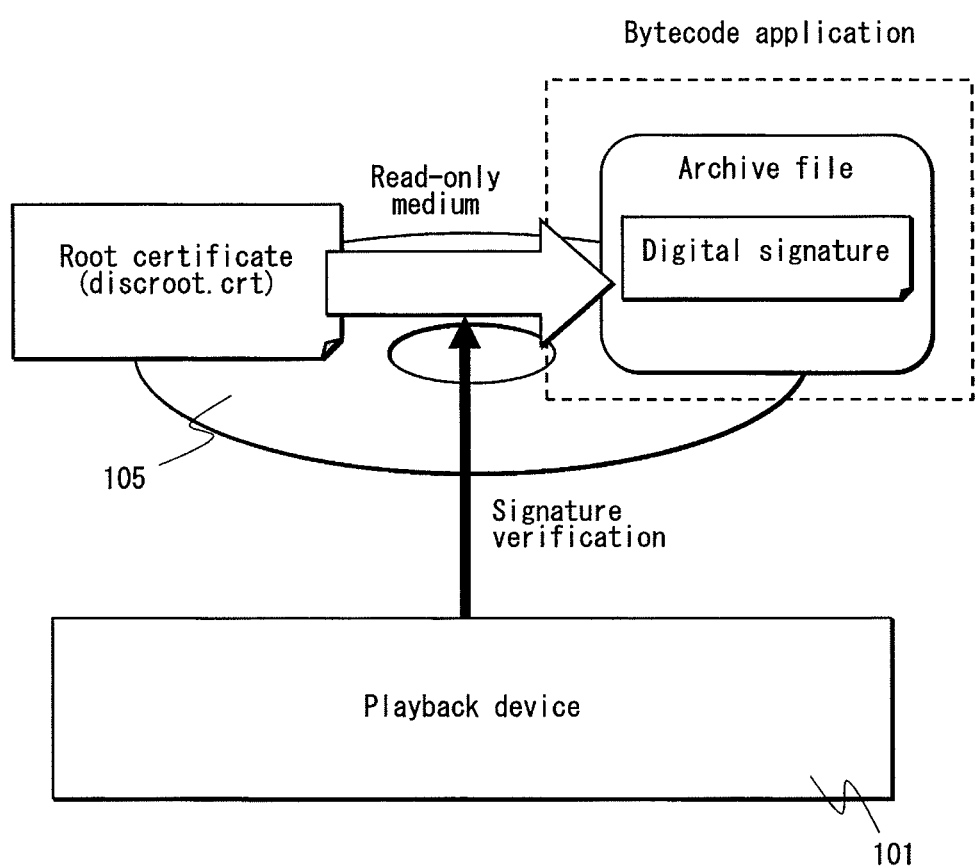
FIG. 26 illustrates a conventional signature verification of the application.

FIG. 26 illustrates a conventional signature verification of the application. To verify whether or not a bytecode application is authentic, a signature verification is performed based on a digital signature stored in an archive file of the bytecode application, and the root certificate (discroot.crt) recorded on the disc. More specifically, it is judged whether or not a hash value, which is obtained by decrypting the digital signature in the archive file based on the root certificate, matches a hash value of each class file constituting the archive file. If they match, it is judged that the archive file is authentic; if they do not match, it is judged that the archive file is unauthentic. However, with this verification method, the authenticity is verified if the root certificate and the digital signature in the archive file make a pair. In these circumstances, if a content provider who holds an authentic root certificate creates the archive file in an unauthorized manner, there is no way to detect it. As a result, when the use of the functions unique to the playback device is allowed as described in Embodiment 1, all content providers who hold authenticate root certificates can use the functions unique to the playback device at will.

Figure 27:
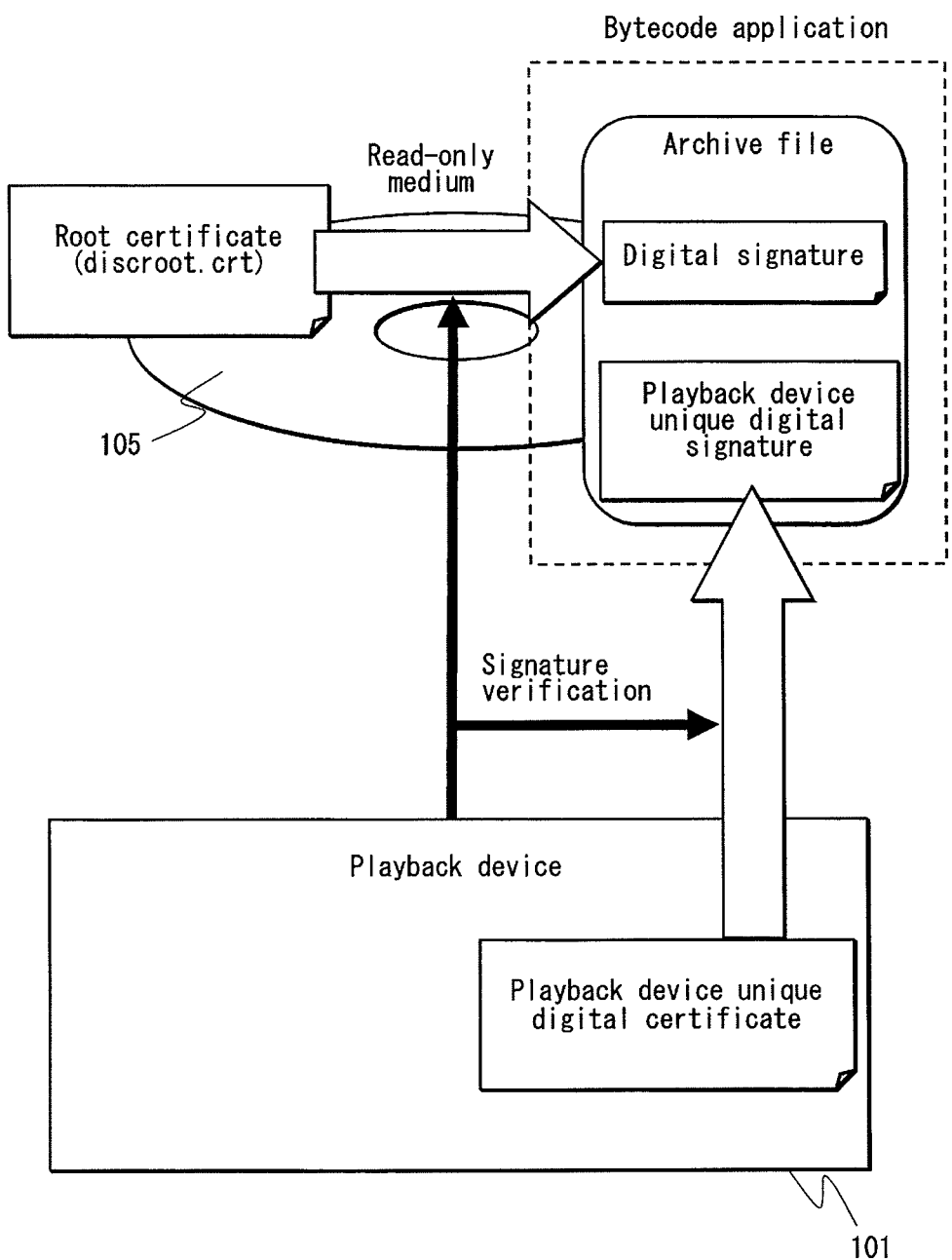
FIG. 27 illustrates a signature verification based on a digital certificate held by the playback device.

FIG. 27 illustrates a signature verification based on a digital certificate held by the playback device. In addition to a digital signature having been made on the basis of the root certificate recorded on the disc, a digital signature based on a digital certificate unique to the playback device is also stored in the "Jar" file of the bytecode application. More specifically, an encrypted value obtained by encrypting a hash value of a manifest file (MANIFEST.MF) by using a secret key corresponding to a digital certificate unique to the playback device is recorded in the "Jar" file as a digital signature unique to the playback device, wherein the manifest file is in the format of a list of hash values of class files stored in the "Jar" file. The playback device performs a signature verification based on the certificate unique to the playback device, in addition to performing the conventional signature verification based on the root certificate.

Figure 28:
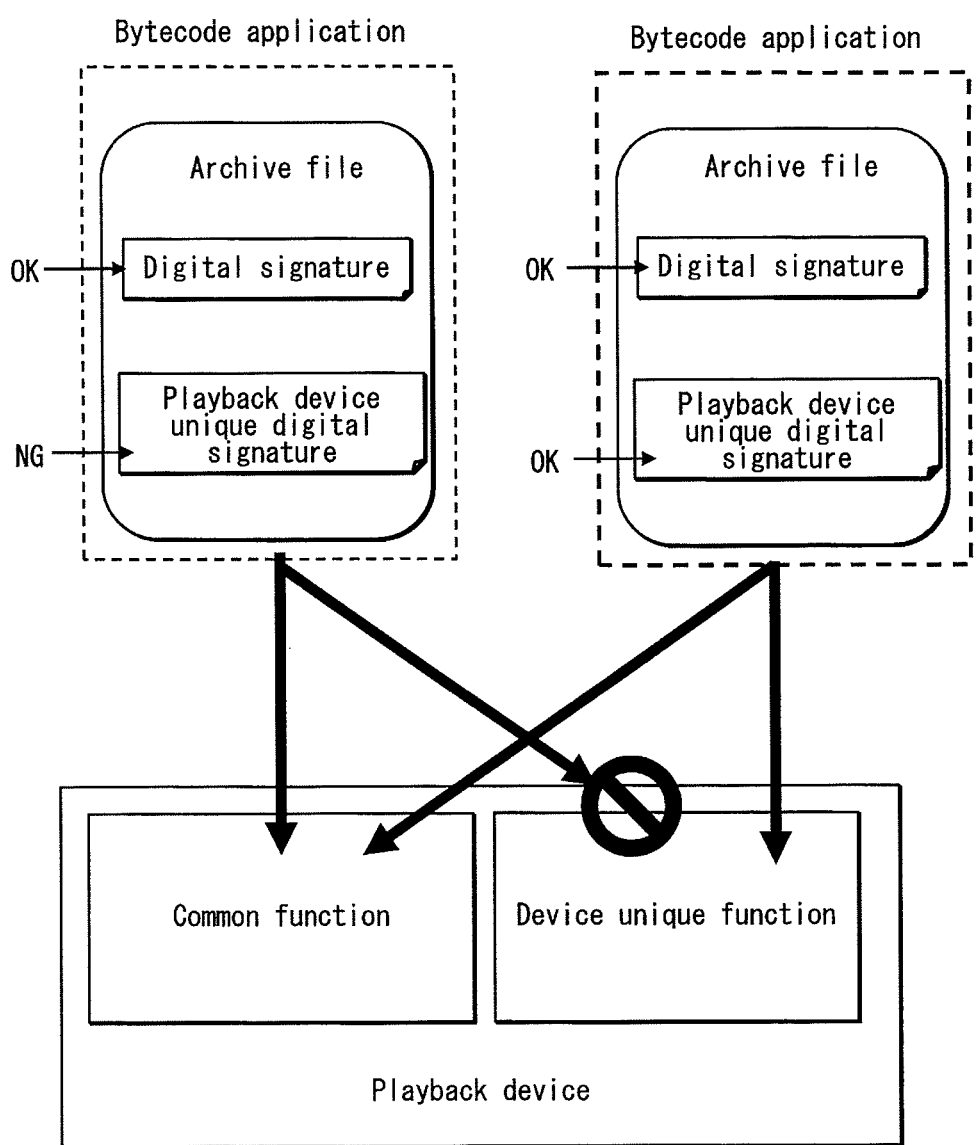
FIG. 28 illustrates how functions are restricted depending on the results of signature verification.

FIG. 28 illustrates how functions are restricted depending on the results of signature verification. As indicated in the drawing, the conventional digital signature based on the root certificate is not sufficient but a digital signature unique to the playback device is additionally required to call a function unique to the playback device. Since a digital signature unique to the playback device cannot be created without a secret key corresponding to a certificate unique to the playback device, the above structure can prevent a third party from using a function unique to the playback device by preparing a digital signature unique to the playback device in an unauthorized manner. Furthermore, even if the digital signature unique to the playback device fails to be verified, it does not affect the conventional calling of the common functions. Thus it is possible to maintain the compatibility in terms of the common functions.

Figure 29:
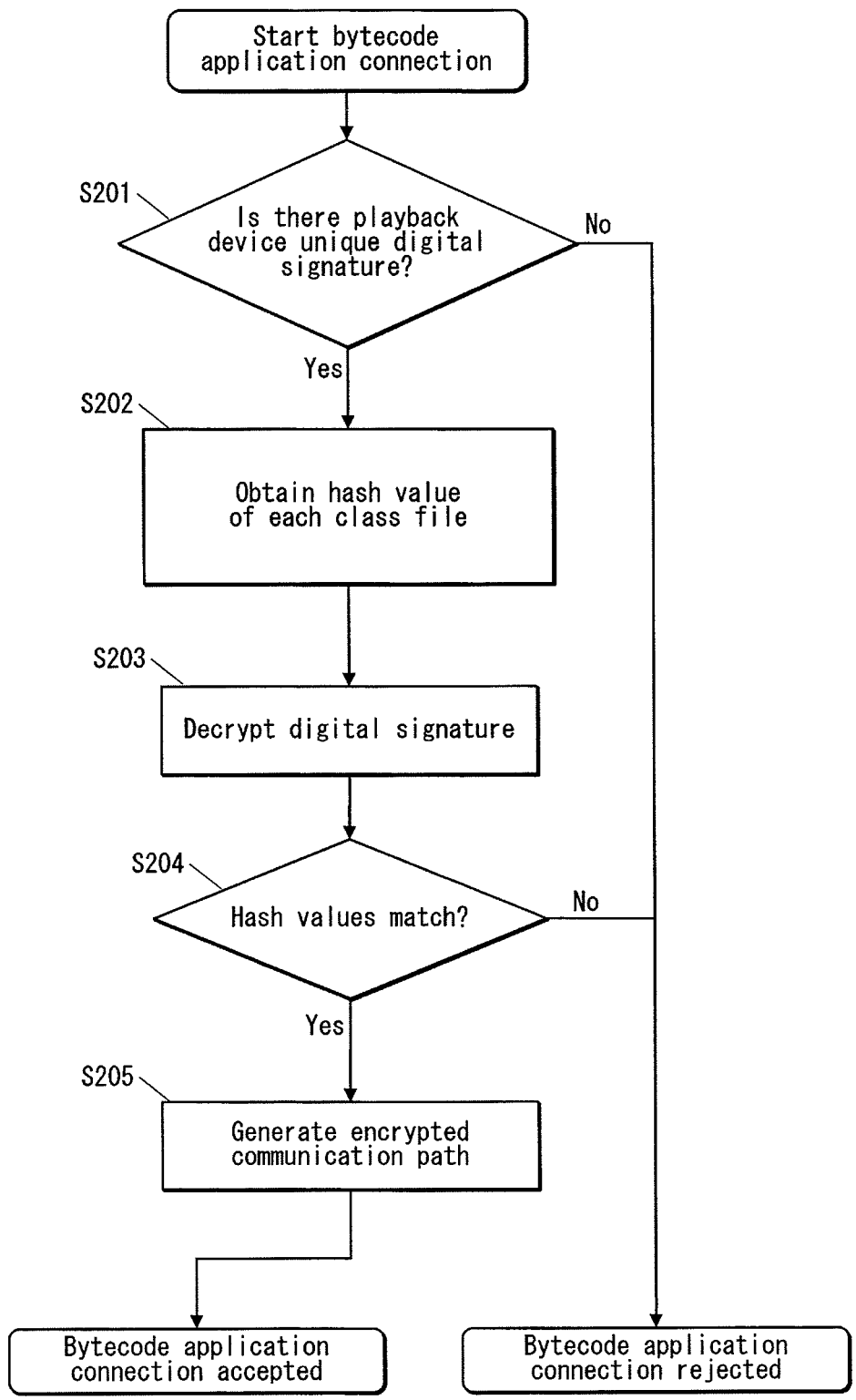
FIG. 29 is a flowchart of the process performed when a connection request for using a machine unique function is made.

FIG. 29 is a flowchart of the process performed when a connection request for using a machine unique function is made. The present flowchart corresponds to step S103 in Embodiment 1, and is different therefrom in that the security has been enhanced. In this process, first the digital copy module 35 judges whether or not a digital signature unique to the playback device has been attached to the bytecode application which is currently making a connection request (step S201). When it is judged that a digital signature unique to the playback device has not been attached to the bytecode application, the playback device rejects the connection request and does not respond to any request made thereafter via a communication port, or may close the port to reject all communications. When it is judged in step S201 that a digital signature unique to the playback device has been attached to the bytecode application, the playback device obtains hash values of class files (step S202). Since the hash values of the class files are written in the manifest file of the "Jar" file, the playback device may only calculate a hash value of the manifest file that is in the format of a list of the hash values in step S202. Next, the playback device obtains the hash value written in the digital signature by decrypting the digital signature unique to the playback device having been attached to the bytecode application by using the digital certificate held by the playback device (step S203). When the hash values obtained in steps S202 and S203 match, it is judged that the digital signature has been attached correctly, and when the hash values do not match, it is judged that the digital signature is not authentic (step S204). When it is judged that the digital signature is not authentic, the playback device does not respond to any request for calling a function unique to the playback device made thereafter via a communication port, as is the case when it is judged in step S201 that a digital signature has not been attached. When it is judged that the digital signature is authentic, the playback device generates an encrypted communication path (step S205). More specifically, the playback device sends the digital certificate held by the playback device to the bytecode application, and the bytecode application generates an encrypted communication socket (SSL socket) by using the digital certificate sent from the playback device. In so doing, a normal socket (for example, a socket command and a response thereto) is not encrypted and non-encrypted data are transferred, but, with the SSL socket, encrypted data that are encrypted by using the digital certificate sent from the playback device are transferred. That is to say, all data transferred between the playback device and the bytecode application via a communication port are encrypted on the communication path.

As described above, according to the present embodiment, the playback device verifies the digital signature attached to the bytecode application, the bytecode application verifies the server certificate sent from the playback device, and data having been encrypted by SSL are transferred via a communication port. With this structure, it is possible to exclude unauthorized bytecode applications and unauthorized playback devices, and prevent the attacks by hackers for obtaining/using data on a communication path in an unauthorized manner.

Embodiment 7

In the above embodiments, descriptions have been made of structures that enable various functions to be called independently of the existing APIs in a secure environment, by taking digital copy as an example of a function unique to the playback device. In the present embodiment, usability of the digital copy is improved. Note that in Embodiment 7, explanation of the same parts as those of the above embodiments is omitted, and only differences from the above embodiments are recited. Parts of the present embodiment not recited in the following may be considered as the same as those of the above embodiments.

Figure 30:
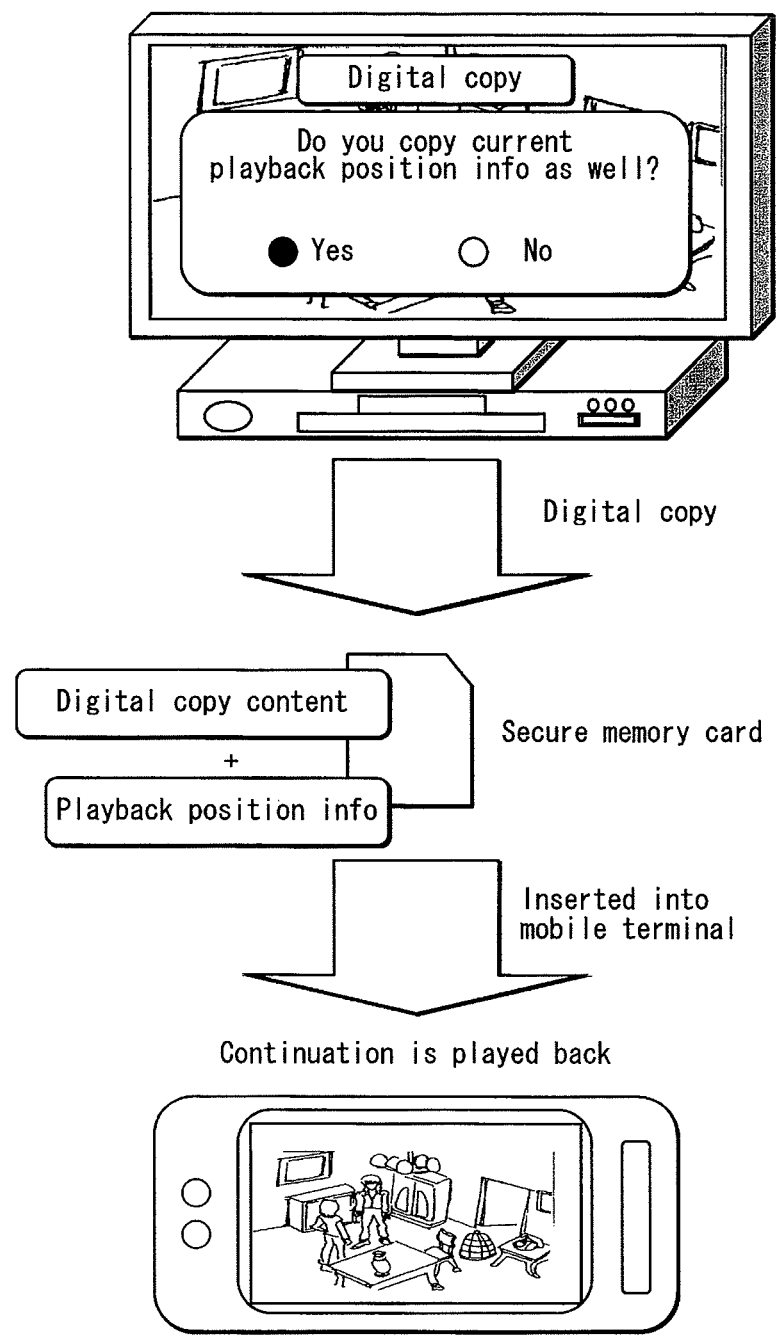
FIG. 30 illustrates a case where the user watches a content halfway through on the playback device, and watches the continuation on the mobile terminal.

FIG. 30 illustrates a case where the user watches a content halfway through on the playback device, and watches the continuation on the mobile terminal. When the user would like to watch a content, which he/she had been watching on a television connected with a playback device at home, also outside the home, it is desirable that the playback on the mobile terminal does not start from the beginning, but from the position where the user stopped the playback at home. In that case, when the digital copy is performed, not only the content but also the playback position information needs to be copied. In the SD video format in which the data is recorded on the SD memory card, it is possible to record the playback position information, which indicate the resume position, in the SD video management file "MGR_DATA". Thus it is possible to realize the above convenience by recording the playback time, at which the playback with the playback device at home was stopped, into the SD video management file when the digital copy of the content is performed.

Figure 31:
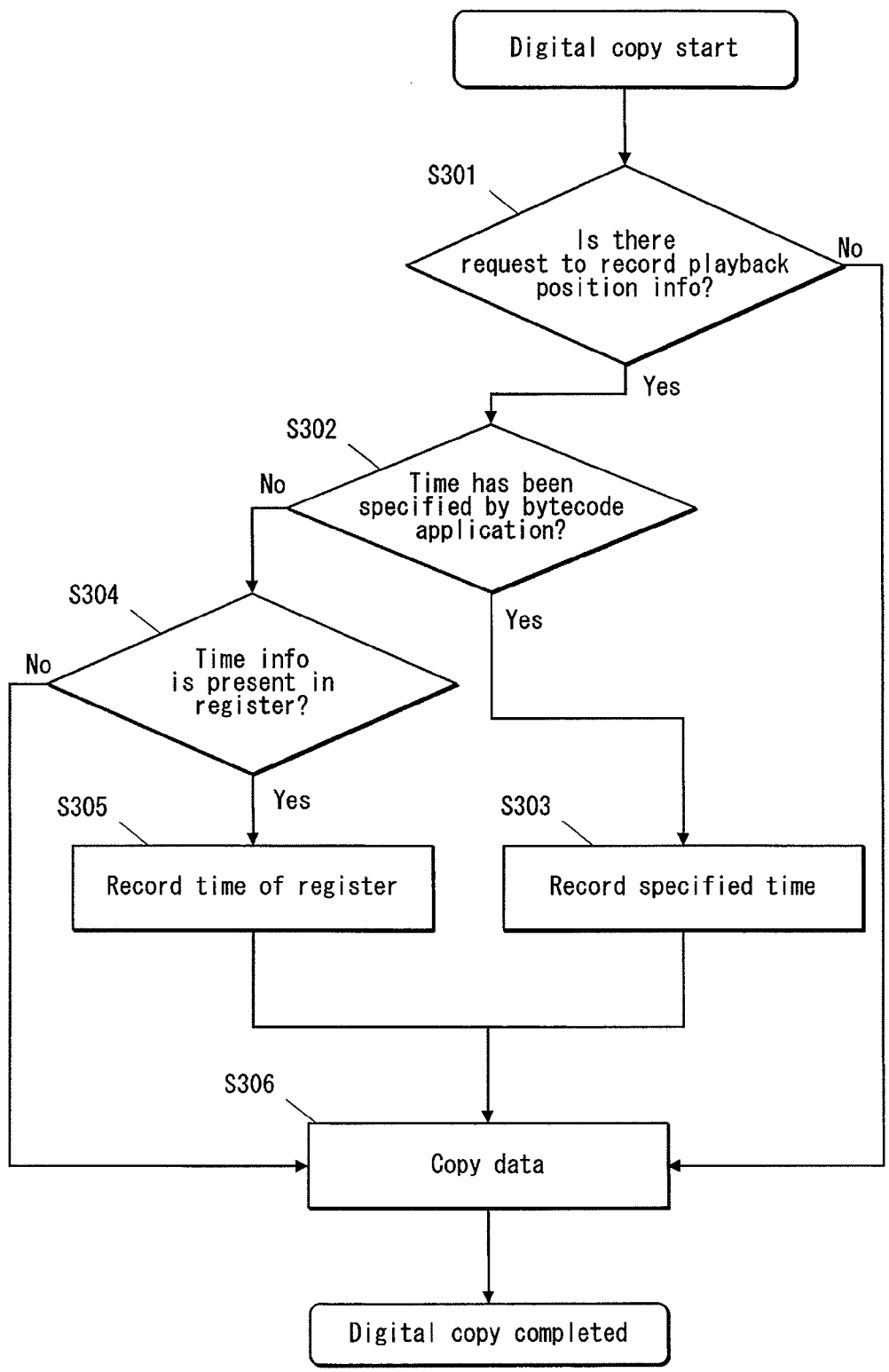
FIG. 31 is a flowchart of the data copy in Embodiment 7.

FIG. 31 is a flowchart of the data copy in Embodiment 7. When a protected content for mobile terminal is copied onto a copy destination medium, it is judged whether or not an instruction to record the playback position information has been specified (step S301). The instruction to record the playback position information is notified from the bytecode application to the digital copy module 35 via a communication port for digital copy socket command.

In the example shown in FIG. 30, the user is inquired whether he/she wants copying of the playback position information by the bytecode application. However, not limited to this, the instruction to copy the playback position information may always be specified. In either way, before it copies data, the digital copy module 35 judges whether or not an instruction to record the playback position information has been specified by the bytecode application, and if the instruction has not been specified, the digital copy module 35 copies the data as it is, without modifying the SD video management file. If it is judged in step S301 that an instruction to record the playback position information has been specified, it is judged whether or not a playback time has been specified by the bytecode application (step S302). For example, when the content has been viewed for 30 minutes on the playback device, a value "1,800,000(msec)" is handed over. When the playback time has been specified and the value is valid, the specified time is written into the SD video management file (step S303). When it is judged in step S301 that an instruction to record the playback position information has been specified, but it is judged in step S302 that a playback time has not been specified, it is judged whether or not a playback time is recorded in the player register (step S304). Here, since the playback device has a plurality of registers, and one of them is assigned to the playback resume, the value stored in the register assigned to the playback resume is checked. When a value that is valid as a playback time is stored in the register for the playback resume, the value is written into the SD video management file (step S305). If an instruction to record the playback position information has been specified, but a playback time has not been specified, nor is a valid playback time stored in the register, the digital copy module 35 copies the data as it is, without modifying the SD video management file. (step S306). With the above structure in which the playback position information can be copied as well as the content in the digital copy, the playback can be resumed on the mobile terminal from the position where the user stopped the playback with the playback device at home. This further improves the usability of the digital copy.

Embodiment 8

In the above embodiments, descriptions have been made of structures for performing a digital copy between different recording media. In the present embodiment, a description is made of a structure for performing a digital copy when the copy source and the copy destination are the same recording medium.

Note that in Embodiment 8, explanation of the same parts as those of the above embodiments is omitted, and only differences from the above embodiments are recited. Parts of the present embodiment not recited in the following may be considered as the same as those of the above embodiments.

Figure 32:
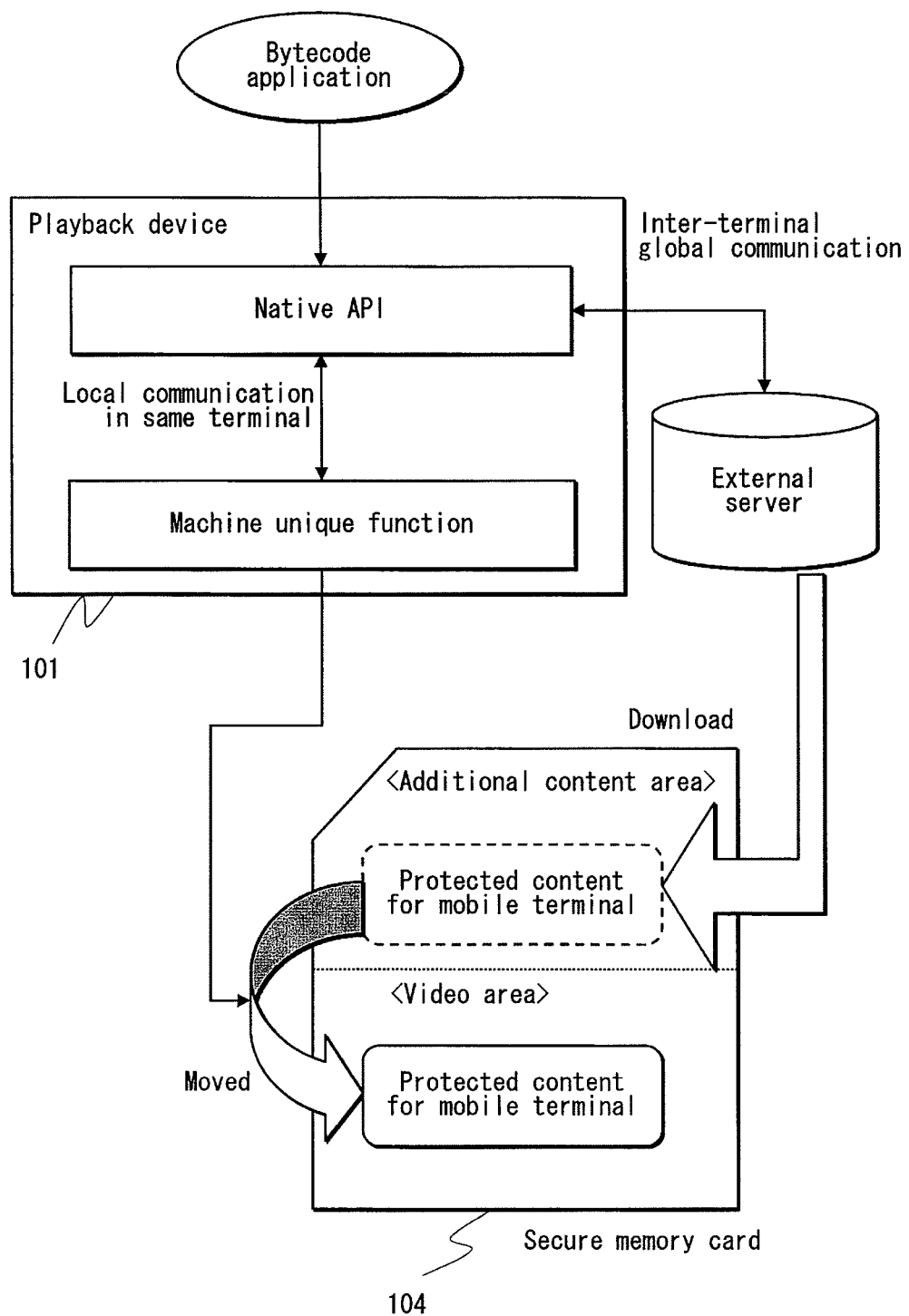
FIG. 32 illustrates a digital copy in which the copy source and the copy destination are the same recording medium.
Figure 33:
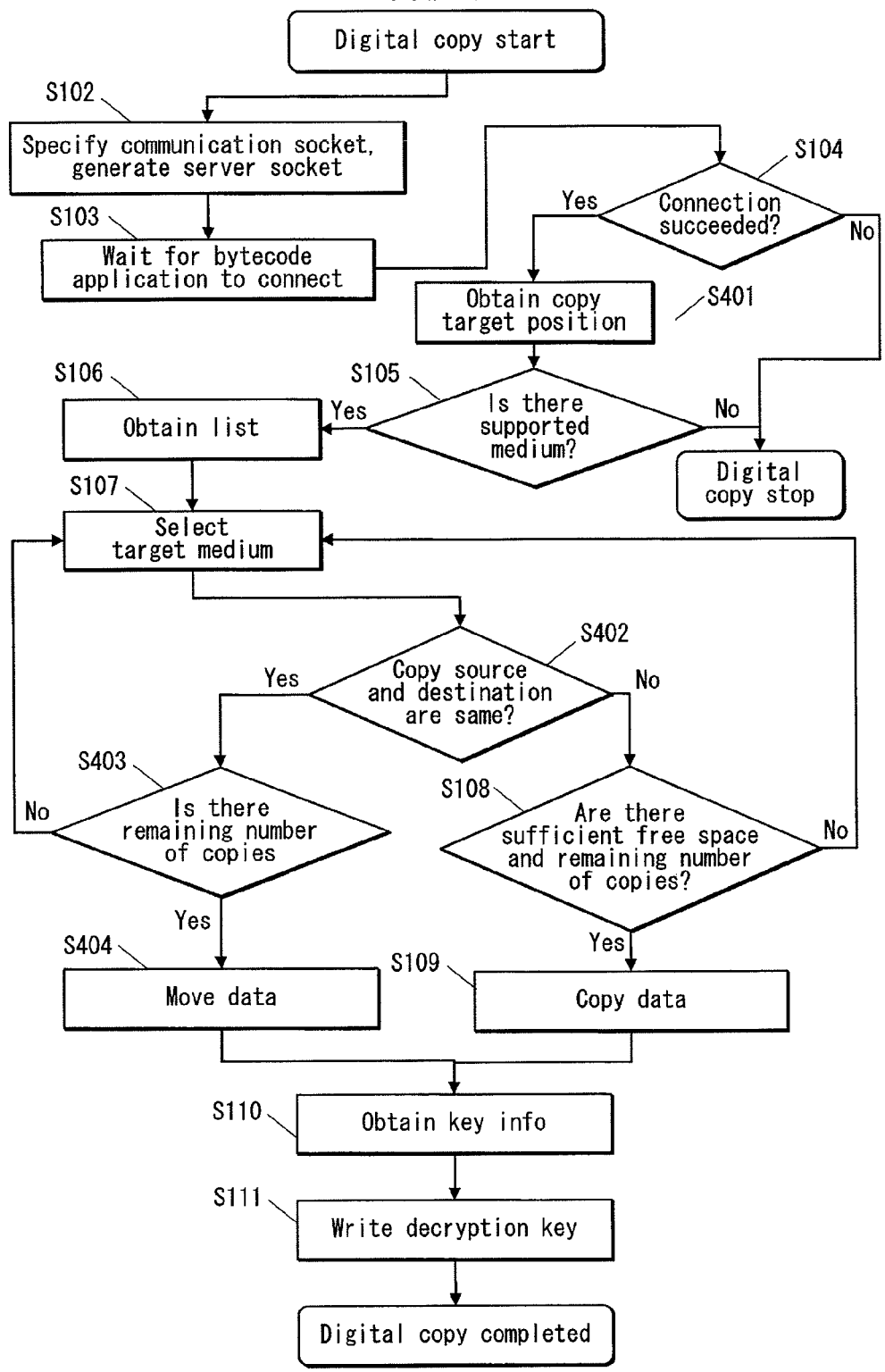
FIG. 33 is a flowchart showing the procedure of a digital copy in which the copy source and the copy destination are the same recording medium.

FIG. 32 illustrates a digital copy in which the copy source and the copy destination are the same recording medium. As one example of the case where the copy source and the copy destination are the same, the following case is considered: a protected content for mobile terminal as the target of copying is not present on the BD-ROM, and the bytecode application downloads the protected content for mobile terminal from the server via an external network. However, as shown in FIG. 6, since the additional content area is separated from the video content area, the bytecode application cannot download the data directly into the video content area. The areas where the bytecode application can access freely are limited to the "Organization" directory, to which the bytecode application belongs, and the areas under the "Organization" directory. The access range is determined in order to prevent a content from being moved or deleted in an unauthorized manner by an entity belonging to another "Organization". Accordingly, the procedure for the bytecode application to additionally download a protected content for mobile terminal is as follows: first, the bytecode application temporarily stores the content into an area included in or under the "Organization" directory; then calls a terminal unique function via the local communication in the mobile terminal, FIG. 33 is a flowchart showing the procedure of a digital copy in which the copy source and the copy destination are the same recording medium.

In a digital copy in which the copy source and the copy destination are the same recording medium, the judgment on whether or not there is a protected content for mobile terminal on the disc having been inserted in the playback device, the judgment performed in step S101 as described above, is not necessary.

This is because even if a protected content for mobile terminal is not present on the disc, the protected content for mobile terminal as the target of copying may be recorded on the local storage. When the port open time is minimized in the present embodiment, as described in Embodiment 1, for example, a port is opened only when a bytecode application is running (namely, only when a BD-J title is played back), or a port is opened after a port open instruction is received from a bytecode application, regardless of whether a protected content for mobile terminal is present. When it is judged in step S104 that a connection with the bytecode application has succeeded, the digital copy module 35 waits for the storage position of the protected content for mobile terminal as the copy target to be specified by the bytecode application (step S401).

The storage position of the protected content for mobile terminal as the copy target is indicated by an absolute path that contains the type of medium. For example, if a position on the BD-ROM is specified, the absolute path is indicated by "/mnt/bdrom/EMOVE/DATA01" for example, and if a position on the local storage (the secure memory card 104 or the like) is specified, the absolute path is indicated by "/mnt/sdcard/BUDA/081A24ED/12345ABC/EMOVE/DATA01" for example. In that case, "/mnt/bdrom" corresponds to the mount point of the BD-ROM medium, and "/mnt/sdcard" corresponds to the mount point of the secure memory card 104. That is to say, by including the mount point of the medium in the file path information specified by the bytecode application, the digital copy module 35 can determine on which medium a protected content for mobile terminal as the copy target is present. The positional information of the copy target obtained in step S401 and the type of the medium determined from the positional information are used in the comparison with the type of the medium selected in step S107 (step S402).

When it is judged that the medium specified in step S401 (namely, the copy source medium) is not identical with the medium specified in step S107 (namely, the copy destination medium), the control goes to step S108 in which it is judged whether or not with regard to the selected medium, there is a sufficient amount of free space to perform the copy and there is a remaining number of times of copying; and when it is judged that the media are identical with each other, the check of the free space is skipped, and only the remaining number of times of copying is checked (step S403). When it is judged in step S403 that there is a remaining number of times of copying, the digital copy module 35 moves the copy target specified in step S401 to the video area in the same medium (step S404). When the data is moved within the same medium, an actual data copy is not necessary, but only the management information of the file is rewritten. Accordingly, the process of moving the data is completed in a short time period. Thus the displaying of the progress by the bytecode application can be skipped.

With the above-described structure, even if a protected content for mobile terminal has not been recorded on the BD-ROM in advance, a digital copy can be performed by additionally downloading the protected content for mobile terminal, and moving the content in the digital copy processing. Also, when the download destination and the digital copy destination are the same medium, the free space is not consumed wastefully and the copy itself can be performed at a high speed.

Embodiment 9

In the present embodiment, how to create the recording media described in the above embodiments, namely a recording method is explained.

The recording method of the present embodiment can be realized as a real-time recording in which AV files (stream files) and non-AV files (files other than the stream files) are generated in real time, and are written directly into the AV data recording area and the non-AV data recording area provided in the recording medium. However, not limited to this, the recording method of the present embodiment can be realized as a pre-format recording in which bit streams to be recorded into the volume area are generated in advance, a master disc is generated based on the bit streams, and the master disc is pressed, thereby making possible a mass production of the optical disc. The recording method of the present embodiment is applicable to either the real-time recording or the pre-format recording. Here, the recording method by the pre-format recording includes the following steps: (1) BD-ROM authoring step; (2) copyright protection step; (3) pressing step; and (4) packaging step for packaging the BD-ROM obtained by the pressing.

The recording method of the present embodiment is different from conventional recording methods in that it has (1-1) step for creating a digital copy support menu, which is performed after (1) BD-ROM authoring step is completed and before (2) copyright protection step is performed.

The reason why the step for creating a digital copy support menu is provided is that it enables an interactive control menu for digital copy to be displayed from the overall menu of the BD-ROM or the title menu. Furthermore, in parallel with (1) BD-ROM authoring step through (2) copyright protection step, (i) an encoding step for generating digital streams constituting a protected content for mobile terminal, and (ii) a copyright protection step for encrypting the digital streams generated in the encoding step, are present.

Also, there is a step for registering a serial ID in the server, wherein the serial ID to be registered is the one that is included in the package, or the one that is written on the disc in the disc press step.

<Supplementary Notes>

Up to now, the present invention has been described through the best embodiments that the Applicant recognize as of now. However, further improvements or changes can be added regarding the following technical topics. Whether to select any of the embodiments or the improvements and changes to implement the invention is optional and may be determined by the subjectivity of the implementer.

<Variations of Machine Unique Function>

In the above embodiments, a digital copy is taken as an example of the function unique to the playback device. However, not limited to this, the function may be a recording function or a linkage between the distribution service and an application on the recording medium. That is to say, the function unique to the playback device of the present invention is not limited to the digital copy. For example, the present invention is applicable to a service for preselecting desired programs for recording via an application on the recording medium, or a service for performing a download in concert with a distribution service.

<Variations of Playback Device>

In the above embodiments, only a playback device having a function to play back a recording medium is described. However, the present invention is not limited to such a playback device. For example, the present invention is applicable to a recording/playback device having a recording function.

<Variations of Programming Language>

In the above embodiments, Java™ is used as a programming language of the application. However, not limited to this, any other programming language, such as B-Shell used in the UNIX™ OS or the like, Perl Script, or ECMA Script, may be used.

<Variations of Recording Medium>

In the above embodiments, a BD-ROM played back by a playback device is described. However, of course, the same effects as those of the above embodiments are produced if a rewritable optical recording medium, on which the necessary data recorded on the BD-ROM described in the above embodiments has been recorded, is played back.

Also, in the above embodiments, a BD-ROM or a rewritable optical recording medium is used as a specific example of the copy source recording medium. However, not limited to these, for example, a removable medium, namely a portable recording medium such as an SD memory card, a memory stick, a Compact Flash™, a SmartMedia™, a multimedia card may be used.

When a removable medium is used as the copy source recording medium, the removable medium is provided with an area (user area) in which data having the directory structure recorded in the volume area illustrated in FIG. 11, and the protection area and the system area illustrated in FIG. 25.

In that case, a content for mobile terminal recorded on the copy source removable medium is copied to the copy destination removable medium. Of course, the copy source removable medium and the copy destination removable medium are different media.

When the BD-ROM is used as the copy source recording medium, according to the above embodiments, for example, the key information reading unit 602 reads PMSN (Pre-recorded Media Serial Number) indicating the physical serial ID of the recording medium, from the BCA (Burst Cutting Area) which is a special area provided on the BD-ROM as the copy source. On the other hand, when a removable medium is used as the copy source recording medium, information unique to the removable medium as the copy source (medium ID) may be read instead of the PMSN.

In this way, the operation when the removable medium is used as the copy source recording medium is the same as the one obtained when the removable medium replaces the BD-ROM as the copy source recording medium, and the information unique to the removable medium (medium ID) replaces the serial ID of the BD-ROM, in the explanations and drawings of the above embodiments.

Also, when a removable medium is used as the copy source recording medium, among the data recorded in the area (user area) in which data having the directory structure recorded in the volume area of the BD-ROM is recorded, some data (for example, stream data) is encrypted data.

Furthermore, when a removable medium is used as the copy source recording medium, data may be recorded in the user area in advance before the removable medium is distributed. In that case, if some data among the data recorded in the user area is encrypted data, a decryption key, which includes key information (a title key) to be used to decrypt the encrypted data, is recorded in the protected area of the copy source recording medium in advance before the removable medium is distributed. In that case, the decryption key should be encrypted such that it can be decrypted by using MKB in the system area of the copy source recording medium.

Alternatively, when a removable medium is used as the copy source recording medium, data may not be recorded in the user area in advance before the removable medium is distributed, but after the distribution, upon receiving a download request or the like, data having the directory structure recorded in the volume area of the BD-ROM may be recorded in the user area. The device that is used to request a download may be the playback device described in the above embodiments, or may be a terminal device for performing a download that is different from the playback device described in the above embodiments. In that case, first, a distributed removable medium is inserted into the device that is used to request a download, and while the removable medium is electrically connected with the device, the device reads a request to download data and the medium ID of the removable medium and MKB from the removable medium, and transmit the read data to the distribution server. The distribution server returns a piece of data, which corresponds to a decryption key generated by using the medium ID of the removable medium and MKB, to the device that transmitted the download request. The device that transmitted the download request records the received data into the user area of the removable medium, and records a received public key file into the protected area of the removable medium. In that case, if some data among the data recorded in the user area is encrypted data, a decryption key, which includes key information (a title key) to be used to decrypt the encrypted data, is recorded in the protected area of the copy source recording medium. In that case, the decryption key should be encrypted such that it can be decrypted by using MKB in the system area of the copy source recording medium.

With the above-described structure, a removable medium can be used as the copy source recording medium.

With above structure, even if only a content for mobile terminal recorded in the user area is recorded onto another removable medium in a method that is different from the method of the present embodiment, a playback by an unauthorized copy can be prevented because the other removable mediums does not have information regarding the decryption key.

Furthermore, even if the decryption key is recorded onto the other removable medium as well, the MKB of the other removable medium is different from the MKB of the copy source removable medium, thus the encrypted decryption key cannot be decrypted, and the data recorded in the user area of the copy source removable medium can be prevented from being used in an unauthorized manner.

<Warning During Copy>

There is a risk that normal playback of a BD-ROM content may not be possible during copying because I/O processing is monopolized by the copy execution unit 604. For this reason, notifying the user beforehand that playback will not be possible, that the disc must not be ejected, and that the device must not be powered off for the duration is recommended. Yet, the user may nevertheless mistakenly eject the disc or power off the device. However, because the decryption key writing process has not been completed yet at this point in time, and thus the remaining number of times of copying has not been reduced yet, the remaining number of times of copying is not reduced even if the data copy fails here. The remaining number of times of copying, which is managed by the digital copy server 36, is reduced when the decryption key is downloaded from the digital copy server 36 in the next step.

<Judgment on Whether Protected Content for Mobile Terminal is Present>

Whether or not a protected content for mobile terminal is present may not be judged based on whether or not the "EMOVE" directory is present, but be judged based on whether or not a file, which indicates the presence of a protected content for mobile terminal and is determined beforehand, is present.

<Display of List of Media>

To a medium that is found to have little free space or have not been inserted into the device at the time when a list of media is displayed, a mark (or flag) indicating that it has little free space or has not been inserted into the device may be attached.

<Connection URL for Connection to Digital Copy Server 36>

As the connection URL for connection to the digital copy server 36, a fixed URL held by the playback device, or a URL specified by the bytecode application may be used. The digital copy server 36 may be a server that is different for each content provider or for each region. Accordingly it is desirable that a URL specified by the bytecode application via a communication port is used to connect the digital copy server 36.

<Server Certificate>

The server certificate, which is a digital certificate sent by the playback device to the bytecode application for creation of the SSL socket, may be different from a digital certificate that is used for use of the machine unique function. If so, the playback device prepares two types of digital certificates: one for encrypted communication; and one for the unique function. Additionally, in order to prevent an unauthorized operation of the playback device, the bytecode application may verify the authenticity of the server certificate sent by the playback device. For instance, given the risk that playback devices allowing unregulated copying may appear, it is preferable that the bytecode application verify the authority of the playback device as well. If upon verification, the sever certificate sent from the playback device is found to be blacklisted, that playback device can be prevented from performing digital copies and the like by the bytecode application.

<Variations of Process>

In Embodiment 8, the digital copy within a single medium is a "move" since it does not unnecessarily consume space on the medium and the data copy can be completed within a short time. However, if there is sufficient free space available or the content to be copied is of small size, then the copy may be executed with the source file remaining as-is.

<Variations of Copy Source Unit>

If there are four variations of a main story content, and any of the four variations can be played back when the main story content is played back, four protected contents for mobile terminal that correspond one-to-one to the four variations may be recorded in the DATA01, DATA02, DATA03, and DATA04 directories in advance, respectively. With this structure, any of various versions of a main story content for viewing can be copied.

<Bytecode>

With regard to the "bytecode" described in the above embodiments, it is presumed that, for example, the codes whose word lengths are two-byte or less cause the Java virtual machine to perform an operation onto an operand stack, local variable, or object array. The operations onto the operand stack, local variable, or object array include an extraction from the operand stack, collection into the operand stack, extraction of an object reference from the object array, storage of an object reference into the object array, ending a method and returning to the call source, value type conversion, comparison, performing addition/subtraction/multiplication/remainder operation onto the operand stack, sign inversion, and copy with word insertion. Any program codes that have such characteristics and are technically identical with the bytecodes may be used in the generation of an application.

<Class File>

The bytecode application is an instance of a class file. Here, the class file is a structure file that has a data structure that is constituted from some blocks, each of which has a detailed structure, and a hierarchical management of various types of data is possible. Here, the detailed structure refers to a structure in which a plurality of constant pools, a plurality of pieces of field information. a plurality of pieces of method information, and a plurality of pieces of attribute information are present. The attribute information is an abstract class, and the sub-classes thereof constitute a lower structure of the class file, field information, and method information. For example, among a plurality of attributes of the attribute information, the code attribute is an attribute of the method information. By the method information, the characteristics of the bytecode application as the program are defined. Any data structure that has such characteristics and can be regarded as technically identical with the internal structure of the above class file can be used in the creation of a bytecode application.

<Embodiment of Integrated Circuit>

The integrated circuit of the present invention is a system LSI in which the core of the logic circuit is embedded, wherein the core of the logic circuit is composed of the logic circuit and the memory element that remain after the mechanical parts such as the recording medium drive and connectors with the external devices are removed from the hardware structure of the playback device. The system LSI is obtained by implementing a bear chip on a high-density substrate and packaging them. What is called a multi-chip module is also a system LSI, the multi-chip module being obtained by implementing a plurality of bear chips on a high-density substrate and packaging them, so that the plurality of bear chips have an outer appearance of one LSI.

With regard to the type of packaging, the system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as a power supply, ground, and interface with other circuits. Since the pins in the system LSI function as an interface, the system LSI, when it is connected with other circuits through such pins, plays a role as the core of the playback device.

Figure 34:
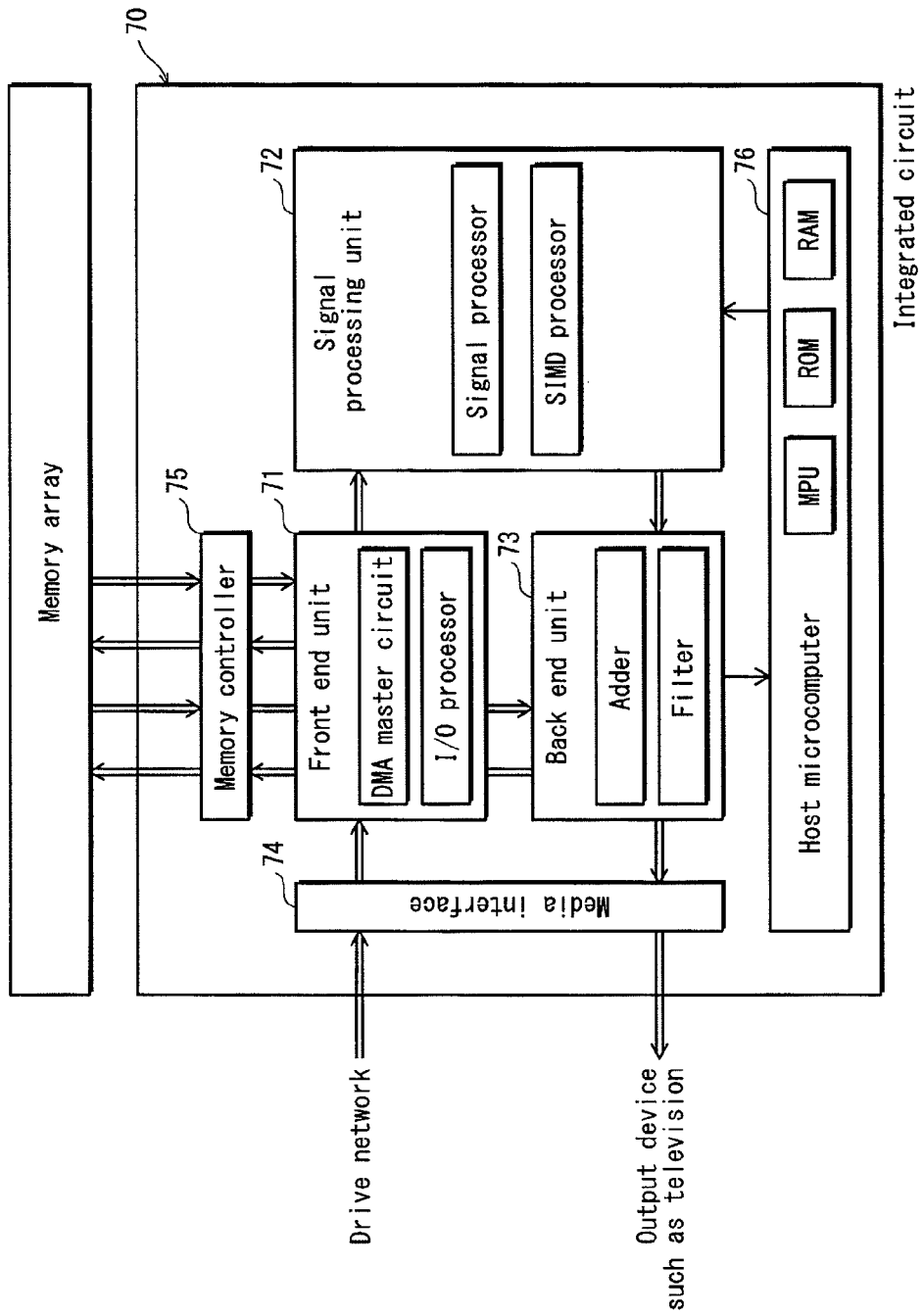
FIG. 34 illustrates the architecture of the integrated circuit of the present invention.

FIG. 34 illustrates the architecture of the integrated circuit. As shown in FIG. 34, the architecture of an integrated circuit 70 being a system LSI includes a front end unit 71, a signal processing unit 72, a back end unit 73, a media interface 74, a memory controller 75, and a host microcomputer 76. The integrated circuit 70 is connected with the drive, memory, and transmission/reception unit of the playback device via the media interface 74 and the memory controller 75. The playback device has drives for BD-ROM, local storage, removable medium and the like.

The front end unit 71, having preprogrammed DMA master circuit, I/O processor and the like, performs the packet processing in general. The packet processing includes processing of the source packet depacketizer by the demultiplexer, and processing of the PID filter. The above packet processing is realized by realizing the DMA transfer between the track buffer, various plane memories, and various buffers provided in the memory of the playback device.

The signal processing unit 72, composed of a signal processing processor, SIMD processor and the like, executes the signal processing in general. The signal processing includes decoding by the video decoder and decoding by the audio decoder.

The back end unit 73, composed of an adder and a filter, performs the AV output processing in general. The AV output processing includes a pixel processing in which the screen superimposing, resizing, and image format conversion are performed for the layer overlay. Also, a digital/analog conversion and the like are performed as well.

The media interface 74 is an interface with the drives and network.

The memory controller 75 is a slave circuit for memory accesses. The memory controller 75 realizes reading/writing of a packet or picture data from/onto the memory, in response to a request made by the front end unit, signal processing unit, or back end unit. The reading/writing from/onto the memory via the memory controller 75 causes the memory to function as a truck buffer and as various types of buffers in the video plane, graphics plane, and video decoder.

The host microcomputer 76, composed of the MPU, ROM, and RAM, performs the entire control onto the media interface, front end unit, signal processing unit, and back end unit. The entire control includes the controls that are performed by the playback control unit, bytecode processing module, command processing module, and mode management module. The CPU in the host microcomputer includes an instruction fetch unit, a decoder, an execution unit, a register file, and a program counter. The programs for executing various processes described above in the present embodiment are, as embedded programs, stored in the ROM provided in the microcomputer of the host microcomputer, together with the basic input/output system (BIOS) and various middlewares (operation systems). Accordingly, the main functions of the playback device can be embedded in this system LSI.

<Embodiment of Program>

The programs corresponding to the above embodiments can be produced as follows. First, the software developer writes, using a programming language, a source program that achieves each flowchart and functional component. In this writing, the software developer writes the source program embodying the flowcharts and functional components, by using the class structure, variables, array variables, calls to external functions and so on, which conform to the syntax of the programming language.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, syntax, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes.

For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program described here may be recorded on a computer-readable recording medium, and then provided to the user in this form.

Although the present invention has been fully described by way of example with reference to accompanying drawing, it is to be noted that various changes and modifications will be apparent to those skilled in the art. Therefore, unless otherwise such changes and modifications depart from scope of the present invention, they should be constructed as being include therein.

INDUSTRIAL APPLICABILITY

The playback device constituting the present invention can provide a service that links an application program on a recording medium with an original function of the playback device. In particular, the present invention is usable in the movie industry and commercial device industry for creating image contents.

REFERENCE SIGNS LIST

101 playback device
102 remote control
103 display device
105 read-only medium
106 mobile terminal
28 on-media library
29 external server
31 read control unit
32 write control unit
33 machine unique function control unit
35 digital copy module
36 digital copy server

What is claimed is:

1. A playback device for performing functions related to a content recorded on a first recording medium, the functions related to the content including a standardized playback control function and a machine unique function that is unique to the playback device, the standardized playback control function being performed on a content for playback, in the playback device, recorded on the first recording medium, the playback device comprising:
   a platform configured to read a bytecode application and a library from the first recording medium and run the bytecode application, the library being used by the bytecode application to control the machine unique function;
   a playback controller configured to perform the standardized playback control function; and
   a unique function controller configured to perform the machine unique function,
   wherein the platform includes a programming interface that is used by the bytecode application, and the programming interface includes a playback control programming interface and a communication programming interface,
   the machine unique function is copying a content for copying, from the first recording medium to a second recording medium, which is different from the first recording medium,
   the playback controller performs the standardized playback control function in accordance with an instruction from the bytecode application that calls the playback control programming interface, and
   the library, when called by the bytecode application by a call with arguments, including a storage location of the content for copying and a serial number, transmits a command for setting the storage location of the content for copying and a command for setting the serial number, to the unique function controller, through a socket connection with the unique function controller, via a first port which is one of a plurality of ports included in the playback device, and
   the unique function controller extracts a content ID of the content for copying, corresponding to the received storage location, transmits a pair of the content ID and the serial number to a server, causes the server to judge whether or not the machine unique function can be used, and performs the machine unique function upon receiving a judgment result from the server, indicating that the machine unique function can be used.

2. The playback device of claim 1, wherein
   the content for copying is a content for taking out,
   a plurality of copy source storage directories are provided under the second directory,
   the content for taking out is recorded in one of the plurality of copy source storage directories,
   the bytecode application instructs the unique function controller to set, as a current source location, a file path indicating one of the copy source storage directories, and
   the machine unique function is executed by (i) reading the content for taking out from one of the copy source storage directories and (ii) writing the content for taking out onto the second recording medium, when the file path indicating one of the copy source storage directories is set as the current source location.

3. The playback device of claim 1, wherein
   the content for copying is a content for taking out, and
   a part of a sequence of bits constituting the content ID identifies a content provider which is a supply source of the content for taking out.

4. The playback device of claim 1, further comprising:
   a verifier configured to verify authenticity of a digital signature file stored in an archive file of an on-media library, which is recorded on the first recording medium,
   the verifier calculates a hash value of the digital signature file stored in the archive file of the on-media library, based on an authentication key embedded in the playback device,
   the verifier judges that the bytecode application is authentic when the calculated hash value matches a value of a digital signature included in the digital signature file stored in the archive file of the on-media library, and
   when the verifier judges that the bytecode application is not authentic, the unique function controller rejects performing the machine unique function that is different from the standardized playback control function, even if the unique function controller receives a command related to the machine unique function that is different from the standardized playback control function from the bytecode application.

5. The playback device of claim 1, wherein the unique function controller transmits an output to the library via a second port different from the first port, the second port being one of a plurality of ports included in the playback device and being associated with an IP address of the playback device.

6. The playback device of claim 1, wherein the first port is assigned based on property information that is recorded in the playback device and associates the IP address of the playback device with the first port.

7. The playback device of claim 1, wherein the judgment result includes number-of-copies information, indicating a number of times the content for copying can be copied, and when the number of times indicated by the number-of-copies information is equal to or larger than 1, the unique function controller performs the machine unique function.

8. The playback device of claim 1, wherein the first port is associated with an IP address of the playback device.

9. The playback device of claim 1, wherein
the content for playback is a main content,
the content for copying is a content for taking out,
in the first recording medium, a first directory and a second directory are provided under a root directory,
the main content and the bytecode application are recorded in the first directory,
the content for taking out is recorded in the second directory, is a target of the machine unique function and is different from the main content in format, and
the machine unique function is an inter-media copy by which files constituting the content for taking out are copied from the first recording medium to the second recording medium.

10. The playback device of claim 9 further comprising:
a communication manager,
wherein the communication programming interface for the socket connection is provided by the communication manager, and upon detection of a network connection request sent from the bytecode application, the communication manager transmits a digital certificate held by the playback device to the bytecode application, and
when it is judged that a signature attached to the digital certificate is authentic, the bytecode application receives a communication key from the communication manager, generates an encrypted command by encrypting a command related to the machine unique function with use of the communication key, and transmits the encrypted command to the communication manager.

11. The playback device of claim 9, wherein
the library is an on-media library recorded in the first directory of the first recording medium, the on-media library providing another bytecode application recorded in the first directory with a programming interface for performance of the machine unique function,
when the other bytecode application calls the programming interface to perform the machine unique function,
the on-media library converts (i) the calling of the programming interface for performance of the machine unique function into a socket command and outputs the socket command to the unique function controller; and (ii) converts a response from the unique function controller into a return value or an event and returns the return value or the event to the other bytecode application, and
the socket connection comprises a communication path on which the socket command and the response are transferred.

12. The playback device of claim 11, wherein
a digital stream included in the content for taking out has been encrypted,
when the unique function controller writes onto the second recording medium, the unique function controller transmits, to an external server, a serial ID of the first recording medium, a content identifier of the digital stream, and a medium identifier and an encryption key of the second recording medium, and
performs a protection method unique to the second recording medium by obtaining a decryption key corresponding to the serial ID, the content identifier, and the medium identifier and the encryption key from the external server, and recording the decryption key into a protected area in the second recording medium.

13. A playback method for performing functions related to a content recorded on a first recording medium, the functions related to the content including a standardized playback control function and a machine unique function that is unique to a machine, the standardized playback control function being performed on a content for playback, in the machine, recorded on the first recording medium, the playback method comprising:
reading a bytecode application and a library from the first recording medium and causing a platform included in a computer to run the bytecode application, the library being used by the bytecode application to control the machine unique function; and
causing a unique function controller of the computer to perform the machine unique function,
wherein the platform includes a programming interface that is used by the bytecode application, and the programming interface includes a playback control programming interface and a communication programming interface,
the machine unique function is copying a content for copying, from the first recording medium to a second recording medium, which is different from the first recording medium,
a playback controller included in the computer performs the standardized playback control function in accordance with an instruction from the bytecode application that calls the playback control programming interface, and
the library, when called by the bytecode application by a call with arguments, including a storage location of the content for copying and a serial number, transmits a command for setting the storage location of the content for copying and a command for setting the serial number to the unique function controller, through a socket connection with the unique function controller, via a first port which is one of a plurality of ports included in the computer, and
the unique function controller extracts a content ID of the content for copying, corresponding to the received storage location, transmits a pair of the content ID and the serial number to a server, causes the server to judge whether or not the machine unique function can be used, and performs the machine unique function upon receiving a judgment result from the server indicating that the machine unique function can be used.

14. A non-transitory computer-readable recording medium storing a program that is readable by a computer performing functions related to a content recorded on a first recording medium, the functions related to the content including a standardized playback control function and a machine unique function that is unique to a machine, the standardized playback control function being performed on a content for playback, in the machine, recorded on the first recording medium, the program causing the computer to perform:

reading a bytecode application and a library from the first recording medium and causing a platform included in the computer to run the bytecode application, the library being used by the bytecode application to control the machine unique function; and causing a unique function controller to perform the machine unique function, wherein the platform of the computer includes a programming interface that is used by the bytecode application, and the programming interface includes a playback control programming interface and a communication programming interface, the machine unique function is coping a content for copying, from the first recording medium to a second recording medium, which is different from the first recording medium, the program further causes the computer to perform such that:

a playback controller included in the computer performs the standardized playback control function in accordance with an instruction from the bytecode application that calls the playback control programming interface; and the library, when called by the bytecode application by a call with arguments, including a storage location of the content for copying and a serial number, transmits a command for setting the storage location of the content for copying and a command for setting the serial number to the unique function controller, through a socket connection with the unique function controller, via a first port which is one of a plurality of ports included in the computer, and the unique function controller extracts a content ID of the content for copying, corresponding to the received storage location, transmits a pair of the content ID and the serial number to a server, causes the server to judge whether or not the machine unique function can be used, and performs the machine unique function upon receiving a judgment result from the server indicating that the machine unique function can be used.

\* \* \* \* \*